(12) United States Patent
Ahrenst et al.

(10) Patent No.: US 9,034,802 B2
(45) Date of Patent: May 19, 2015

(54) FRICTION REDUCTION FLUIDS

(75) Inventors: Alex Ahrenst, Kokstad (NO); Bernhard Lungwitz, Vernal, UT (US); Christopher N. Fredd, New York, NY (US); Carlos Abad, Richmond, TX (US); Nihat Gurmen, Corpus Christi, TX (US); Yiyan Chen, Sugar Land, TX (US); John Lassek, Katy, TX (US); Paul Howard, Sugar Land, TX (US); William Troy Huey, Bixby, OK (US); Zakir Azmi, Elk City, OK (US); Donald Hodgson, III, Oklahoma City, OK (US); Oscar Bustos, Castle Rock, CO (US)

(73) Assignee: Schlumberger Technology Corporation, Sugar Land, TX (US)

( * ) Notice: Subject to any disclaimer, the term of this patent is extended or adjusted under 35 U.S.C. 154(b) by 620 days.

(21) Appl. No.: 11/833,449

(22) Filed: Aug. 3, 2007

(65) Prior Publication Data

US 2008/0064614 A1  Mar. 13, 2008

Related U.S. Application Data

(60) Provisional application No. 60/822,696, filed on Aug. 17, 2006.

(51) Int. Cl.
| | |
|---|---|
| *C09K 8/588* | (2006.01) |
| *C09K 8/68* | (2006.01) |
| *C09K 8/74* | (2006.01) |
| *F17D 1/17* | (2006.01) |

(52) U.S. Cl.
CPC ... *C09K 8/68* (2013.01); *C09K 8/74* (2013.01); *C09K 2208/28* (2013.01); *F17D 1/17* (2013.01)

(58) Field of Classification Search
None
See application file for complete search history.

(56) References Cited

U.S. PATENT DOCUMENTS

| | | |
|---|---|---|
| 3,373,107 A | 3/1968 | Rice |
| 3,442,803 A | 5/1969 | Hoover et al. |
| 4,341,684 A | 7/1982 | Krantz |
| 4,725,372 A | 2/1988 | Teot et al. |
| 4,983,186 A | 1/1991 | Naiman |
| 5,551,516 A | 9/1996 | Norman et al. |
| 5,607,980 A | 3/1997 | McAtee |
| 5,639,722 A | 6/1997 | Kong et al. |
| 5,696,073 A | 12/1997 | Jakubicki |

(Continued)

FOREIGN PATENT DOCUMENTS

| | | |
|---|---|---|
| GB | 2191716 A | 12/1987 |
| RU | 2180680 | 3/1996 |

(Continued)

OTHER PUBLICATIONS

1st Office Action dated Feb. 20, 2012 in the corresponding CN application No. 200780038925.3, filed on Aug. 10, 2007.

(Continued)

*Primary Examiner* — John J Figueroa
(74) *Attorney, Agent, or Firm* — Jeremy D. Tillman; Rachel E. Greene; Tim Curington

(57) ABSTRACT

The invention provides an oilfield suspending friction reducer treatment composition fluid comprising from about 0.001 weight percent to about 0.5 weight percent of a drag reducing surfactant; at least one drag reducing enhancer selected from the group consisting of polymeric drag reduction enhancers, monomeric drag reduction enhancers, and mixtures thereof.

35 Claims, 36 Drawing Sheets

(56) References Cited

U.S. PATENT DOCUMENTS

| | | | |
|---|---|---|---|
| 5,902,784 | A | 5/1999 | Hellsten |
| 5,964,692 | A | 10/1999 | Blezard |
| 6,178,980 | B1 | 1/2001 | Storm |
| 6,440,902 | B1 * | 8/2002 | Szamosi ............. 504/138 |
| 6,579,947 | B2 | 6/2003 | Heitz et al. |
| 7,084,095 | B2 | 8/2006 | Lee et al. |
| 7,188,676 | B2 * | 3/2007 | Qu et al. ............. 166/312 |
| 7,205,262 | B2 | 4/2007 | Schwartz |
| 7,265,079 | B2 * | 9/2007 | Willberg et al. ......... 507/203 |
| 7,275,596 | B2 * | 10/2007 | Willberg et al. ........ 166/280.1 |
| 7,565,929 | B2 * | 7/2009 | Bustos et al. ............. 166/279 |
| 7,595,284 | B2 * | 9/2009 | Crews ................... 507/239 |
| 2002/0161087 | A1 | 10/2002 | Heitz et al. |
| 2003/0236174 | A1 * | 12/2003 | Fu et al. ................. 507/200 |
| 2004/0082668 | A1 | 4/2004 | Vinson |
| 2004/0094300 | A1 * | 5/2004 | Sullivan et al. ........ 166/308.1 |
| 2004/0220063 | A1 | 11/2004 | Chappell |
| 2005/0124500 | A1 * | 6/2005 | Chen et al. ............. 507/200 |
| 2006/0128598 | A1 * | 6/2006 | Chen et al. ............. 510/490 |

FOREIGN PATENT DOCUMENTS

| | | |
|---|---|---|
| RU | 2097547 | 9/1996 |
| RU | 2244814 C1 | 1/2005 |
| SU | 1710710 | 2/1990 |
| WO | 9640845 | 3/1996 |
| WO | 0118147 A1 | 3/2001 |
| WO | 0218745 A2 | 3/2002 |

OTHER PUBLICATIONS

Acharya, A.R., "Drag properties used to estimate friction loss of fracturing fluid", Oil & Gas Journal, vol. 87 (24), Jun. 12, 1989, pp. 35-38.

Tanford, Charles, "Micelle shape and size", The Journal of Physical Chemistry, vol. 76 (21), Oct. 1972, pp. 3020-3024.

Virk, P.S., "Drag Reduction Fundamentals", Aiche Journal, vol. 21 (4), 1975, pp. 625-656.

International Search Report issued in PCT/IB2007/053197 on Feb. 5, 2008, 3 pages.

\* cited by examiner

FRICTION REDUCTION FLUIDS

CROSS REFERENCE TO RELATED APPLICATIONS

This application is based on and claiming priority to provisional application 60/822696, filed Aug. 17, 2006.

FIELD OF THE INVENTION

This invention provides fluids with low friction pressures, for well service applications such as fracturing, gravel packing, well clean-out, acidizing matrix and acid fracturing treatments and the like, and methods for their use. Specifically, the invention relates to surfactant based fluids with excellent friction reduction characteristics, and methods for their use in the various oilfield applications.

BACKGROUND OF THE INVENTION

The reduction of friction during treatments in the oilfield is an ongoing issue. Various polymeric compositions have been used over the years in attempts to reduce friction in treatment fluids during pressure pumping operations. Guar, polymethylmethacrylate, polyethyleneoxide, polyacrylamide, polyAMPS (poly 2-acrylamido-2-methylpropane sulfonic acid), polymers derived therefrom, and other high molecular weight synthetic polymers, have been used in the oilfield in the past as conventional friction reducers to reduce friction pressures in turbulent flow regimes. Currently, the industry standard for friction reduction in the oilfield is to use polyacrylamide and poly(acrylamide derived) polymers, co-polymers, or mixtures thereof in solution or in emulsified form.

U.S. Pat. No. 3,442,803 to Hoover et al. discloses reducing friction in an aqueous oil well fracturing system by dissolving in the aqueous system a small amount of a copolymer of acrylamide and methylene bis-acrylamide. Such polyacrylamides can be prepared with cationic, anionic or non-ionic end groups, depending on the specific intended application. Polyacrylamide and polyacrylamide derived friction reducers have been used as friction reducers for benchmarking the suspending friction reducing compositions and methods herein.

In tight gas formations, reservoir stimulation techniques often involve water as the main treatment fluid. Since water is a Newtonian fluid, it generates high treatment pressures due to frictional pressure losses at high pump rates. To limit this friction pressure, very low concentrations of generally high molecular weight (several million Dalton) polymer-based conventional friction reducers (CFRs) are added to the fluid with inorganic salts or organic substitutes for clay stabilization. These low-cost fluid systems are commonly referred to in the industry as slick-water fluid systems.

Slick-water fluid systems do not have sufficient viscosity or elasticity to provide good proppant carrying capacity. Therefore, slick-water jobs rely on high pump rates and turbulence to carry low concentrations of proppants into the formation along a hydraulic fracture during fracturing treatments. High rate water pack treatments rely on high pump rates and turbulence to carry low concentrations of gravel into the annulus formed by the well and a screen during gravel packing treatments. One goal of the invention described herein is to achieve effective proppant transport at higher proppant concentrations in the fracture, which will provide better production for the well, or higher gravel concentrations in the annulus, which means more effective gravel packing. A primary benefit of the fluid and method of the invention is that the treatment pump rate can be reduced, and therefore the horsepower required on location can also be reduced. Hence, the invention overall provides both a more efficient and a more cost-effective treatment method.

It has now been discovered that fluids comprising at least one drag reducing surfactant, a polymer and/or a monomer provide improvements over such friction reduction compounds. These fluids exhibit outstanding improved viscous and solid suspending characteristics, over similar fluids reported in the prior art, at low surfactant concentrations.

SUMMARY OF THE INVENTION

The invention provides improved fluids for use in oilfield applications known as Suspending Friction Reducers (SFR). Specifically, the SFR fluids of the invention comprise at least one drag reducing surfactant or a mixture of drag reducing surfactants, and at least one drag reduction enhancer selected from polymeric drag reduction enhancers, monomeric drag reduction enhancers (or drag reduction enhancing counterions), or a mixture of polymeric and monomeric drag reduction enhancers. SFR fluids of the invention may also comprise one or more adjuvants such as co-solvents, co-surfactants, or brines, if desired.

Suspending Friction Reducing fluids (SFR fluids) of the invention exhibit outstanding drag reduction and improved viscous and solid suspension characteristics at low active surfactant concentrations (less or equal to about 0.5 weight percent, (0.5 wt %)), relative to high molecular weight polymeric fluids previously reported in the art for similar purposes, which will be referred to as Conventional Friction Reducers (CFR). In addition, SFR fluids of the invention may exhibit reduced viscosity when in contact with reservoir fluids such as water, brine or oil, or upon exposure to heat. The SFR fluids of the invention may also alter the wettability of the formation. The term "active" percent means pure surfactant weight as opposed to weight of surfactant as supplied, which is a mixture of the surfactant and other ingredients such as alcohols. The final commercially available mixture typically contains about 30-50% surfactant.

There are many methods accepted in the literature that can be used to show the effect of friction reducers in non-Newtonian fluids. One common methods involves plotting the percent drag reduction (% DR) against the mass flow rate, or the velocity. The drag reduction can be estimated from pressure differential measurements in a straight pipe. In this application we have generally used a comparison of the pressure differential for the fluid of the Invention $\Delta P_f$ as compared to that of brine or water, $\Delta P_w$, and reported this according to the following formula:

$$\% \ DR = \frac{\Delta P_w - \Delta P_f}{\Delta P_w} \times 100 \qquad \text{Eq. 1}$$

Suspending Friction Reducer (SFR) fluids of the present invention show a wide applicability in wellbore applications.

In one embodiment of this invention, the SFR fluid is used as a drag reducing agent in water based stimulation treatments, giving the fluids superior proppant carrying capacity. In one embodiment, the SFR active surfactant component is added to water or aqueous fluid in a concentration of about 1 wt % or less, preferably 0.5 wt % or less, more preferably 0.4 wt % or less, more preferably less than 0.3 wt % or less, more preferably about 0.25 wt % or less, and most preferably less than 0.2 wt % of the total liquid phase. SFR fluids of the invention achieve a percent drag reduction (% DR) of at least 20%, preferably at least about 40%, more preferably at least about 60%, and most preferably at least about 65% at typical treatment flow rates.

SFR fluids of the invention maintain effectiveness as a drag reducer for an extended period of time as the high shear to which they are subjected during injection and treatment does not irreversibly degrade the structures responsible for the friction reduction.

In one embodiment of this invention, the SFR fluid is used as a drag reducing agent in divalent cation-containing (i.e., calcium, magnesium) waters such as hard water, produced water, formation water and the like.

In one embodiment of this invention, the SFR fluid may also comprise a CFR polymeric drag reducing agent, such as guar, guar derivative, polyethyleneoxide, polyacrylamide or polyAMPS or a derivative thereof.

In another embodiment of this invention, the SFR fluid comprises a drag reducing surfactant mixture, and one or more drag reduction enhancers selected from polymeric and monomeric drag reduction enhancers and conventional friction reducers which are selected such as to provide good friction reduction, good sand suspending capabilities, and excellent compatibility amongst all the fluid components.

In one embodiment of this invention, the SFR fluid is used in the PAD stage of a hydraulic fracturing treatment to initiate and propagate a fracture in the formation. This PAD stage is followed by a series of proppant laden stages in which the main fluid comprises a CFR polymeric drag reducer (such as a polyacrylamide), and a viscosifier such as a linear polymer gel (such as a guar fluid), a crosslinked polymer gel (such as a guar or a substituted guar crosslinked with boron, or an organometallic crosslinker like titanium or zirconium, for example), a viscoelastic surfactant gel system, e.g., betaines, amphoteric, cationic, or anionic surfactants, or such stages may include the same SFR fluid or a different SFR fluid.

In another embodiment of this invention, the SFR fluid is used in the proppant laden stages of a hydraulic fracturing treatment following a PAD stage. The PAD may contain a CFR polymeric drag reducer (such as a polyacrylamide), a linear polymer gel (such as a guar fluid), a crosslinked polymer gel (such as a guar or substituted guar crosslinked with boron, titanium or zirconium, for example), a viscoelastic surfactant gel system, such as those made with betaines, amphoteric, cationic, or anionic surfactants, or the same or a different SFR.

In another embodiment of this invention, the SFR fluid is used to minimize the treatment pump time, to minimize the amount of water pumped, to maximize the proppant placement and concentration, or to reduce the pump rate.

In another embodiment of this invention, the SFR fluid is used in conjunction with fibers and proppants to further provide physical support for the proppants.

In another embodiment of this invention, the SFR fluid is used with various propping agents (proppants) having different densities, e.g., from about 0.5 to about 4.0 kg/L, and/or coatings to place a conductive channel into the fractured rock.

In another embodiment of this invention, the SFR fluid is used in conjunction with particulates or fibers to act as a diverting agent to divert treatment fluids from high permeability zones in a formation to lower permeability zones.

In another embodiment of this invention, the SFR fluid is turned into an energized or foamed fluid by adding a gas phase to the fluid and creating a foam or emulsion with nitrogen, methane or carbon dioxide. The surfactant in the SFR fluid will also act as an effective foamer in this application.

In another embodiment of this invention, the SFR fluid is used in conjunction with fluid loss additives.

In another embodiment of the invention, the charged drag reducing surfactant(s) and or the polymeric drag reduction enhancer(s), and their counterions, and or the monomeric drag reduction enhancer(s), and their counterions that comprise the SFR fluid formulation, provide clay swelling control in the absence of brine and conventional clay control agents.

In certain embodiment of the invention, one or more of the ingredients of the SFR fluid formulation can impart moderate biocidal character thereto.

In another embodiment of this invention, the SFR fluid is used in a high rate gravel packing application or water pack.

In other embodiments of this invention the SFR is used as a conformance control fluid, as an enhanced oil recovery fluid, as a drag reducing agent in oil pipes, and wherever drag reduction is needed in oilfield treatments.

In another embodiment of the invention, the SFR fluid formulation further comprises one or more scale inhibitors. Useful scale inhibitors may be selected from solid or liquid, and may be inorganic, or organic scale (i.e., asphaltene or paraffin) inhibitors In another embodiment of the invention, the SFR fluid formulation comprises an amine derivative (primary, secondary or more preferably a tertiary amine) and an acid (either organic or inorganic) strong enough to fully or partially protonate the nitrogen's lone electron pair. The fluid is formulated such as to provide friction reduction when flowing in the tubulars and in a propagating fracture, but to lose its drag reducing properties when the acid component is reacted with the formation or formation fluids. The fluid provides diversion when the acid is partially or totally spent in contact with naturally fractured reservoirs such as carbonaceous reservoirs, shale reservoirs, or coal reservoirs.

BRIEF DESCRIPTION OF THE DRAWINGS

FIG. 7 is a plot of percentage drag reduction versus mass flow rate for various concentrations of suspending friction reducers.

DETAILED DESCRIPTION OF THE INVENTION

Figure 1:
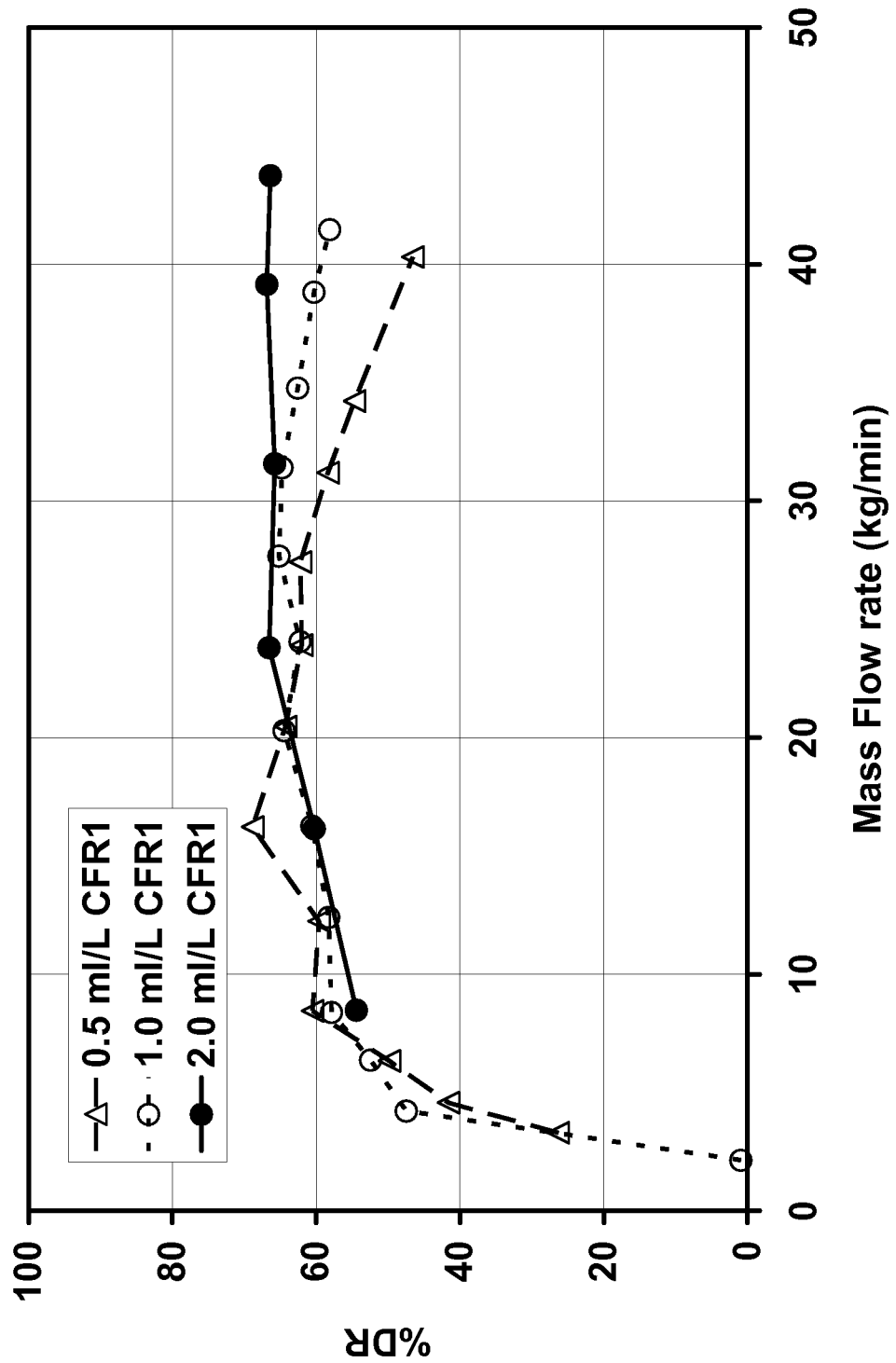
FIG. 1 is a plot of percentage drag reduction versus mass flow rate for various concentrations of a conventional friction reducers.

The total amount of active drag reducing surfactant in fluids of the invention is typically no more than 0.5 weight percent (0.5 wt %), and preferably no more than about 0.3 weight percent (0.3 wt %), and more preferably not more than about 0.2 weight percent (0.2 wt %). The total amount of active polymeric drag reduction enhancer in fluids of the invention is preferably no more than about 0.2 weight percent, (0.2 wt %) and more preferably no more than about 0.05 weight percent (0.05 wt %), and most preferably no more than about 0.03 weight percent (0.03 wt %). The total amount of active monomeric drag reduction enhancer in fluids of the invention is preferably no more than about 0.2 weight percent (0.20 wt %), and more preferably 0.10 weight percent or less (0.10 wt %), and most preferably 0.05 weight percent (0.05 wt %) or less. The SFR fluid is capable of transporting proppant in a tubular when pumped at medium to high rates, and the total pressure drop in the tubular in the presence of the fluid is lower than in the presence of water or brine without the combined drag reducing surfactant and polymeric and or monomeric drag reduction enhancer, even though the SFR fluid viscosity is higher than that of water.

Although much discussion herein is focused on improved particle transport as an important property of the compositions and fluids of the invention, the compositions and fluids of the invention may be used for their drag reduction properties alone. Thus they may be used or added to fluids used in acidizing, acid fracturing, diversion, scale control treatments, and the like, and for fluids used as spacers, flushes, and the like. In treatments in which the fluids are injected into a formation, the SFR fluids of the invention provide polymer-free drag reduction and thus cause less formation damage.

Fluids used in the methods of the invention may further include any of the additives normally included in such treatment fluids, provided that tests are performed to ensure that the additives are compatible with the function, solubility, and stability, etc., of the drag reducing surfactants, polymeric and monomeric drag reduction enhancers of the Invention. Such additives include, by non-limiting example, scale inhibitors, buffers, clay control additives, fluid loss additives, biocides, tracers, and others. Such additives can be pumped in a stimulation treatment in separate streams as purchased from commercial suppliers, or more preferably can admixed, either far in advance or just prior to the treatment execution, with the components of the SFR fluid, and pumped as one single stream Suitable components of the SFR fluids of the invention are described below. The materials listed as being suitable for use in the invention, such as the drag reducing surfactants, polymeric and monomeric drag reduction enhancers, can be used as pure compounds. However, when they are obtained commercially, they are almost always obtained as concentrates that include additives such as solvents, water, co-solvents such as IPA, glycerine, propylene glycol and others. Amounts of materials suitable for use in the invention, such as drag reducing surfactants, polymeric and monomeric drag reduction enhancers, are given for "pure" compounds (the active components of the concentrates) but it is to be understood that in most cases they will be obtained in the form of concentrates, accompanied by other components such as co-solvents such as IPA, glycerine, propylene glycol and the like.

Although the invention is being described primarily in terms of % DR, another valuable benefit to use of the compositions and methods of the invention is that, at all shear rates in the fracturing and gravel packing process but especially at low shear rates, the fluids use very low concentrations of drag reducing surfactants and of polymeric and or monomeric drag reduction enhancers, compared to other surfactant based stimulation treatments, yet the SFR fluids of the invention exhibit higher viscosities and better particle transport properties than water, brine, or water or brine containing conventional drag reducing agents CFRs at the concentrations at which such conventional drag reducing agents are normally used.

Moreover, the fluids of the invention do not form a filter cake, and are less damaging to the formation than typical polyacrylamide slick water treatments. In addition the fluids of the invention do not require oxidizing breakers, as the SFR fluids rely on dilution, oil contact, and or temperature to lose their viscosity.

Without intending to be limited by theory, it is believed that micelles of a certain size and shape provide preferred drag reducing capabilities. Suitable micelles are cylindrical micelles. C. Tanford states in "Micelle Shape and Size", J Phys. Chem., 76, 3020 (1972) that cylindrical micelles are formed by a surfactant in which the ratio v/(la) is equal to 1:3 or greater, preferably the ratio is close to about 1:2, where a is the cross-sectional area of the hydrophilic group, v is the volume of the hydrophobic group, and l is the length of the hydrophobic group. Fluids and methods of the invention employ combinations of such a surfactant and a polymeric drag reduction enhancer.

Suitable surfactants for use as the drag reducing surfactants of the invention include cationic surfactant molecules, e.g., those having the formula $R_1R_2R_3R_4N^{(+)}X^{(-)}$, and amphoteric surfactant molecules of formula $R_1R_2R_3R_4N$, where $R_1$ is selected from:
  i) a hydrocarbon chain, saturated aliphatic, monounsaturated, di-unsaturated or polyunsaturated comprising 8 to 24 carbon atoms, ($C_8$ to $C_{24}$), and most preferably $C_{14}$ to $C_{18}$; such as for instance hexadecyl —$(CH_2)_{15}$—$CH_3$ and
  ii) a functionalized hydrocarbon chain of structure $R_1=R_5—Y—R_6$ where Y is a functional group such as —O— (ether), —NH— (amine), —COO— (ester) —CNH— (amide), —[O—$(CH_2)_2]_xO$— (polyethylenoxide), —[O—$CH_2CH(CH_3)]_xO$— (polypropylene oxide), $R_5$ is hydrocarbon chain, saturated aliphatic, monounsaturated, di-unsaturated or polyunsaturated comprising 8 to 24 carbon atoms, ($C_8$ to $C_{24}$), and most preferably $C_{14}$ to $C_{22}$, and $R_6$ is a hydrocarbon chain, $C_1$-$C_6$, more preferably —$CH_2CH_2$—, or —$CH_2CH_2CH_2$—

$R_2$, and $R_3$, are selected from:
  i) a hydrocarbon chain of 1 to 24 carbon atoms, preferably methyl, —$CH_3$
  ii) a 2-hydroxyethyl chain (—$CH_2$—$CH_2$—OH)
  iii) a hydroxy terminated polyethylene oxide chain of respective lengths x and y, for $R_2$ and $R_3$ respectively, selected such that x+y<20, 1<x<19 and 1<y<19, (—$[CH_2$—$CH_2$—$O]_n$—H)

$R_4$ is selected from:
  i) a saturated hydrocarbon chain of 1 to 22 carbon atoms, preferably methyl, —$CH_3$
  ii) a 2-hydroxyethyl chain (—$CH_2$—$CH_2$—OH)
  iii) a hydrogen atom —H
  iv) for amphoteric (mainly amine oxide) surfactants, an oxygen atom or nitrogen atom that does not carry a positive charge, and therefore an anion $X^{(-)}$ is not present in the structure, and for cationic surfactants, $X^{(-)}$ is an anion such as $F^{(-)}$, $Cl^{(-)}$, $Br^{(-)}$, $I^{(-)}$, $NO_3^{(-)}$, $SO_3H^{(-)}$, $SO_4H^{(-)}$, $CH_3COO^{(-)}$ (acetate), $CH_3SO_3^{(-)}$ (methane sulfonate), $CF_3SO_3^{(-)}$ (fluoromethane sulfonate), HO—CO—$C_6H_4$—$COO^{(-)}$ (monobasic phthalate), $CH_3OSO_3^{(-)}$ (methanesulfate), HO—$C_6H_4COO^{(-)}$ (salicylate), $CH_3C_6H_4SO_3^{(-)}$ (toluene sulfonate), HO—$CH_2COO^{(-)}$ (glycolate), HO—$CH(CH_3)COO^{(-)}$ (lactate), and other monovalent anions.

Examples of these surfactants include those cationic surfactants with general formula $R_1R_2R_3R_4N^{(+)}X^{(-)}$, where $R_1$ can be hydrocarbon and functionalized hydrocarbon chains, such as: Cetrimonium chloride, CTAC, such as Arquad® 16-50; Stearyl, trimethyl chloride, STAC, such as Arquad® 18-50; Tallowtrimonium chloride, TTAC; such as Arquad® T-50; aurtrimonium chloride, LTAC; such as Arquad® 12-50; cocoyl trimethyl ammonium chloride; such as Arquad® C-50; N,N-Bis(2-hydroxyethyl)-N-methyloctadecanaminium chloride; such as Ethoquad 18-12; Methyl bis(2-hydroxyethyl)cocammonium chloride; such as Ethoquad® C/12; erucyl bis(2-hydroxyethyl)methyl ammonium chloride, EHAC. Other examples of these surfactants include those such as erudicylamidopropyl methyl bis(hydroxyethyl) ammonium chloride; oleylamidopropyl methyl bis(hydroxyethyl)ammonium chloride; and other commercially available surfactants such as N,N-Bis (2-hydroxyethyl)-N-methyl oleylaminium chloride, Ethoquad® O-12; N,N-Tris(2-hydroxyethyl)-N-hydrogeneatedtallowaminium chloride, Ethoquad® T/13-50; or Behenamidopropyl hydroxyethyl dimonium chloride, Incroquat Behenyl HE.

Examples also include those amines, primary, secondary and more preferably tertiary amines, that can become cationic surfactants in the presence of at least stoichiometric amounts of an acid strong enough to at least partially protonate the nitrogen's lone electron pair with general formula $R_1R_2R_3HN^+X^-$. Examples of these compounds include those such as the fatty amine derivatives like coco dimethyl amine; lauryldimethyl amine; hexadecyl dimethyl amine; octadecyl dimethyl amine; coco bis-hydroxyethyl amine; lauryl bis-hydroxyethyl amine; hexadecyl bis-hydroxyethyl amine; octadecyl bis-hydroxyethyl amine; Behenamido propyl dimethylamine; Cocamido propyl dimethylamine; Isostearamido propyl dimethylamine; Isostearamido propyl morpholine; Lauramido propyl dimethylamine; Linoleamido propyl dimethylamine; Linoleamido propyl dimethylamine lactate; Oleamido propyl dimethylamine glycolate; Stearamidoethyl diethylamine; Stearamidoethyl ethanolamine or and similar compounds amongst which commercial samples can be obtained under the tradenames: Armeen® DM12D, Armeen® DM16D, Armeen® DM18D, Armeen® DMCD, Armeen® DMHTD, Armeen® DMOD, Armeen® DMSD, Armeen® DMTD, Ethomeen® 18/12, Ethomeen® C/12, Ethomeen® 0/12, Ethomeen® S/12, Ethomeen® T/12, from AKZO, Ethomeen® 18/15, Ethomeen® 18/25, Ethomeen®

18/60, Armeen® M2C, Armeen® M2HT, Propomeen® 0/12, or Propomeen® T/12, all available from AKZO.

Useful surfactants also include zwitterionic surfactants having the general formula $R_1N^{(+)}R_2R_3R_4X^{(-)}$, where $R_1$ is selected from:
  i) a hydrocarbon chain, saturated aliphatic, monounsaturated, diunsaturated or polyunsaturated comprising 8 to 24 carbon atoms, ($C_8$ to $C_{24}$), and more preferably $C_{14}$ to $C_{22}$; such as hexadecyl —$(CH_2)_{15}$—$CH_3$
  ii) a functionalized hydrocarbon chain of structure $R_1=R_5YR_6$ where Y is a functional group such as —O— (ether), —NH— (amine), —COO— (ester) —CNH— (amide), —[O—$(CH_2)_2]_xO$— (polyethylenoxide), —[O—$CH_2CH(CH_3)]_xO$— (polypropylenoxide), $R_5$ is a hydrocarbon chain, saturated aliphatic, monounsaturated, di-unsaturated or polyunsaturated comprising 8 to 24 carbon atoms, ($C_8$ to $C_{24}$), and more preferably $C_{14}$ to $C_{22}$, and $R_6$ is a hydrocarbon chain, $C_1$-$C_6$, more preferably —$CH_2CH_2$—, or —$CH_2CH_2CH_2$— and $R_2$, and $R_3$, are hydrocarbon chains of 1 to 24 carbon atoms, preferably methyl, —$CH_3$;
$R_4$ is an alkyl chain $C_1$ to $C_6$, more preferably —$CH_2$—, or —$CH_2CH_2$—; and $X^{(-)}$ is carboxylate —$COO^{(-)}$ for betaines or sulfonate group, —$SO_3^{(-)}$ for sultaines.

Examples of useful zwitterionic surfactants with general formula $R_1N^{(+)}R_2R_3R_4X^{(-)}$, include the following:
  i. Alkyl Betaines where $R_1$ is a saturated, $C_8$ to $C_{24}$ alkyl chain, more preferably $C_{12}$ to $C_{22}$; $R_2$, and $R_3$ are both alkyl, more preferably methyl; $R_4$ is an alkyl chain $C_1$ to $C_6$, more preferably —$CH_2$—, or —$CH_2CH_2$—, and $X^{(-)}$ is —$COO^{(-)}$. Examples of such surfactants include: Alkyl dimethyl betaine; Oleyl betaine; Coco-betaine; Behenyl betaine; Lauryl betaine; or Tallow betaine.
  ii. Alkylamido Betaines where $R_1=R_5$—Y—$R_6$, where Y is —CONH—, $R_5$ is a $C_7$-$C_{23}$ alkyl chain, more preferably a $C_{11}$-$C_{21}$; $R_6$ is $C_1$-$C_6$, more preferably —$CH_2CH_2$—, or —$CH_2CH_2CH_2$—, $R_2$ and $R_3$, are both alkyl, more preferably methyl; $R_4$ is an alkyl chain $C_1$ to $C_6$, more preferably —$CH_2$—, or —$CH_2CH_2$—, and $X^{(-)}$ is —$COO^{(-)}$. Surfactants of this type include erudicylamido propyl betaine Mirataine® BET-E-40, from Rhodia; cocoamido propyl dimethyl betaine, Mirataine® BET-C-30; Oleamido propyl dimethyl betaine, Mirataine® BET-O-30, and the like
  iii. Alkyl Sultaine $R_1N^{(-)}R_2R_3R_4X^{(-)}$, where $R_1$ is a saturated, $C_8$ to $C_{24}$ alkyl chain, more preferably $C_{12}$ to $C_{22}$; $R_2$, and $R_3$ are both alkyl, more preferably methyl; $R_4$ is an alkyl chain $C_1$ to $C_6$, more preferably —$CH_2$—, or —$CH_2CH_2$—, and $X^{(-)}$ is $SO_3^{(-)}$.

Examples of such surfactants are Coco-sultaine; Lauryl sultaine; N,N-Dimethyl-N-palmityl-N-(3-sulfopropyl)-ammonium betaine; N,N-Dimethyl-N-stearyl-N-(3-sulfopropyl)-ammonium betaine; N,N-Dimethyl-N-tallow-N-(3-sulfopropyl)-ammonium betaine; N,N-distearyl-N-methyl-N-(3-sulfopropyl)-ammonium betaine and the like.
  iv. Alkylamido Sultaine where $R_1=R_5YR_6$, where Y is —CONH—, $R_5$ is a $C_7$-$C_{23}$ alkyl chain, more preferably a $C_{11}$-$C_{21}$; $R_6$ is $C_1$-$C_6$, more preferably —$CH_2CH_2$—, or —$CH_2CH_2CH_2$—, $R_2$ and $R_3$, are both alkyl, more preferably methyl; $R_4$ is an alkyl chain $C_1$ to $C_6$, more preferably —$CH_2$—, or —$CH_2CH_2$—, and $X^{(-)}$ is —$SO_3^{(-)}$. Surfactants of this type include: N,N-Dimethyl-N-lauric acid-amidopropyl-N-(3-sulfopropyl)-ammonium betaine; Alkyl acid amidopropyl-N,N-dimethyl-N-(3-sulfopropyl ammonium betaine; or cocoamidopropyl hydroxysultaine; N,NDimethyl-N-coco fatty acid-N-(3-sulfopropyl)-ammonium betaine, Useful surfactants also include anionic surfactants of formula $R_1X^{(-)}M^{(+)}$, where, $R_1$ is selected from:
  i) a hydrocarbon chain, saturated aliphatic, monounsaturated, diunsaturated or polyunsaturated comprising 8 to 24 carbon atoms, ($C_8$-$C_{24}$), or an monosubstituted phenyl group (such as nonylphenyl, —$C_9H_{19}C_6H_4$, or octylphenyl, —$C_8H_{17}C_6H_4$)
  ii) a functionalized hydrocarbon chain of structure $R_1=R_2Y$ where Y is a functional group such as —[O—$(CH_2)_2]O$— (polyethylenoxide), or —[O—$CH_2CH(CH_3)]_xO$— (polypropylenoxide), and $R_2$ is a hydrocarbon chain, saturated aliphatic, monounsaturated, diunsaturated or polyunsaturated comprising 8 to 24 carbon atoms, ($C_8$-$C_{24}$), or an monosubstituted phenyl group (such as nonylphenyl, —$C_9H_{19}C_6H_4$, or octylphenyl, —$C_8H_{17}C_6H_4$)

$X^{(-)}$ is a negatively charged group such as $COO^{(-)}$; or $SO_3^{(-)}$, and $M^{(+)}$ is a monovalent cation (such as $Li^{(+)}$, $Na^{(+)}$, $K^{(+)}$, $Rb^{(+)}$, and $NH_4^{(+)}$).

Examples of such surfactants where $X^{(-)}$ is $COO^{(-)}$; include sodium oleate; stearic acid sodium salt; sodium palmitate; hexadecanoic acid sodium salt, and sodium cocoate.

Examples of such surfactants where $X^{(-)}$ is $SO_3^{(-)}$; include fatty acid amides of N-methyl taurine, sodium methyl cocoyl taurate; sodium methyl cocoyl taurate; sodium methyl oleyl taurate, and potassium methyl cocoyl taurate.

Examples of surfactants that can be used in SFR fluids of the invention also include those amphoteric surfactants such as amine oxide surfactants having the general formula $R_1R_2R_3NO$, such as hexadecyl dimethyl amineoxide; tetradecyl dimethyl amineoxide; lauryl dimethyl amineoxide; octadecyl dimethyl amineoxide; and the like, for which some examples can be purchased under the tradenames Aromox®B-W 500, Aromox® DMC, Aromox® DM16, Aromox® 14D-W 970, Aromox® DMHT, Aromox® T/12 DEG, Aromox® APTA-T, and Aromox® C/13W, all from AKZO.

In addition, dimeric, trimeric or oligomeric surfactants including Diels-Alder oligomers obtained by polymerization of any of the cationic, anionic, or zwitterionic, surfactants listed above, that contain at least one double bond in the $R_1$ chain, such as oleic, linoleic, or linolenic chains can be employed for the invention. Examples of these surfactants may be obtained by neutralizing a dimer or trimer acid such as Dimer oleic acid, commercially available as Empol® 1019; or Pripol® 1022; Dilinoleic acid, commercially available as Empol® 1007; and the like with a strong base such as NaOH or KOH.

For any and all of the foregoing drag reducing surfactants, the long aliphatic chain $R_1$ may be entirely a single hydrocarbon chain length or may include mixtures of chains with different hydrocarbon lengths, as commonly found in natural products.

In the foregoing lists, the most common hydrocarbon and functional hydrocarbon groups in currently commercial products have been listed for reasons of availability, however, this does not preclude use of lesser common hydrocarbon groups not fully discussed. Similarly, the long chains, usually the $R_1$ groups, have been routinely described below as being "hydrocarbon", "functionalized hydrocarbon" or "alkyl" chains of length "$C_n$ to $C_m$", but it is to be understood that such chains may be straight, branched, or cyclic, saturated, monounsaturated, or polyunsaturated, and may be aromatic.

Preferred surfactants include the cationic surfactants CTAC, Arquad® 16-50, Arquad®® T-50, Arquad® 18-50, Arquad® S-50, and EHAC, the zwitterionic surfactants erudicylamidopropyl betaine, Mirataine® BET-E-40, and oleylamidopropyl betaine Mirataine® BET-O-30. The more preferred in this group are Arquad® 16-50 and Arquad® T-50.

Mixtures of one or more of the above listed cationic surfactants with one or more anionic co-surfactant, for instance an alkyl aryl sulfonate are also contemplated. For example, a mixture containing a quaternary ammonium chloride, a bishydroxyethyl methyl alkyl ammonium chloride, and an alkyl aryl sulfonate can be a suitable mixture for use as drag reducing surfactant. One such mixture, a proprietary "quat" has been studied in combination with drag reduction enhancers (polymeric and/or monomeric), and been also found to be an effective drag reducing surfactant.

Useful "polymeric drag reduction enhancers" include relatively low molecular weight polymers, which are not capable alone of providing any drag reducing activity in aqueous fluids, but when used in the presence of one or more drag reducing surfactant(s), they strongly enhance the surfactant's performance, increase the drag reduction, increase the low shear rate fluid viscosity, and as a result provide better particle transport capability.

Useful examples for combination with cationic and zwitterionic drag reducing surfactants include Daxad® 16L and Daxad® 17. Daxad® 17 is a solid material which is a polycondensation product of sodium naphthalene sulfonate with formaldehyde, having a molecular weight of about 2000-3000 Da. Daxad 16L is a 50% aqueous solution of Daxad® 17. Therefore, both products have the same molecular weight.

Without wishing to be limited by theory, it is believed possible that the anionic nature of these compounds is responsible for the increase in drag reduction for cationic, amphoteric, and zwitterionic drag reducing surfactants. It is believed that the anionic character of these molecules allows for a nonpermanent surface charge neutralization by the elongated (or worm like) surfactant micelles (and vice versa). It is believed that one of these low molecular weight polymeric molecules acts as an adsorption center for various worm like micelles, with an effect equivalent to a crosslinking of the micelles. As noted, infra, it is expected that a crosslinked micelle exhibits a higher elasticity, as does a crosslinked polymer.

The drag reducing properties of polymers, and the effect of the polymer molecular weight, may relate to the elastic behavior of the polymer, is a mechanism of energy dissipation that translates into a lower horsepower requirement to pump the fluid (and therefore a higher drag reduction).

Suitable polymeric drag reduction enhancers to be used with cationic drag reducing surfactants are preferably of anionic nature. Both cationic and anionic polymeric drag reduction enhancers are believed to be suitable for use with amphoteric, and zwitterionic drag reducing surfactants, but nonionic polymeric drag reduction enhancers are preferred. Tests similar to those described below in the Examples may be used to determine which combinations of polymeric drag reduction enhancer(s) and drag reducing surfactant are most suitable.

In addition to Daxad® 16L and Daxad®17, other compounds with similar molecular weights but different neutralizing salts (for example, potassium, ammonium and calcium) may also be used. Compounds of this type include Daxad® 11, Daxad® 11G, Daxad® 11KLS, Daxad® 15, Daxad® 15R, Daxad® 14C, and Daxad® 16LR.

Somewhat higher molecular weight compounds, e.g., those having molecular weights of from 10,000 to 20,000, of the same type would also be effective, such as Daxad® 19, Daxad® 19LS, Daxad® 19LCAD, Daxad® 819LS, Daxad® 19L42, Daxad® 19LLS, Daxad® 19LCA, and Daxad® 19LKN. Similar compounds from alternative suppliers may be used. The purity of the naphthalene sulfonate used in the polymerization can have some impact on the drag reducing capability of the SFR, so can the metallic counterion from the neutralization of the sulfonate group, (sodium, calcium, or potassium), and the content of sulfate ion in the product.

Copolymers obtained by formaldehyde condensation of naphthalene sulfonate with other monomers such as phenol, alkylated phenols, bisphenols of various structures such as bisphenol F (formaldehyde), or bisphenol A (acetone), etc. may also be used, whether obtained by acid or by base catalysis.

Copolymers obtained by melamine condensation of naphthalene sulfonate with other monomers such as phenol, alkylated phenols, bisphenols of various structures such as bisphenol F (formaldehyde), or bisphenol A (acetone), and the like, and lignosulfonates may also be used as polymeric drag reduction enhancers.

Other sulfonate-containing low molecular weight, non drag reducing polymers that can be used include vinyl benzene sulfonate and AMPS copolymers. Also useful are polycarbonates, epoxy resins and other polymers that have been functionalized with a sulfonate, carboxylate, phosphate or sulfate group to render them water soluble. The sulfonate group in any of the sulfonate polymer examples listed above, may be replaced by other anionic structures such as carboxylates, phosphates, or sulfates. The effect of the polymer bulkiness, the linear, or branched character of the polymer, the presence or absence and the degree of internal crosslinking, and the persistent length of the polymer will all have an effect on the drag reducing enhancement provided by the oligomer or polymer selected and should be tested according to the procedures described herein.

Also useful as polymeric drag reducing units are low molecular weight negatively charged polysaccharides such as carboxymethyl cellulose, carboxymethyl guar, carboxymethylhydropypropylguar and the like as well as low molecular weight, water soluble, maleic anhydride copolymers, such as DAXAD® 31, or sodium methacrylate polymers and copolymers such as Daxad® 30, ammonium methacrylate polymers and copolymers such as Daxad® 32, can also be used.

Useful polymeric drag reducing enhancers for anionic surfactants are low molecular weight polymeric structures, similar to those described above, where cationic charges instead of anionic charges are present in the polymer backbone, or in the side chains. Therefore, structures where the sulfonate group in the previous examples is replaced a chemical structure of cationic nature such as for instance —$CH_2CH_2N^{(+)}(CH_3)_3Cl^{(-)}$, (ethyl trimethyl ammonium chloride) are useful polymeric drag reducing enhancers.

In addition, structures where the sulfonate group in the previous examples is replaced a polymeric, monomeric or tertiary amine structure that can be converted to cationic ammonium salts at low pH by protonation of the nitrogen lone electron pair also provide suitable polymers. Cationic polymers or copolymers tailored to the suitable low molecular weight required to perform as polymeric drag reduction enhancers in combination with anionic drag reducing surfactants can be those obtained by radical polymerization of dimethylamino ethyl methacrylate (DMAEMA), 2-(methacryloyloxy)-ethyltrimethylammonium chloride (MADQUAT), methacrylamidopropyl trimethyl ammonium chloride (MAPTAC), or diallyldimethylammonium chloride (DADMAC). Other suitable polymers that can perform as polymeric drag reduction enhancers in combination with anionic drag reducing surfactants are cationic polysaccharides such as cationic guar or cationic starch, or some epichlorohydrin condensation resins such as aminopolyamide-epichlorohydrin resins, or polyamine-epichlorohydrin resins.

Other low molecular weight polymers that are not capable alone of providing any drag reducing activity in aqueous solutions, but which in the presence of one or more drag reducing zwitterionic or amphoteric surfactant(s), strongly enhance the surfactant's performance, increasing the drag reduction, increase the low shear rate fluid viscosity, and as a result provide better particle transport capability include non-ionic polymers such as partially hydrolyzed polyvinyl acetate copolymers, polyvinyl alcohol and copolymers, polyethylene oxide and copolymers, polypropylene oxide and copolymers. Particularly suitable examples of such polymers include a polyvinyl alcohol copolymer sold under the trade name Alcotex® WD100. Other examples of such polymers include those low molecular weight water soluble polyampholites containing both positive and negative charges, obtained by copolymerization of at least one cationic monomer and one anionic monomer, and optionally other charged or non charged monomers.

Useful monomeric drag reduction enhancers include certain uncharged organic compounds, such as urea and urea derivatives, and certain charged organic compounds (also called counterions) such as the salicylate ion, that can help enhance the drag reduction properties of a given surfactant either in the presence or absence of polymeric drag reduction enhancers. Urea, and urea derived compounds such as N,N dimethyl urea, N,N'dimethylurea, or N,N diethyl urea, and the like are useful as monomeric drag reduction enhancers in SFR fluids of the invention.

Organic ionic compounds such as sodium salicylate can also be used as monomeric drag reduction enhancers for a variety of drag reducing surfactants and surfactant mixtures. Other useful ionic compounds include sodium para-toluene sulfonate, sodium xylene sulfonate, sodium naphthalene sulfonate, sodium phthalate, sodium citrate, sodium EDTA, sodium methane sulfonate, sodium perfluouromethane sulfonate, sodium malonate, sodium fumarate, sodium adipate, etc. Other anions that may be used include chelating agents such as EDTA salts, chlorinated salicylates, alkylated salicylates, chlorinated phthalates, alkylated phthalates, alkyl sulfonates, alkyl sulfates, alkyl aryl sulfonates, alkyl aryl sulfates, ethoxylated alkyl sulfonates, ethoxylated ethoxylated alkyl sulfates, ethoxylated alkyl aryl sulfonates, or ethoxylated alkyl aryl sulfates. Salts of abietic acid (also known as abietinic acid or sylvic acid, $C_{19}H_{29}COOH$), may also be used, as may other similar materials, such as fulvic acid salts. Potassium or ammonium salts of these anions will be effective, as would other salts of simple cations.

In order to enhance the drag reducing capability of anionic surfactants, cationic counterions of similar size are used, such as small quaternary ammonium salts such as tetramethyl ammonium chloride, methyl pyridinium chloride, alkyl benzyl dimethyl ammonium chloride, and the like.

The monomeric drag reduction enhancers can be true monomers, or they can be oligomers of the polymeric drag reduction enhancers, whereas suitable polymeric drag reduction enhancers can be polymers formed by appropriate polymerization reactions of monomeric drag reduction enhancers. For example, sodium naphthalene sulfonate is a suitable monomeric drag reduction enhancer counterion and sodium polynaphthalene sulfonate is a suitable polymeric drag reduction enhancer.

It has been found that many, if not most preferred polymeric and monomeric drag reduction enhancers contain at least one aromatic structure.

Drag reducing properties can be obtained from SFR fluid formulations comprising the surfactants of the invention and further comprising at least one acid. In particular, SFR fluid formulations comprising an amine derivative (primary, secondary or more preferably a tertiary amine), and a sufficient amount (at least more that the stoichiometric amount of amine in the formulation) of an acid strong enough to partially or fully protonate the nitrogen's lone electron pair provide friction reduction while being pumped through the casing and tubulars and also provide with reduced friction pressure in propagating fractures.

When such an acid containing fluid contacts a basic environment, the acid component can be totally or partially neutralized, and the SFR fluid can lose its drag reducing properties, and its suspending properties. Examples of basic environments include a basic fluid in the formation (a naturally occurring fluid or a fluid that has been pumped into the formation prior to the SFR treatment), a basic component subsequently released into the fluid, or a portion of a reservoir having a basic nature, such as a carbonaceous rock or a carbonate containing sandstone, shale or coalbed, This degradation mechanism can be used advantageously to provide diversion driven by proppant bridging, providing proppant settling and plugging of natural fractures, or friction pressure differences inside fractures leading to fluid diversion, by selectively or timely triggering the degradation of the fluid drag reducing properties.

Other known compounds and adjuvants can be used in fluids of the invention, provided that the appropriate compatibility and performance studies are carried out in advance. Co-surfactants, brines, co-solvents, can be used in combination with the SFR fluid of the invention. In general, suitable co-surfactants are surface active materials not capable of providing significant drag reduction when pumped alone or in combination with the polymeric or monomeric drag reduction enhancers of the invention.

Suitable co-solvents include isopropyl alcohol, glycerol, ethylene glycol, propylene glycol, ethylene glycol monomethyl ether, and ethylene glycol monobutyl ether.

EXAMPLES

The following examples have been prepared to show some of the properties of the formulations and treatments of the invention. In the examples where friction or drag reduction is depicted, the measurements have been carried out in a friction loop. The friction loop consists of a high flow rate triplex pump and a pipe grid where the fluid is pumped through a series of pipes of different external diameters, (OD) namely, ½" (12.7 mm), and ⅜" (9.52 mm). A mass flowmeter (MicroMotion Elite) was used to measure the flow rate, fluid density and fluid temperature in real time. Each pipe size had a dedicated differential pressure transducer (Rosemount 3051 SMART) that was used to measure the pressure drop across a 6 foot (1.83 m) long section of the pipe. In addition, each pipe was at least 14 feet (4.27 m) in length, a pipe section of sufficient length to prevent flow entry effects such as non fully develop flow regime in the pressure measurement section of the pipe. The fluids were re-circulated through the pipes to the pump feed tank. It is understood that unless specifically stated all laboratory measurements were carried out at 25 degC. (77 degF.).

Comparative Example 1

A concentrated conventional drag reducing formulation, labeled CFR1 containing a 28% of active vinyl polymer, was diluted in water and pumped at three different concentrations (0.5 ml/L; 1.0 ml/L; and 2.0 ml/L) in the friction loop described above, and the pressure difference obtained when pumping the fluid at various mass flow rates over a straight section of 1.83 m (6 ft) of a 9.53 mm (3/8") external diameter stainless steel tube was compared with that of water under the same conditions. As shown in FIG. 1, a maximum drag reduction (% DR) of approximately 65% was obtained for all three concentrations of CFR in water. The Figure also shows that higher CFR concentrations are required to maintain the % DR at its highest level at high flow rates. This Example will be used as a benchmark for the SFR fluids of the invention in terms of the suitable % DR required to be able to pump slick water treatments Example 2

Figure 2:
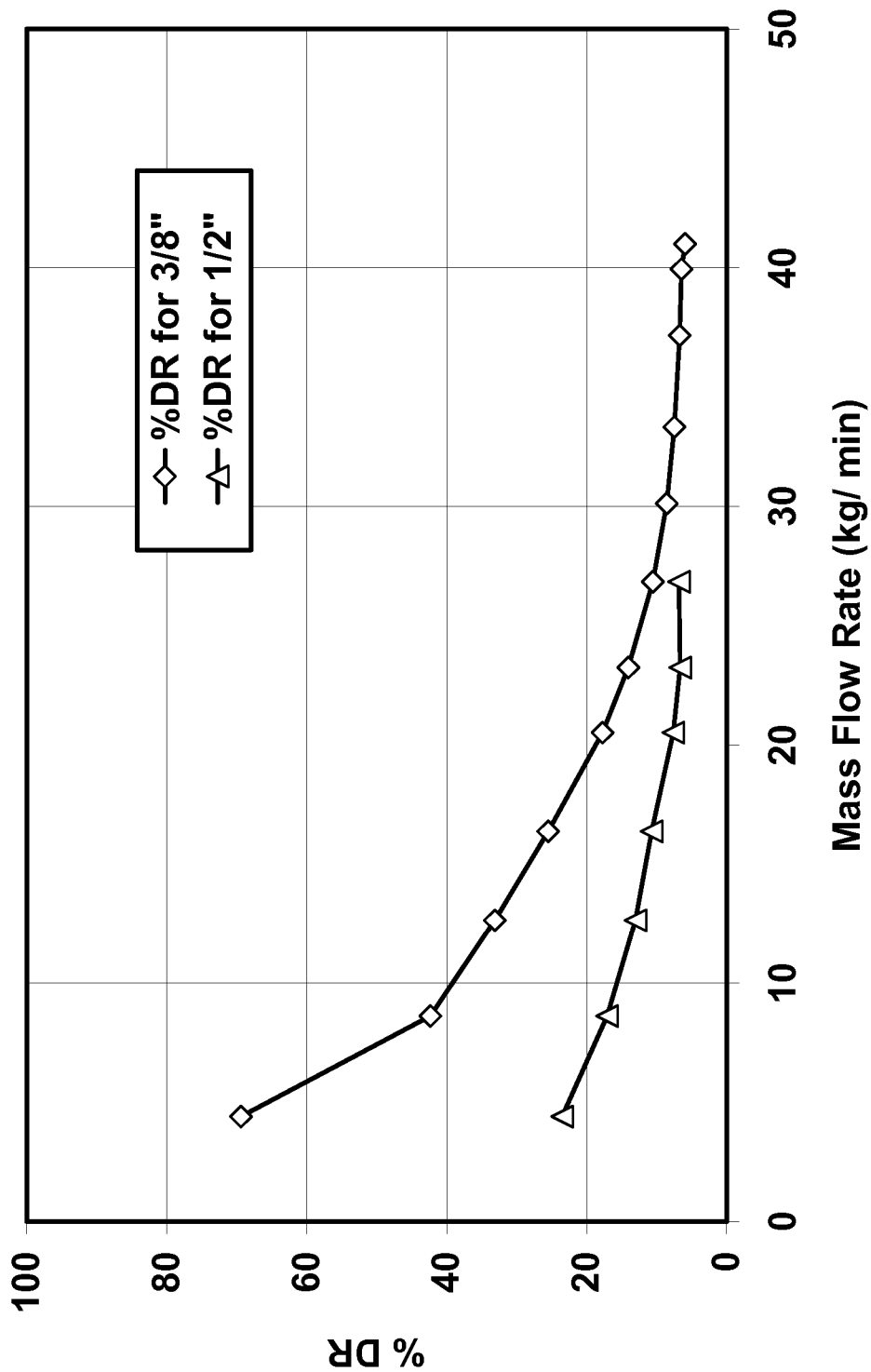
FIG. 2 is a plot of percentage drag reduction versus mass flow rate for a low concentration fluid comprising a common viscoelastic surfactant fluid.

A solution of a viscoelastic surfactant fluid concentrate containing about 61% EHAC (erucyl bis(2-hydroxyethyl) methyl ammonium chloride), 13.5% propane-1,2-diol, 20.5% isopropanol, and 5% water, was diluted in a 2% KCl brine at 5 ml/L (gpt) and pumped in the friction loop at various mass flow rates. As shown in FIG. 2, the VES formulation showed moderate drag reduction for both a 12.7 mm OD (½ inch) and a 9.53 mm OD (3/8 inch) pipes, as compared to brine. Comparison of Example 2, Example 3 and others shows that optimum friction reduction can be obtained with SFR formulations containing much lower concentrations of surfactant than typically required for non-foamed viscoelastic fracturing fluids.

Example 3

Figure 3:
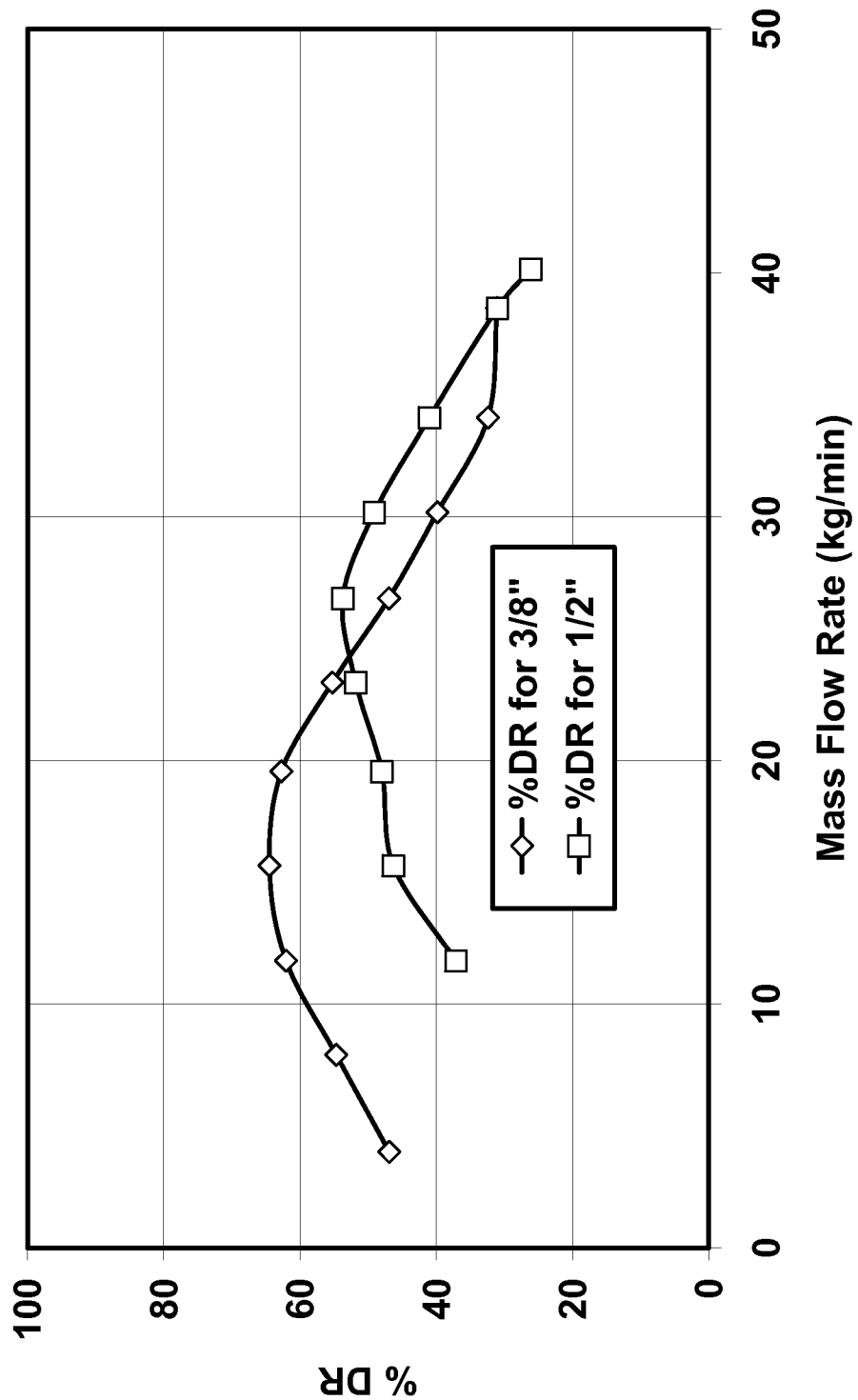
FIG. 3 shows is a plot of percentage drag reduction versus mass flow rate for a fluid comprising a common viscoelastic surfactant fluid at typical concentrations used in fracturing applications.

A solution of the same VES concentrate used in Example 2 was pumped at 15 ml/L (gpt) in 4% KCl brine and exhibited improved drag reduction for both a 12.7 mm OD (½ inch) and a 9.53 mm OD (3/8 inch) pipes, as compared to brine, as shown in FIG. 3.

Example 4

Figure 4:
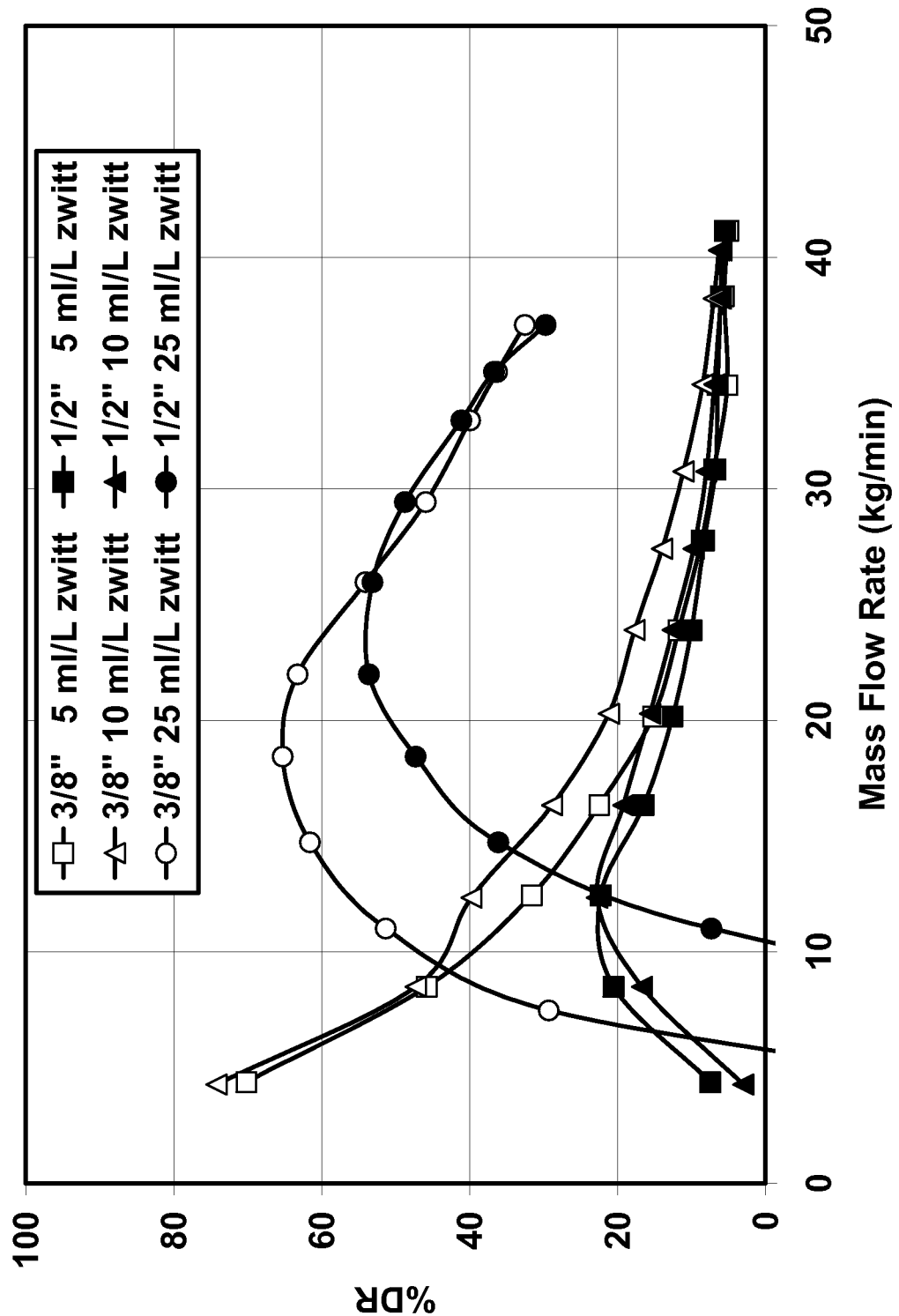
FIG. 4 is a plot of percentage drag reduction versus mass flow rate for various concentrations of a common viscoelastic surfactant fluid.

Fluids made with a concentrate of a zwitterionic VES containing about 22% isopropanol, 5% sodium chloride, 32% water, 32% erucic amidopropyl dimethyl betaine, and 1% sodium polynaphthalene sulfonate (Daxad® 16L)), designated "zwitt", having various concentrations of surfactant showed moderate improvement of drag reduction with increasing surfactant concentrations both a 12.7 mm OD (½ inch) and a 9.53 mm OD (3/8 inch) pipes, as shown in FIG. 4.

Example 5

Figure 5:
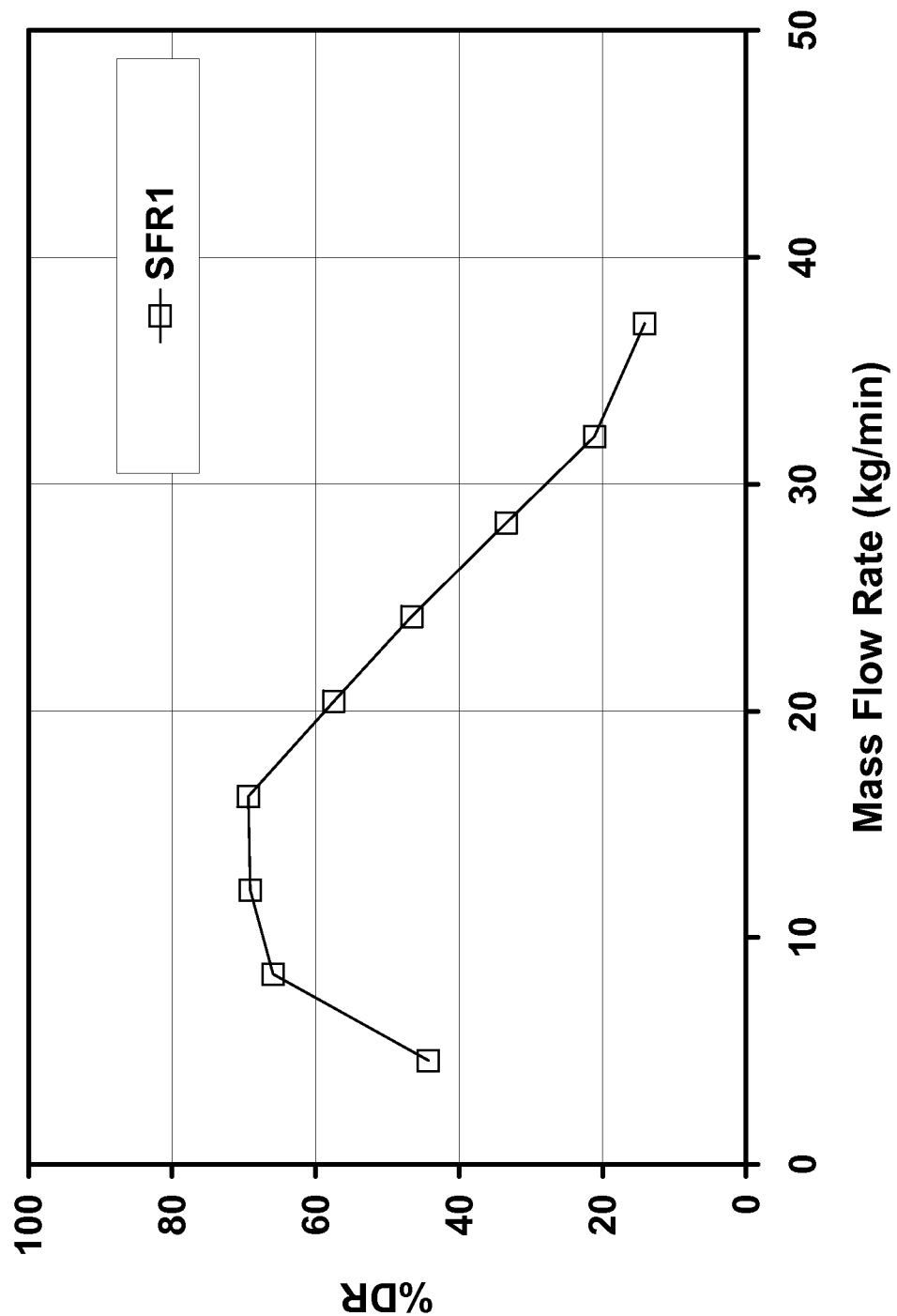
FIG. 5 is a plot of percentage drag reduction versus mass flow rate for a suspending friction reducer of the invention.

A solution of 7.5 ml/L of proprietary cationic formulation named in the foregoing "quat" (containing about, 8% propane-1,2-diol, 17-21% isopropanol, 20% water, 20-60% of a quaternary ammonium surfactant, and 10-30% of an alkylaryl sulfonate) was pumped in water together with 7.5 ml/L of a drag reduction enhancer composition designated "dragred 1", containing 25%±6% of urea, 40.5%±1.5% ammonium nitrate, and 34.5%±7.5% water. The fluid, designated "SFR1" showed good drag reduction for a 9.53 mm OD (3/8 inch) pipe, as compared to water, as shown in FIG. 5.

Example 6

Figure 6:
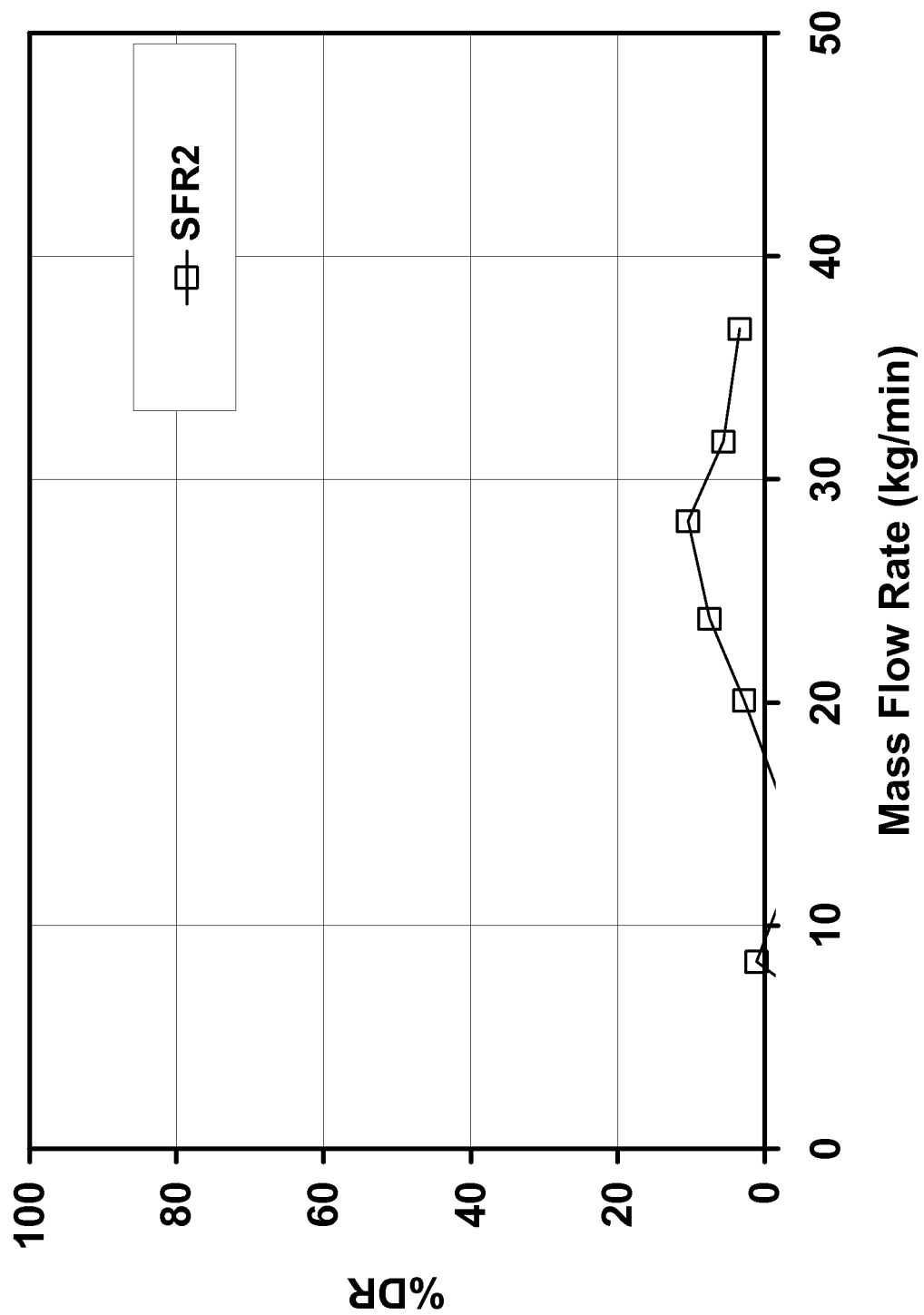
FIG. 6 is a plot of percentage drag reduction versus mass flow rate for a suspending friction reducer of the invention.

A fluid, designated "SFR2", comprising 7.5 ml/L of a concentrate of a zwitterionic surfactant, containing about 22% isopropanol, 5% sodium chloride, 32% water, 38% erucic amidopropyl dimethyl betaine, and 0.3 ml/L of a concentrate containing 10% of a proprietary PVA/PVOH drag reduction enhancer (diluted from ALCOTEX® WD100 from Synthomer Ltd, Harlow, UK) showed low to moderate drag reduction in a 9.53 mm OD (3/8 inch) pipe as shown in FIG. 6.

Example 7

Figure 7:
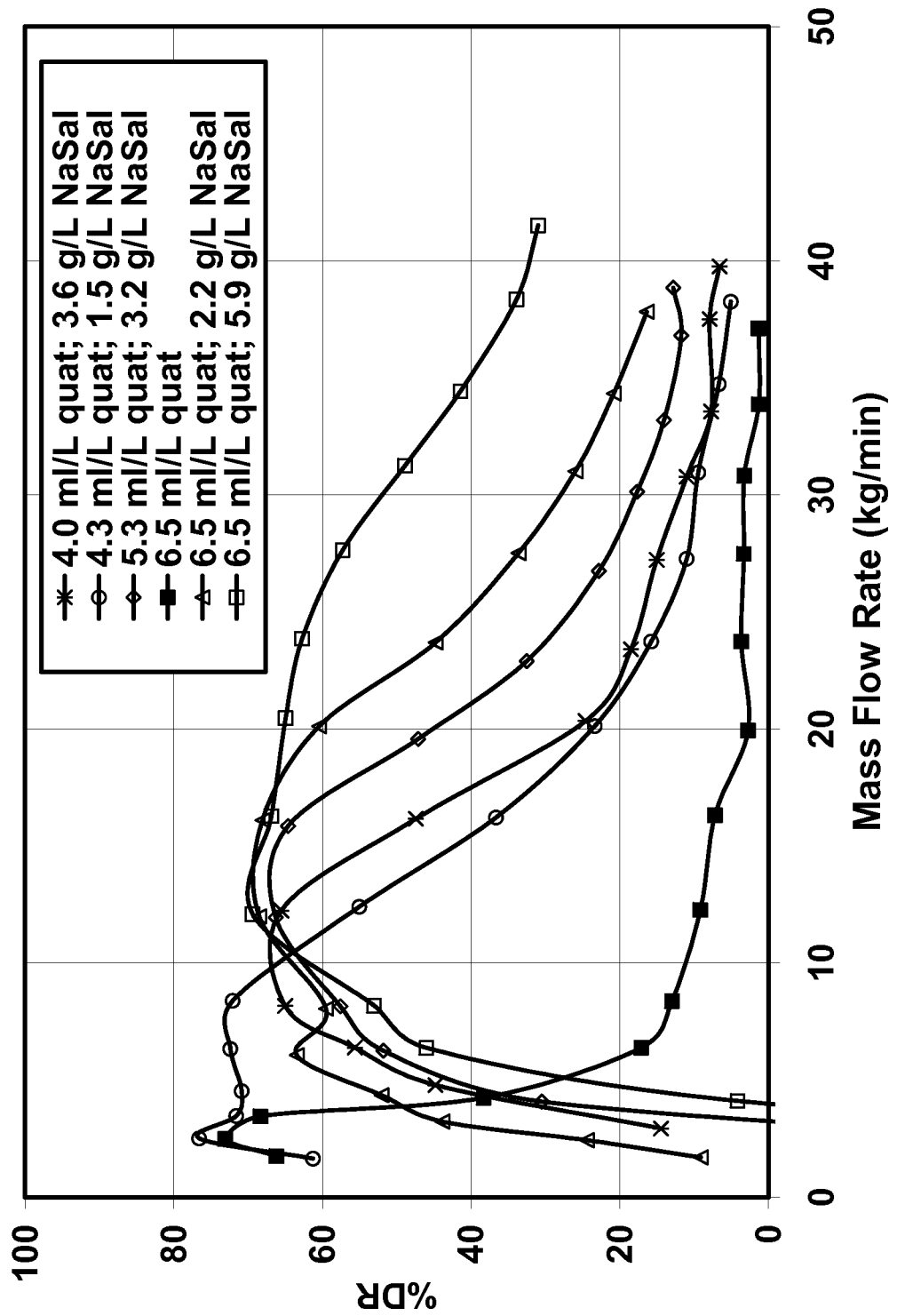
FIG. 7 is a plot of percentage drag reduction versus mass flow rate of various concentrations of suspending friction reducers.
Figure 8:
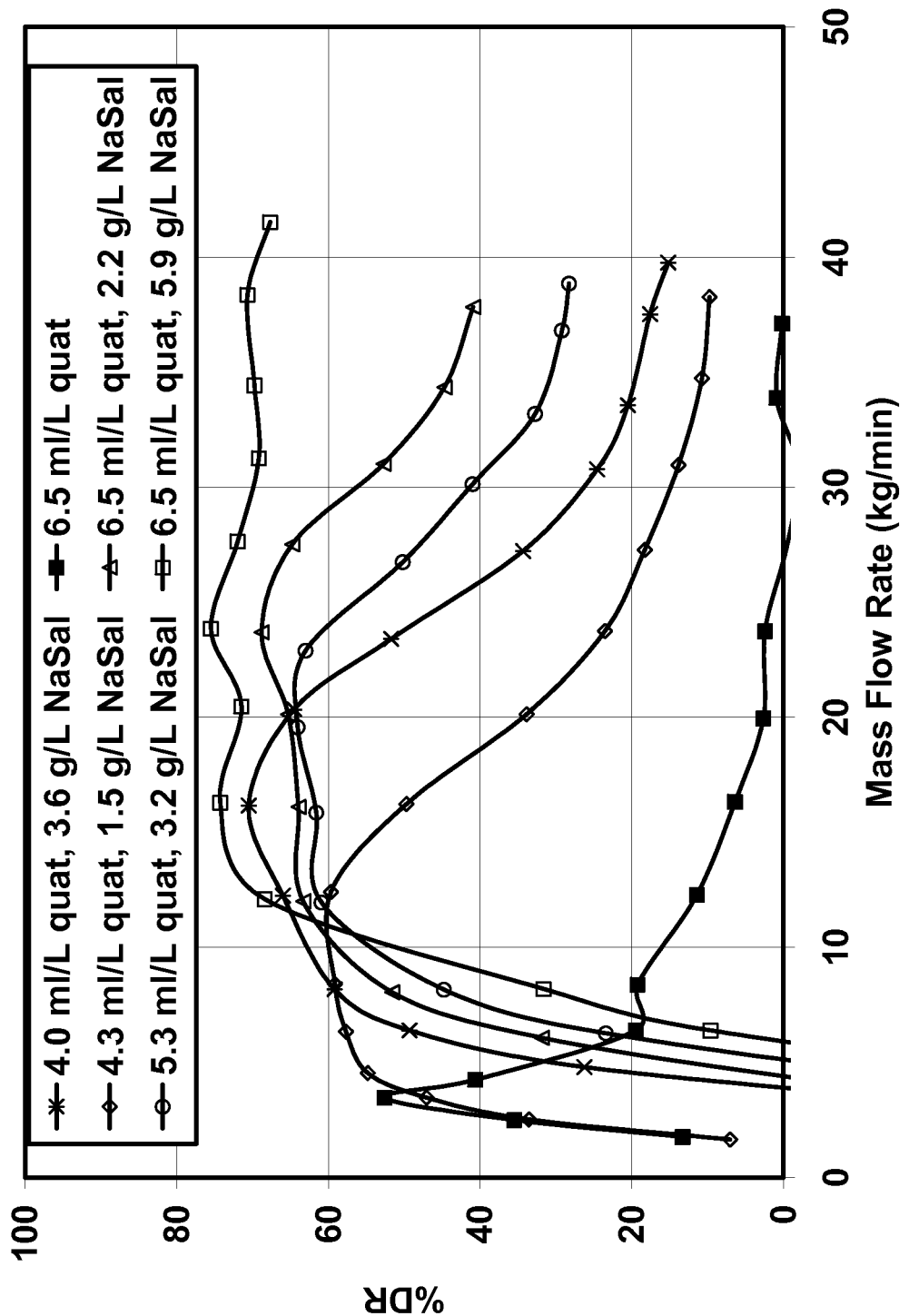
FIG. 8 is a plot of percentage drag reduction versus mass flow rate for various concentrations of suspending friction reducers.

Fluids made with the concentrate of example 5, a proprietary cationic formulation designated "quat", with various amounts of added sodium salicylate, NaSal showed improving drag reduction as the concentration of sodium salicylate increased for a given surfactant concentration in both a 12.7 mm OD (½ inch) and a 9.53 mm OD (3/8 inch) pipes, as shown in FIG. 7 and FIG. 8 respectively.

Example 8

Figure 9:
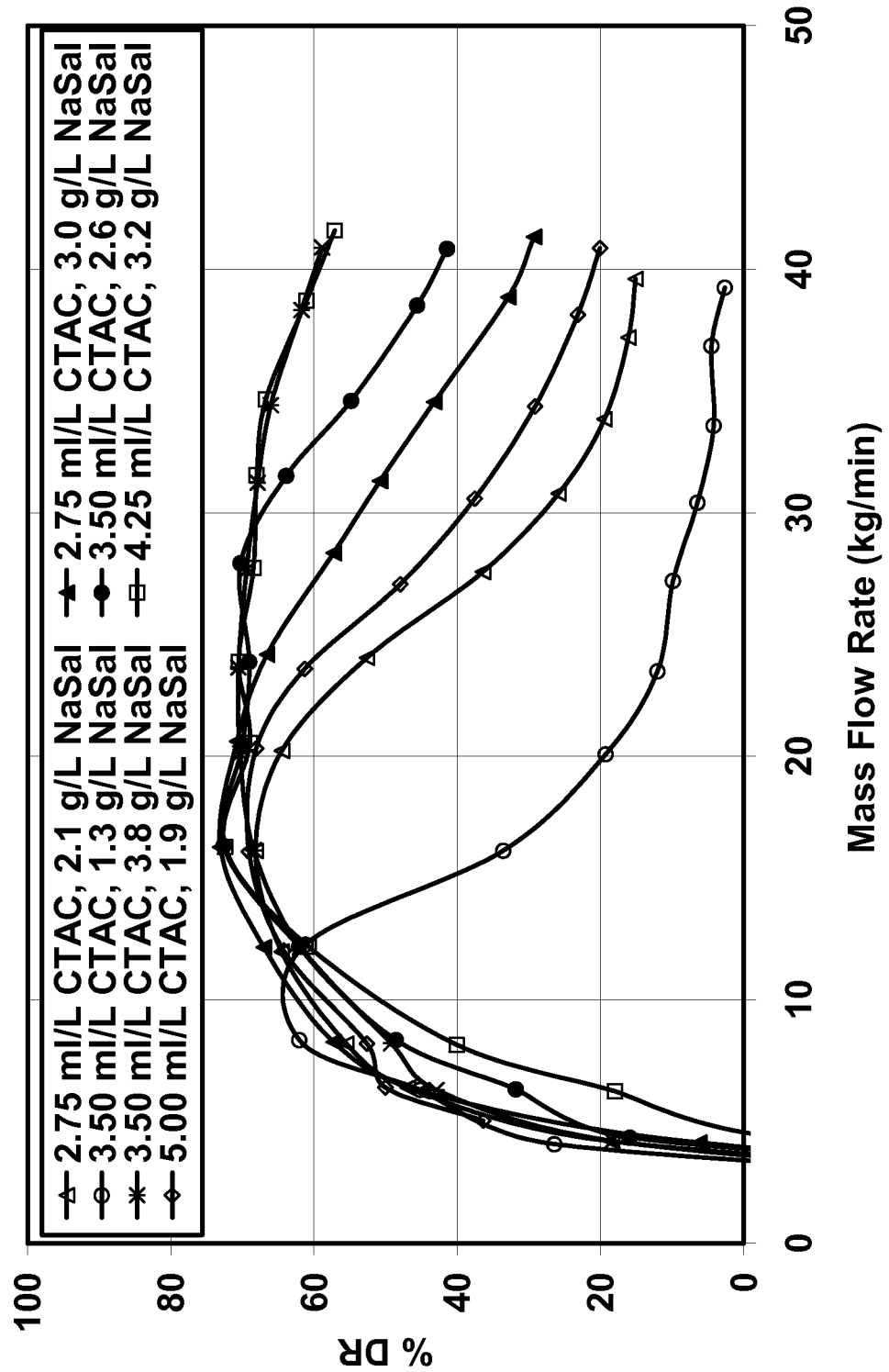
FIG. 9 is a plot of percentage drag reduction versus mass flow rate for various concentrations of suspending friction reducers.
Figure 10:
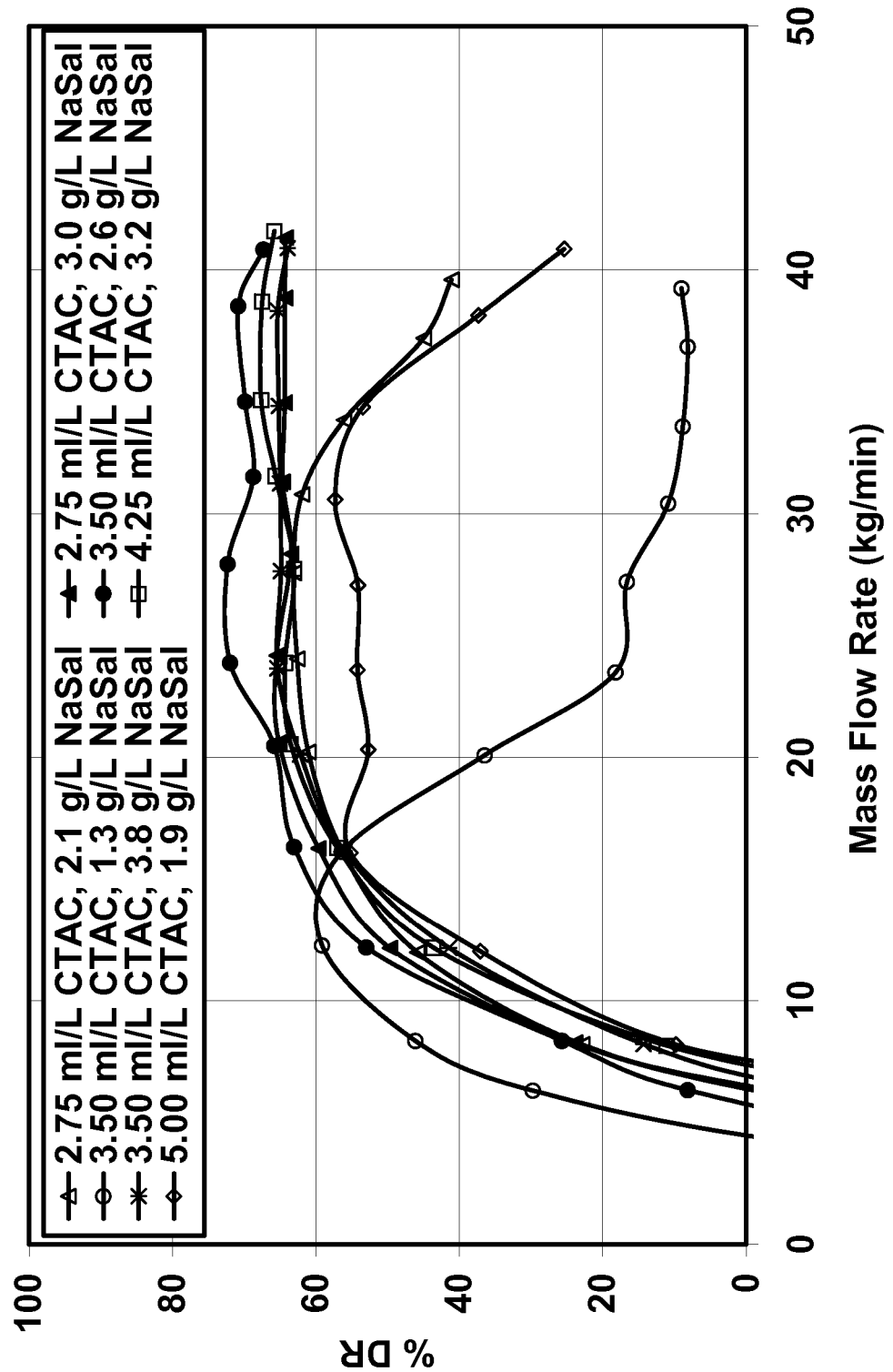
FIG. 10 is a plot of percentage drag reduction versus mass flow rate for various concentrations of suspending friction reducers.

A cetyltrimethyl ammonium chloride concentrate named in the foregoing CTAC, obtained as "Arquad® 16-50" from Akzo Nobel Surface Chemistry, of Stenungsund, (Sweden) was diluted in water to various surfactant concentrations and sodium salicylate NaSal concentrations. This formulation showed improved drag reduction as the surfactant concentration increased and as the concentration of sodium salicylate increased for a given surfactant concentration in both a 12.7 mm OD (½ inch) and a 9.53 mm OD (3/8 inch) pipes, as shown in FIG. 9 and FIG. 10 respectively.

Example 9

Figure 11:
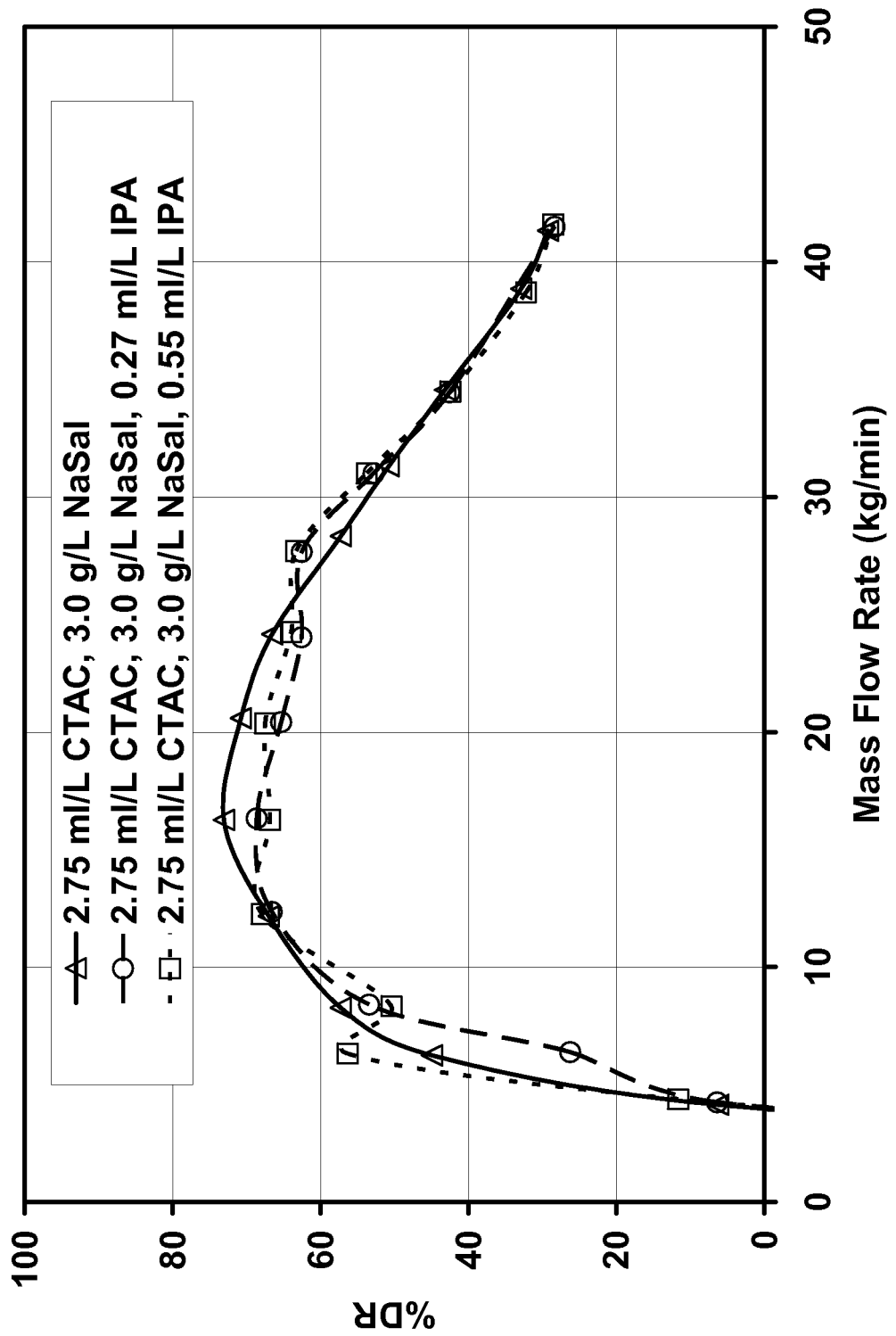
FIG. 11 is a plot of percentage drag reduction versus mass flow rate for a suspending friction reducer including a co-solvent.
Figure 12:
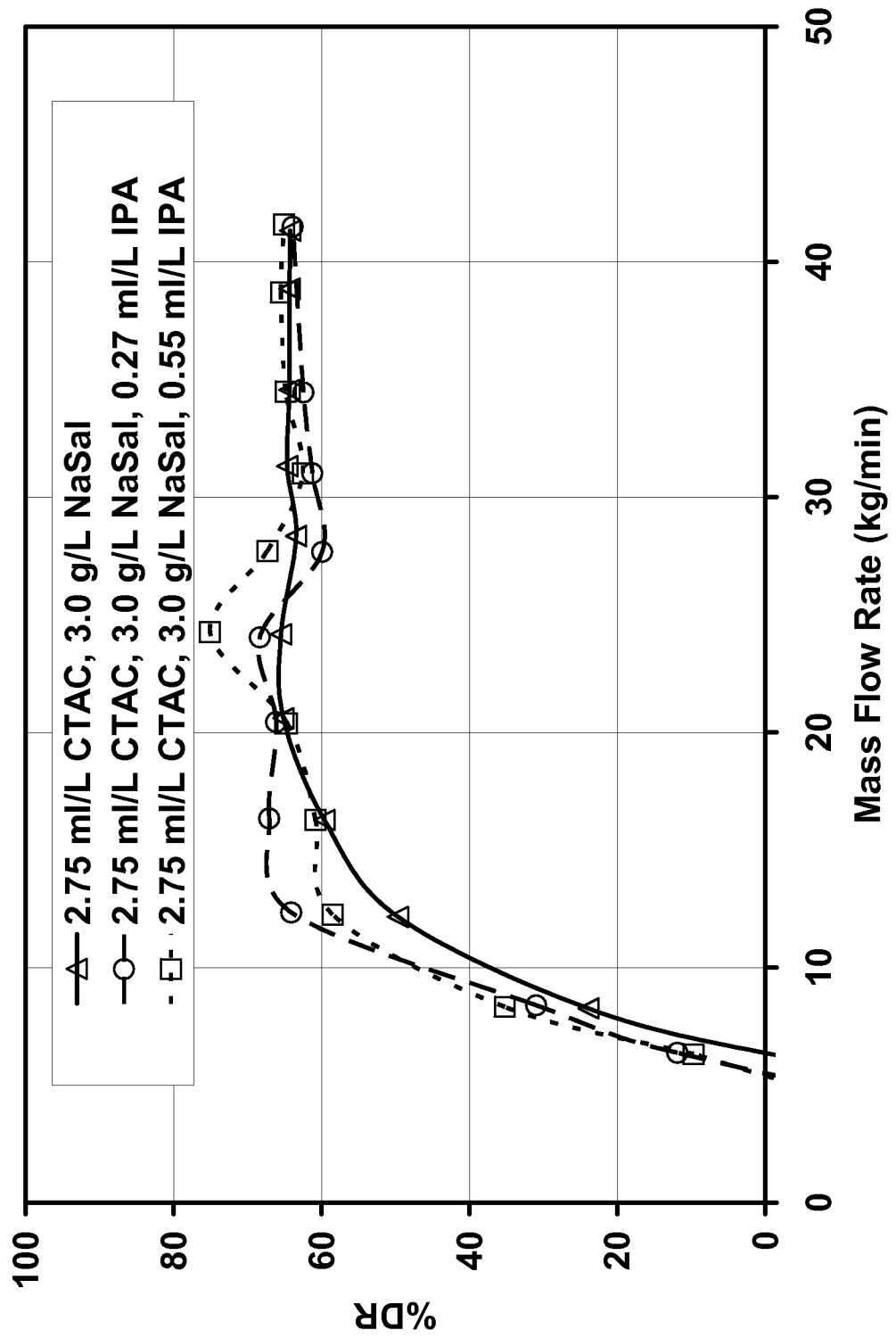
FIG. 12 is a plot of percentage drag reduction versus mass flow rate including a co-solvent.

The cetyltrimethyl ammonium chloride concentrate, CTAC of Example 8 was diluted in water at 2.75 ml/L surfactant concentration and 3 g/L NaSal were added to the fluid. It was determined that the % DR for this formulation was not affected by the addition of a co-solvent such as isopropanol, (IPA). % DR results are shown for both a 12.7 mm OD (½ inch) and a 9.53 mm OD (3/8 inch) pipes, as shown in FIG. 11 and FIG. 12 respectively.

Example 10

Figure 13:
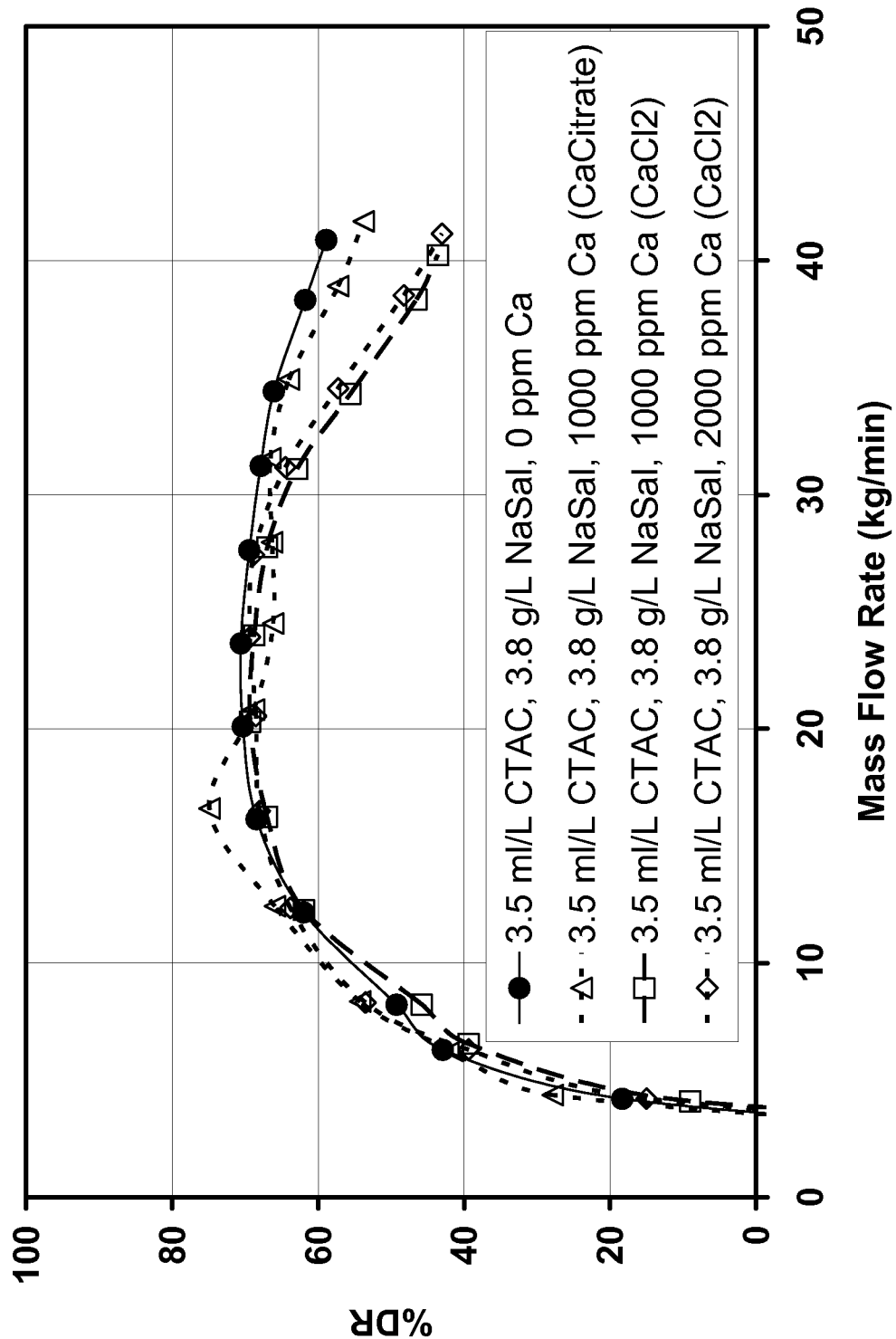
FIG. 13 is a plot of percentage drag reduction versus mass flow rate, plotting the effect of water calcium content on the friction reduction a suspending friction reducer.

The % DR of formulations containing 3.5 ml/L CTAC and 3.8 g/L NaSal were compared for various dissolved calcium ion concentrations (1000 ppm of $Ca^{2+}$ as Calcium citrate, 1000 ppm of $Ca^{2+}$ as $CaCl_2$ and 2000 ppm of $Ca^{2+}$ as $CaCl_2$). FIG. 13 graphically shows that high % DR can be obtained in the 9.53 mm OD (3/8 inch) pipe even in the presence of dissolved calcium.

In addition, some of the fluids of the invention provide effective drag reduction for water supplies of lower quality (produced water, pond water, high hardness water) which do not always allow for effective treatments when conventional polymeric drag reduction agents are used.

Example 11

Figure 14:
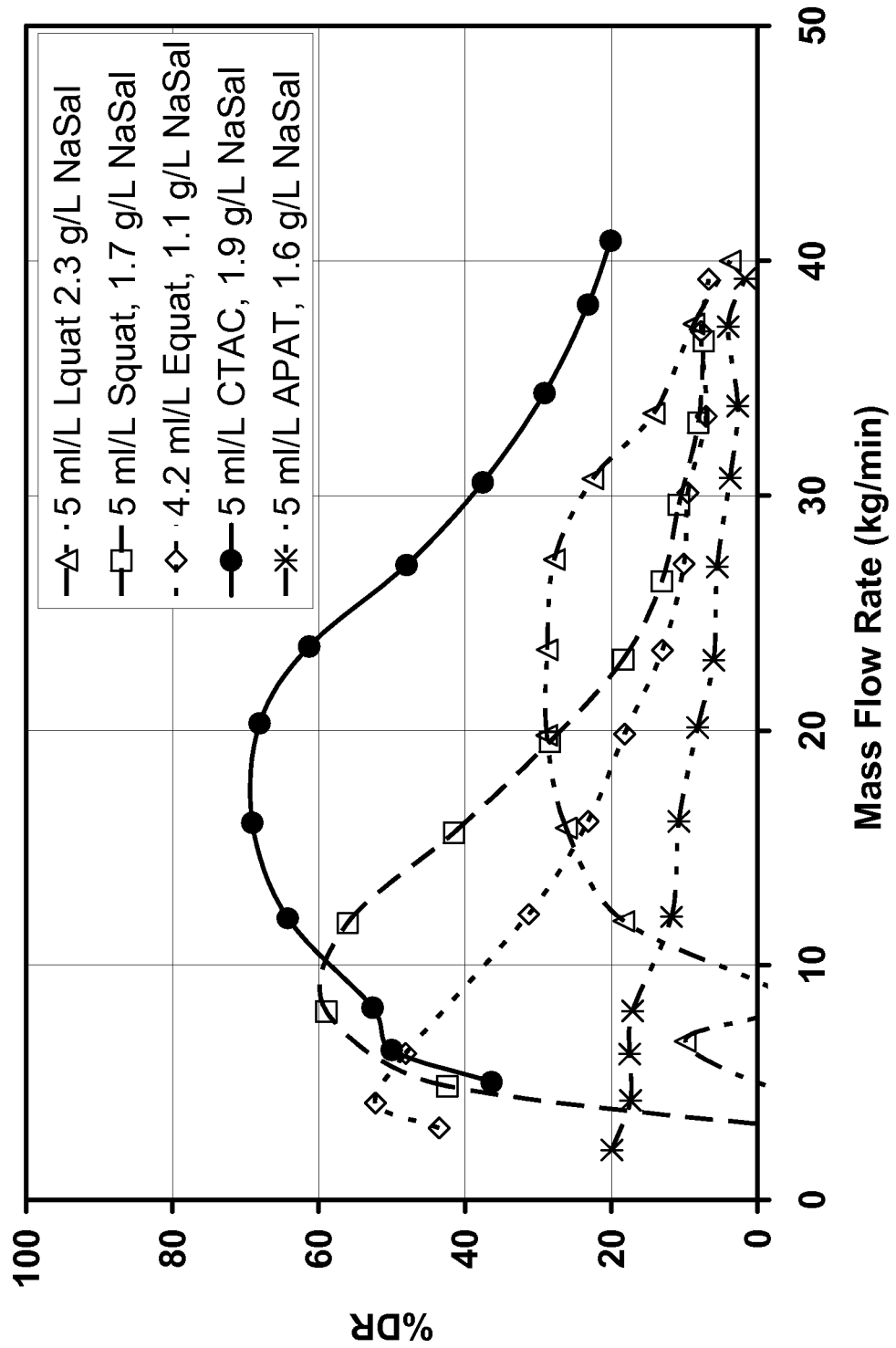
FIG. 14 is a plot of percentage drag reduction versus mass flow rate for various suspending friction reducer surfactants.

The % DR of formulations containing various cationic and amphoteric surfactants in combination with sodium salicylate was measured. Five different surfactants were compared: "Arquad® 12-50", a concentrate containing 50% active lauryl, trimethyl ammonium chloride, designated "Lquat"; "Arquad® 18-50", a concentrate containing 50% active stearyl, trimethyl ammonium chloride, designated "Squat"; "Arquad® 16-50", a concentrate containing 50% active cetyl, trimethyl ammonium chloride, designated CTAC; a proprietary formulation containing 61% erucyl bis(2-hydroxyethyl) methyl ammonium chloride), 13.5% propane-1,2-diol, 20.5% isopropanol, and 5% water, designated "Equat"; l and "Aromox® APA-T", a 40% proprietary amine oxide formulation from AKZO, designated "APAT". FIG. 14 shows that the choice of surfactant structure (the hydrocarbon chains and the hydrophilic head group) as well as the concentration can be optimized to improve the % DR that can be obtained in the 9.53 mm (⅜ inch) pipe.

Example 12

Figure 15:
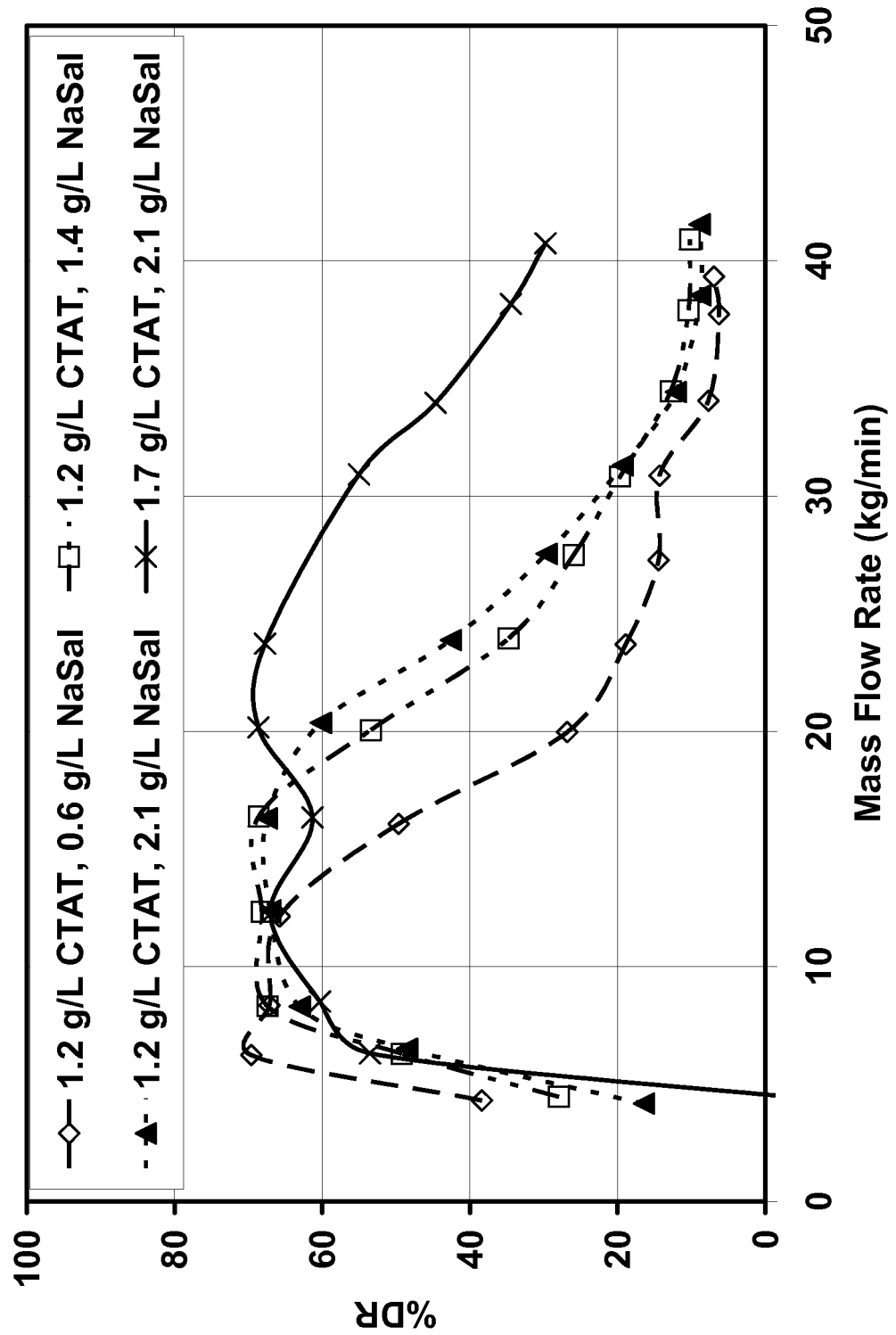
FIG. 15 is a plot of percentage drag reduction versus mass flow rate for various concentrations of suspending friction reducers.

A 100% pure cetyltrimethyl ammonium tosylate (toluensulfonate), designated CTAT and sourced from Aldrich; was diluted in water at various surfactant concentrations and various concentrations of sodium salicylate. These formulations exhibit good drag reduction for a 9.53 mm (⅜ inch) pipe, as shown in FIG. 15.

Example 13

Figure 16:
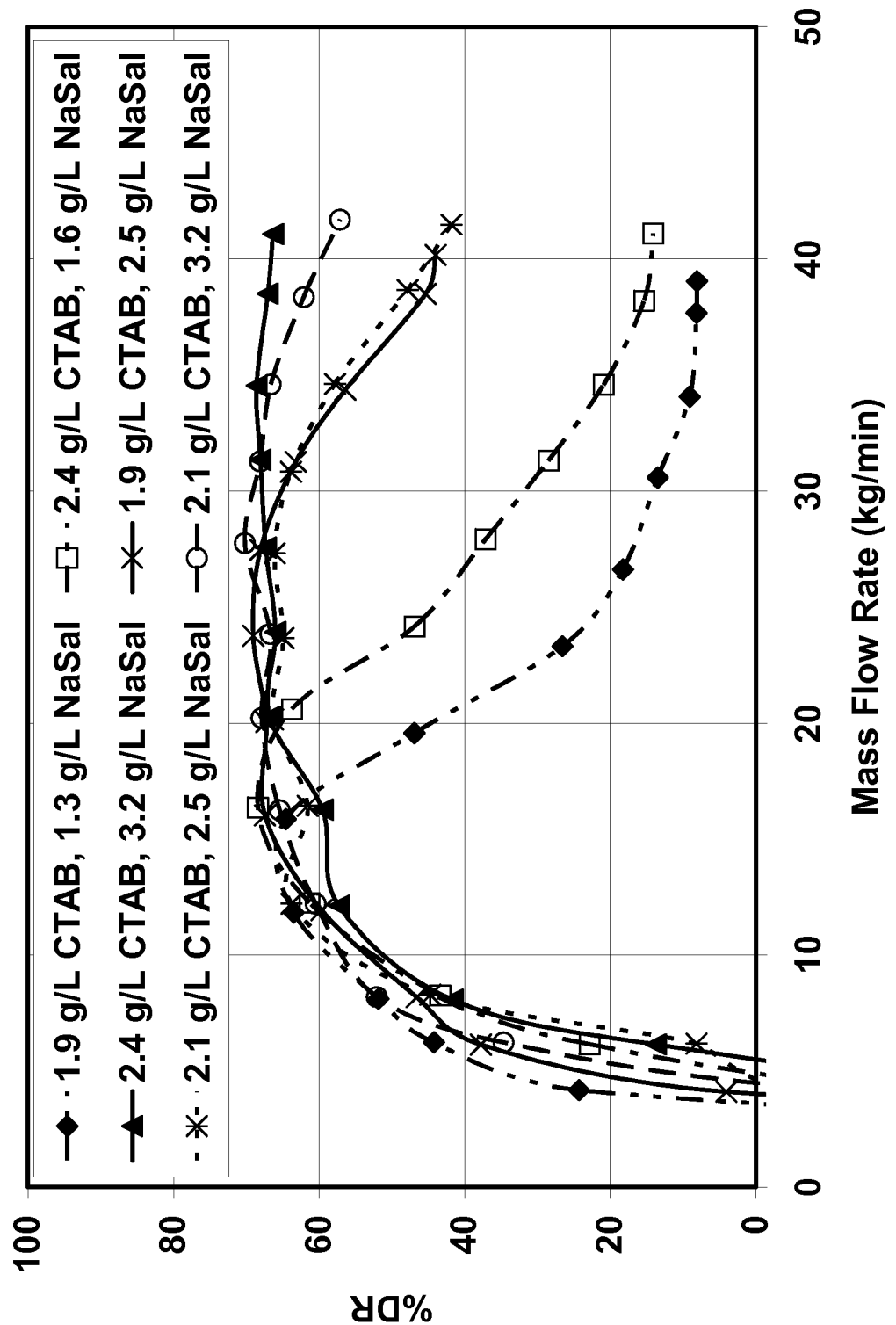
FIG. 16 is a plot of percentage drag reduction versus mass flow rate for various concentrations of suspending friction reducers.

A 100% pure cetyltrimethyl ammonium bromide, designated CTAB and sourced from Aldrich; was diluted in water at various surfactant concentrations and various concentrations of sodium salicylate These formulations exhibit good drag reduction for a 9.53 mm (⅜ inch) pipe, as shown in FIG. 16.

Example 14

Figure 17:
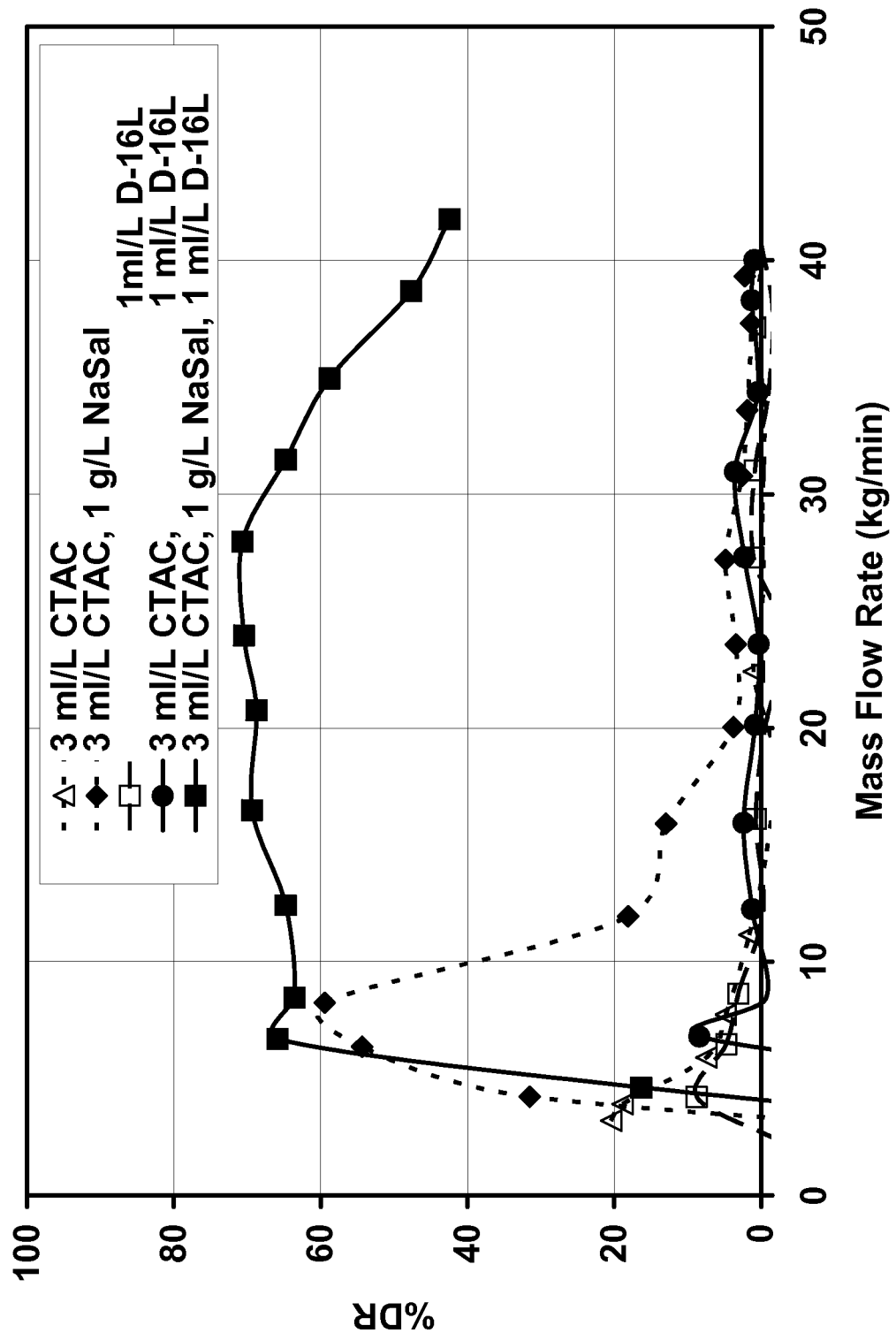
FIG. 17 is a plot of percentage drag reduction versus mass flow rate for various concentrations of suspending friction reducers.

Four formulations containing respectively: 3 ml/L CTAC; 3 ml CTAC plus 1 g/L NaSal; 1 ml/L Daxad® 16L, designated D-16L a product described in detail in Example 15; and 3 ml/L CTAC plus 1 ml/L D-16L; were compared to a formulation comprising 3 ml/L CTAC, plus 1 g/L NaSal plus 1 ml/L D-16L. The % DR obtained with this latter combination of CTAC, NaSal and D-16L is shown in FIG. 17 to have greatly improved when pumped in the 9.53 mm (⅜ inch) pipe Example 15

Figure 18:
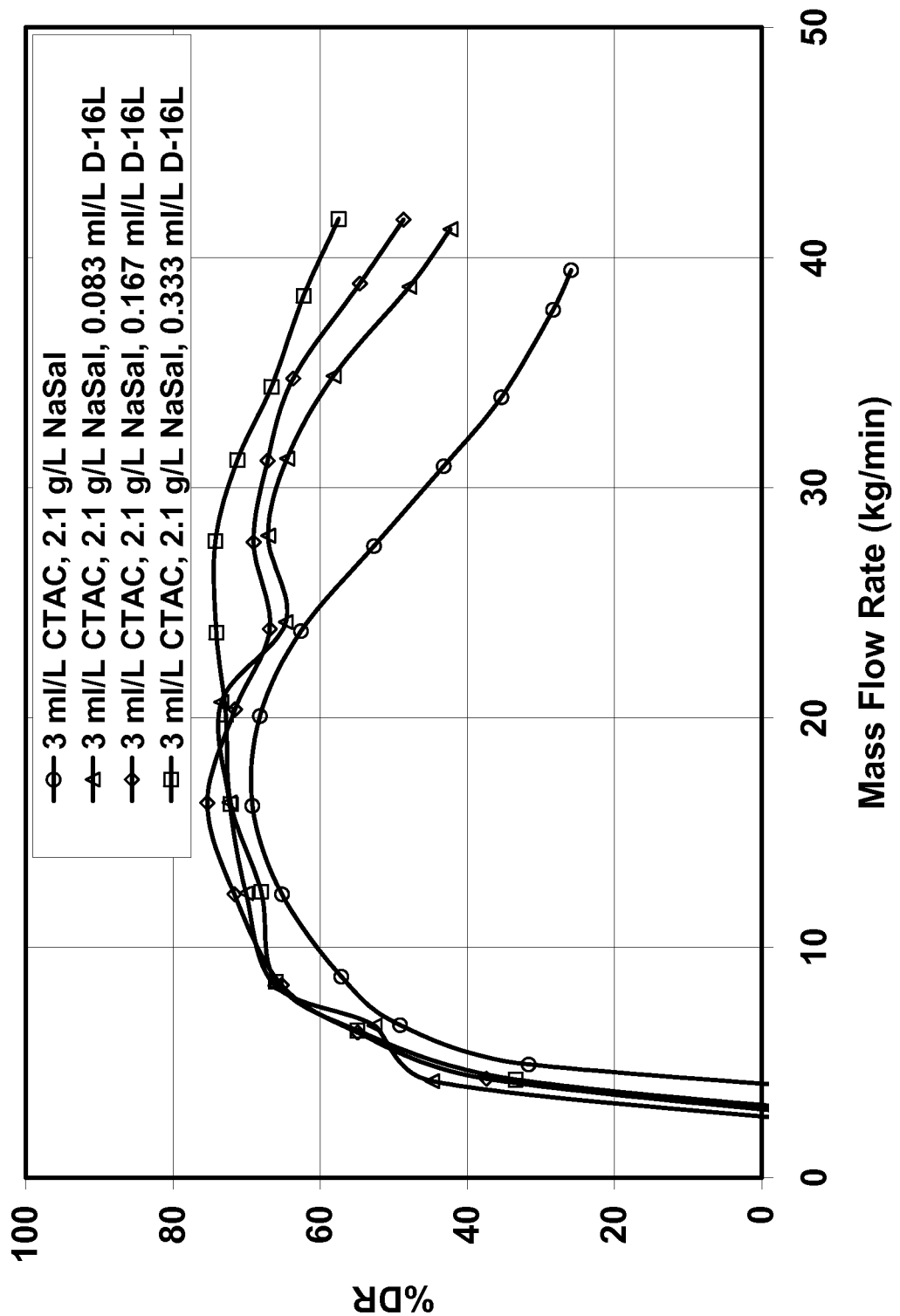
FIG. 18 is a plot of percentage drag reduction versus mass flow rate for various concentrations of suspending friction reducers.
Figure 19:
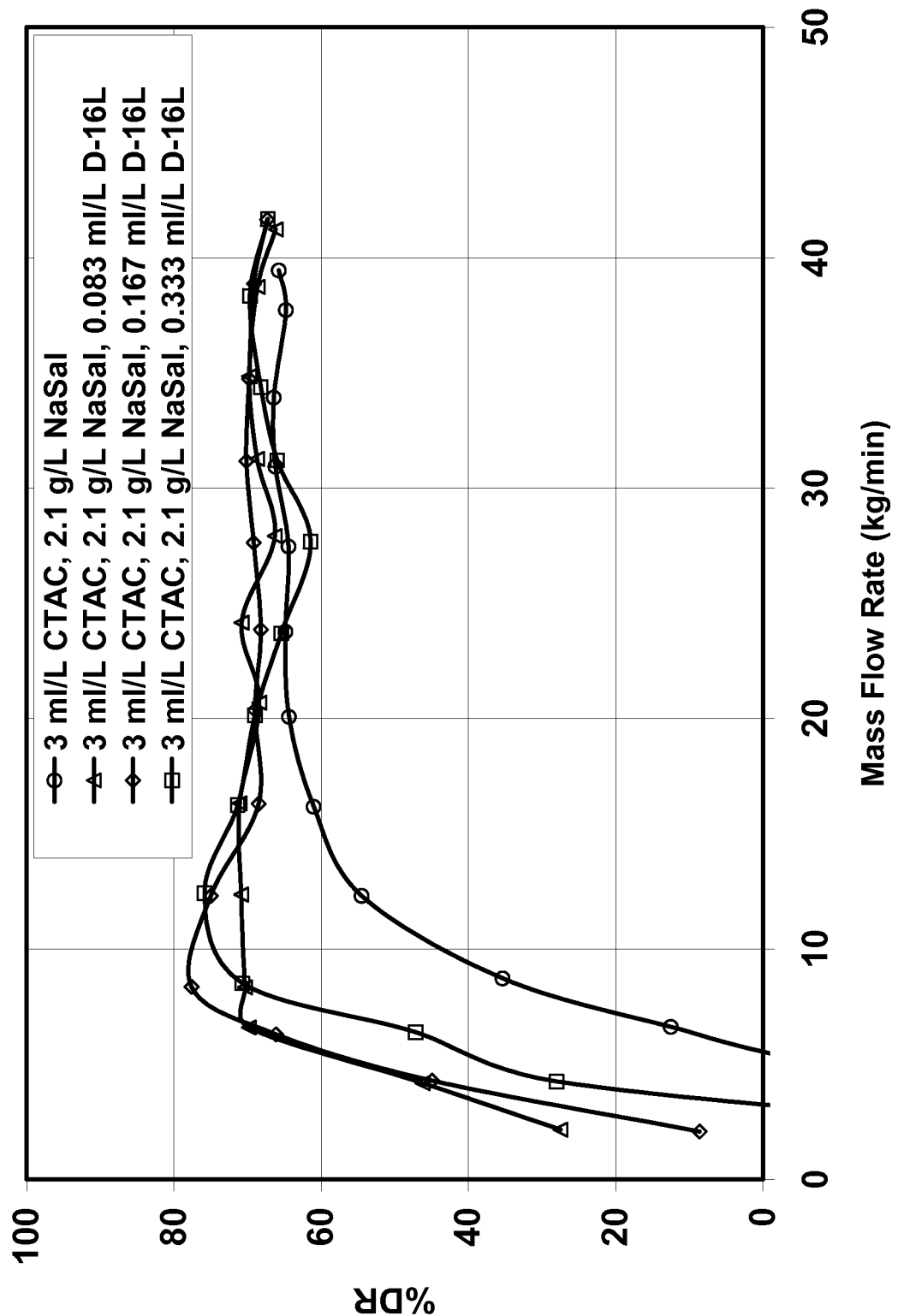
FIG. 19 is a plot of percentage drag reduction versus mass flow rate for various concentrations of suspending friction reducers.

The cetyltrimethyl ammonium chloride concentrate, CTAC of Example 8 was diluted in water at 3 ml/L CTAC and 2.1 g/L NaSal and various concentrations of a mixture of 25-47% sodium polynaphthalene sulfonate and <7% sodium sulfate in water (obtained as "Daxad 16L" from GEO Specialty Chemicals, Lafayette, Ind., U.S.A.), designated D-16L were added. These formulations significantly improved the drag reduction at significantly lower surfactant and sodium salicylate concentrations. Increasing the concentration of Daxad 16L further improved the drag reduction. Results are shown for both a 12.7 mm OD (½ inch) and a 9.53 mm OD (⅜ inch) pipes, in FIG. 18 and FIG. 19, respectively.

Example 16

Figure 20:
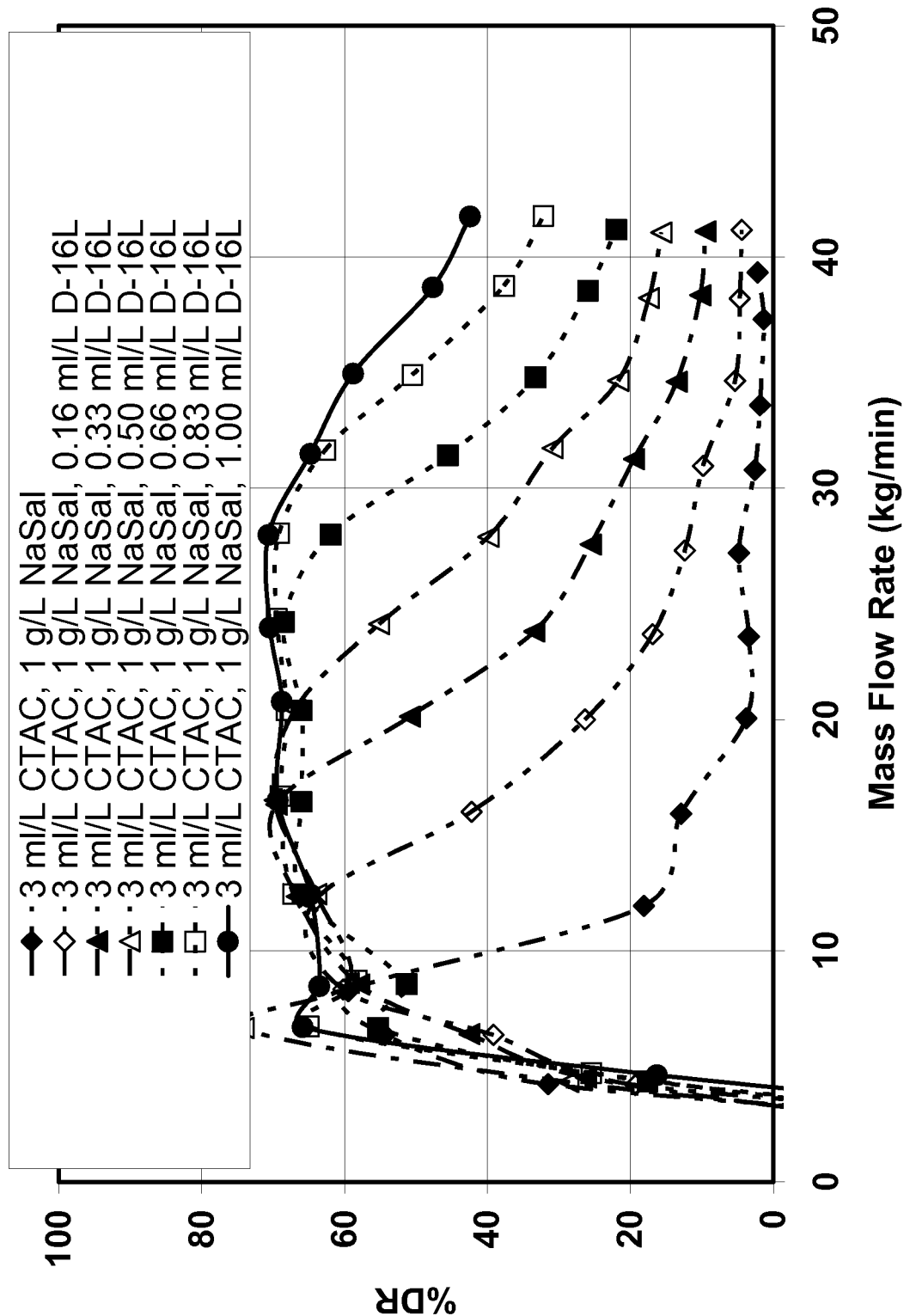
FIG. 20 is a plot of percentage drag reduction versus mass flow rate for various concentrations of suspending friction reducers.

The cetyltrimethyl ammonium chloride concentrate, CTAC, of Example 8 was diluted in water at 3 ml/L CTAC and 1.0 g/L NaSal and various concentrations of D-16L were added. These formulations further allowed to improve the drag reduction, and reducing the formulation cost by decreasing the required concentration of sodium salicylate to 1 g/L. Results are shown for a 9.53 mm (⅜ inch) pipe, as shown in FIG. 20.

It has been found that the temperature of the fluid in the pipe has an important effect on the drag reduction capability of the fluid. In the field, the temperature of the fluid is mainly controlled by the temperature of the water, because normally heat-up of the fluid is minimal while traveling down tubulars or casing.

Example 17

Figure 21:
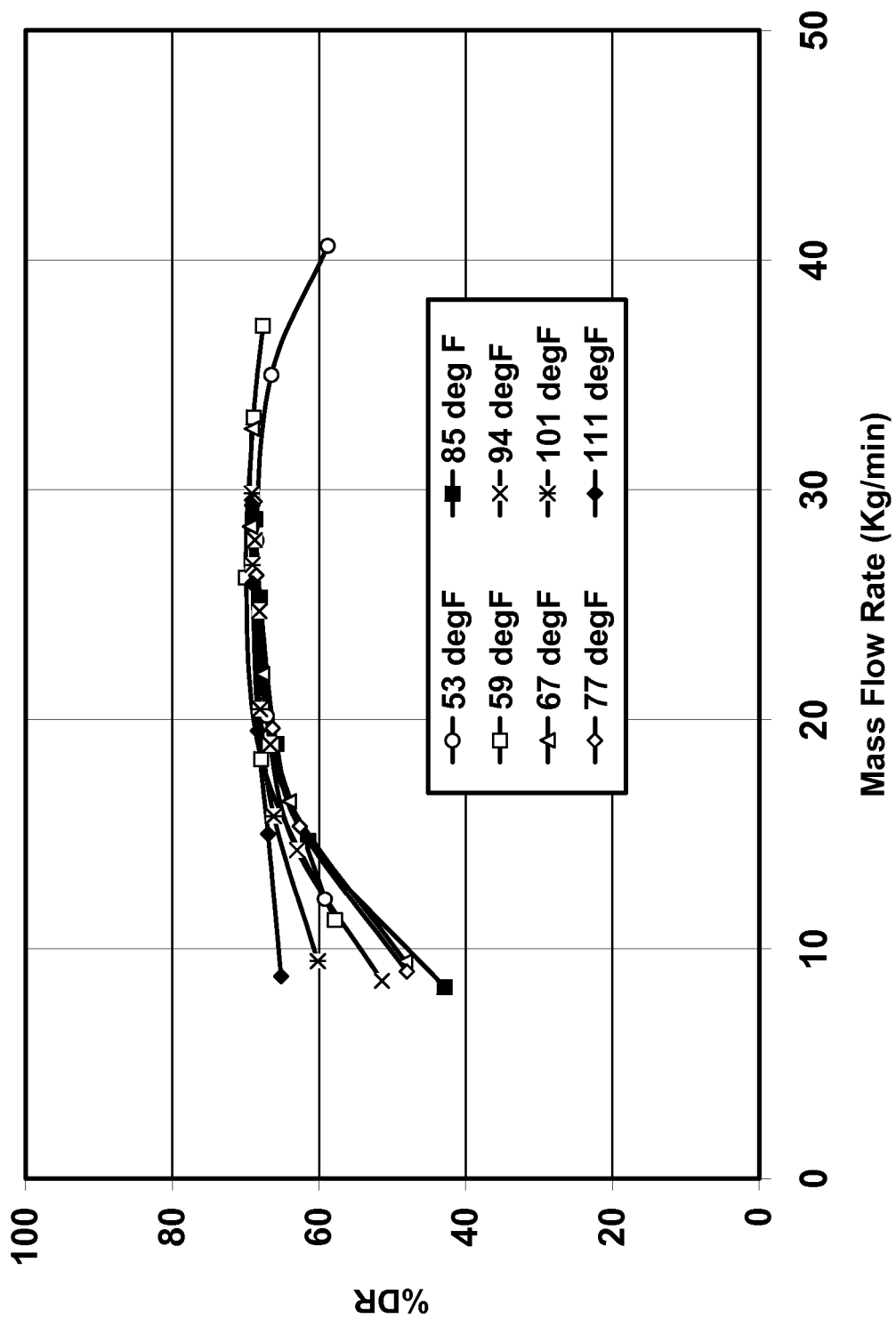
FIG. 21 is a plot of percentage drag reduction versus mass flow rate, showing the effect of temperature on the friction reduction of a suspending friction reducer.

The per cent drag reduction (% DR) of a fluid containing 6 ml/L of tallow trimethyl ammonium chloride (obtained as "Arquad T-50" from Akzo Nobel Surface Chemistry, Stenungsund, Sweden, and described as containing about 35 weight % isopropanol, 15 weight % water, and 50 weight % of a mixture of alkyl trimethyl ammonium chlorides having about 1 weight % $C_{12}$, 4% $C_{14}$, 31% $C_{16}$, and 64% $C_{18}$), 1.3 g/L of sodium salicylate and 0.5 ml/L of Daxad 16L was measured in the 9.53 mm (⅜ inch) tube, as a function of temperature. It was observed that a drag reduction greater than 55% was obtained for this fluid at all flow rates over the entire temperature range, as shown in FIG. 21.

Example 18

Figure 22:
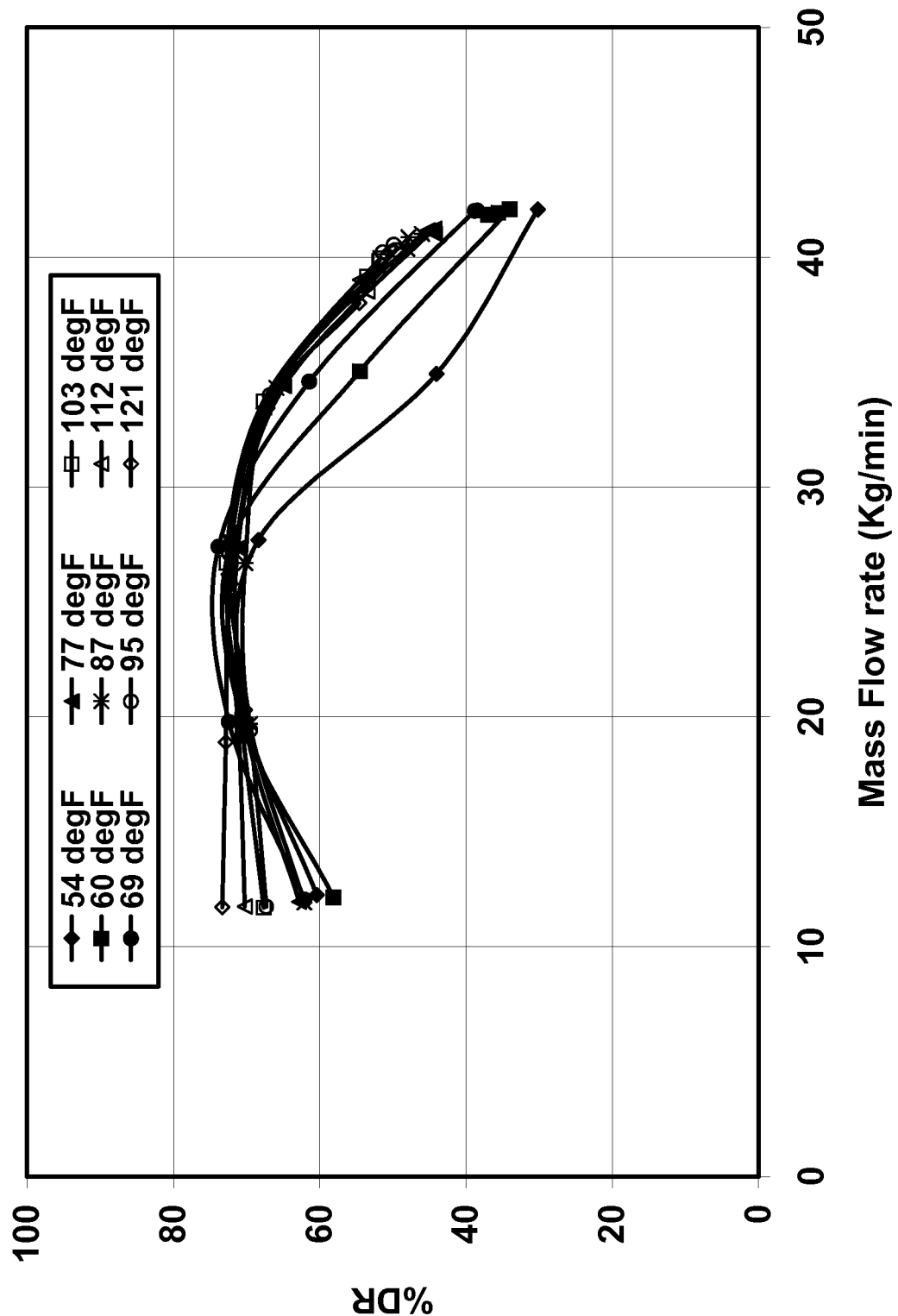
FIG. 22 is a plot of percentage drag reduction versus mass flow rate, showing the effect of temperature on the friction reduction of a suspending friction reducer.

The % DR of a fluid containing 5 ml/L of the same tallow trimethyl ammonium chloride (Arquad T-50) used in Example 17, 1.1 g/L of sodium salicylate and 0.5 ml/L of Daxad 16L was measured in a 9.53 mm (⅜ inch) tube as a function of the temperature. A drag reduction of greater than 45% was obtained for this fluid at all flow rates at temperatures above about 21.2 degC., (70 degF.), as shown in FIG. 22.

Example 19

Figure 23:
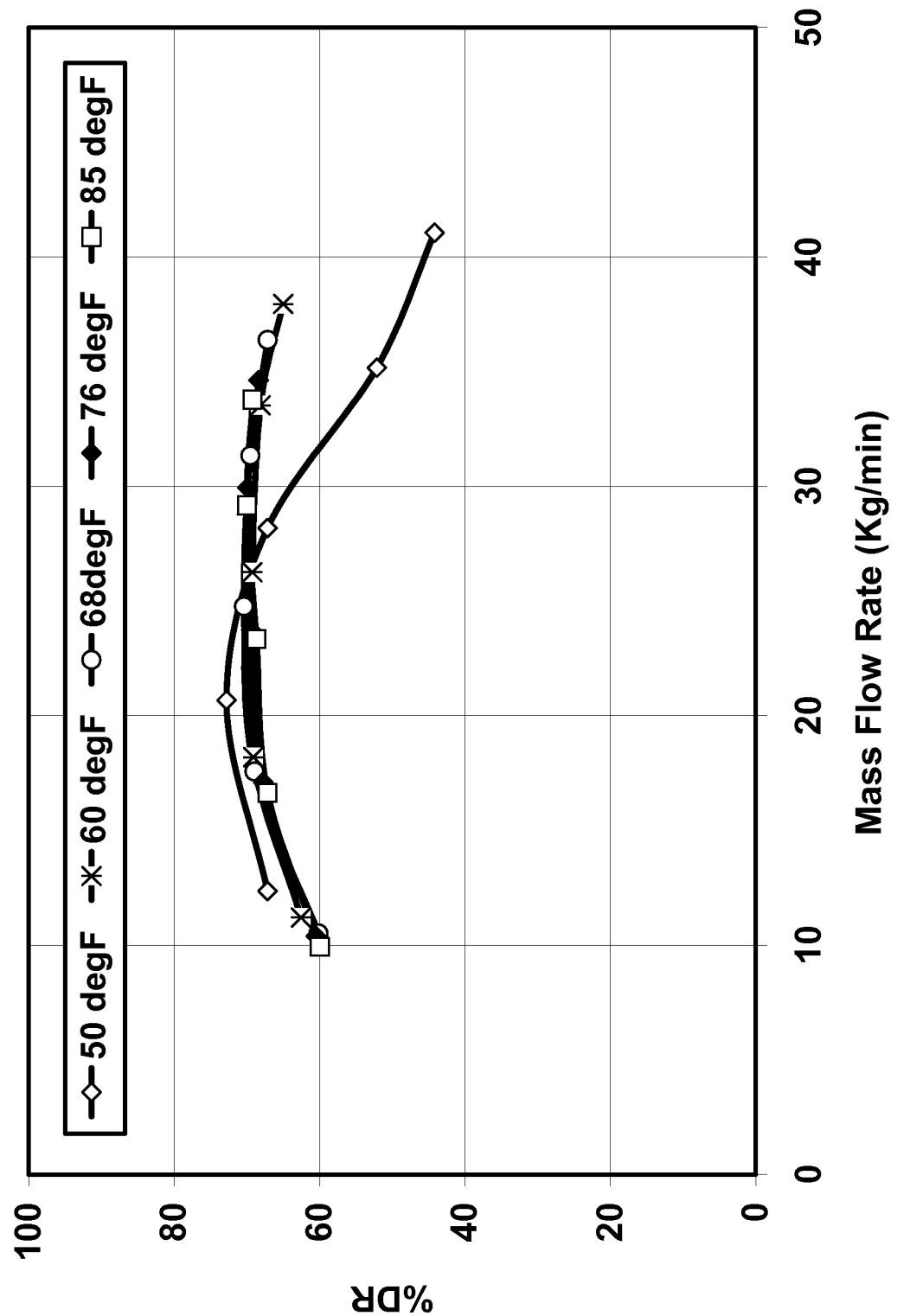
FIG. 23 is a plot of percentage drag reduction versus mass flow rate, showing the effect of temperature on the friction reduction of a suspending friction reducer.

The % DR of a fluid containing 5 ml/L of the same tallow trimethyl ammonium chloride (Arquad® T-50) used in Example 17, 0.9 g/l of sodium salicylate and 0.53 ml/L of Daxad® 16L was measured in the 9.53 mm (⅜ inch) tube, as a function of the temperature. It was observed that a drag reduction greater than 55% was obtained for this fluid at all flow rates at temperatures higher than about 50° F. (10° C.), as shown in FIG. 23.

Example 20

Figure 24:
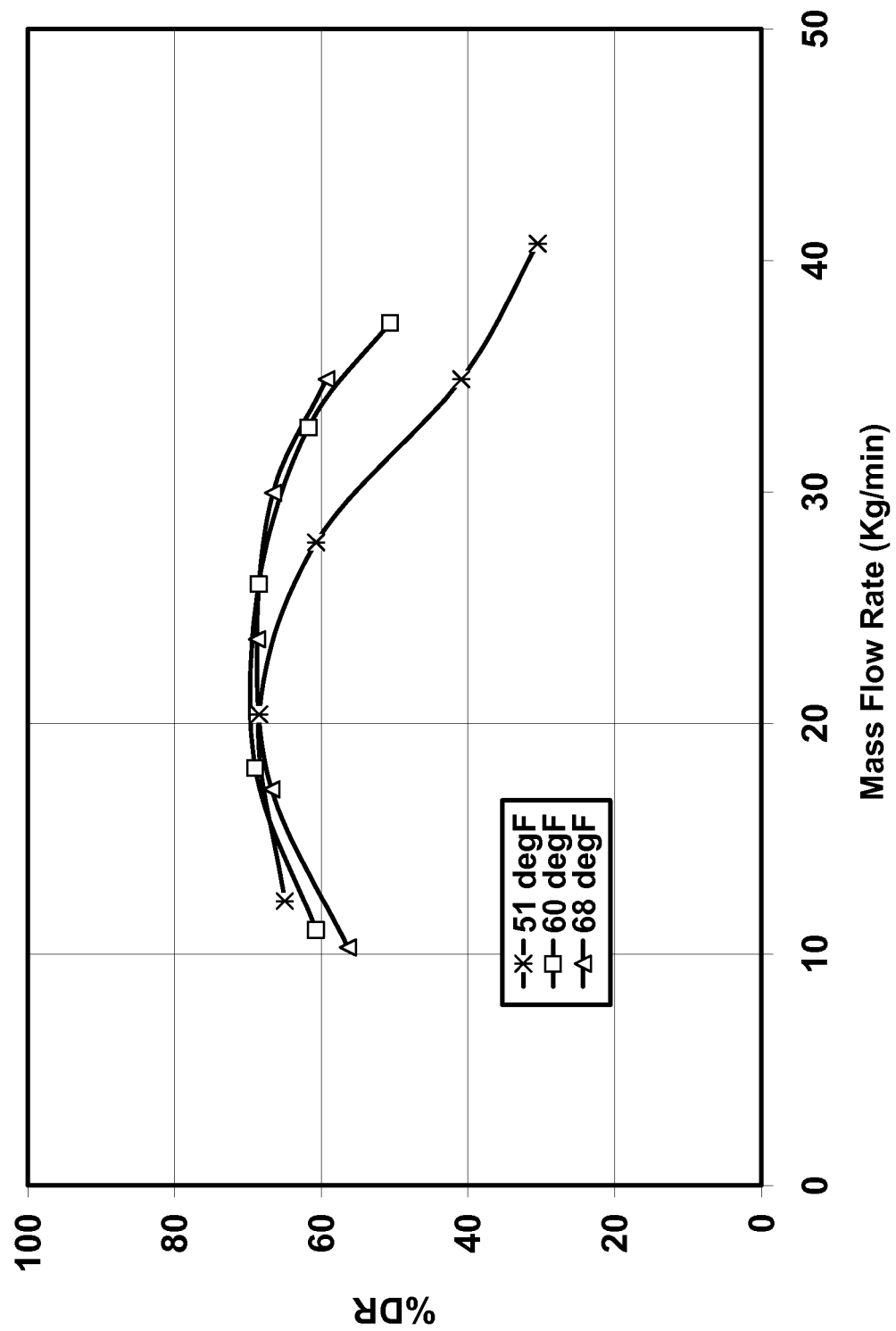
FIG. 24 is a plot of percentage drag reduction versus mass flow rate, showing the effect of temperature on the friction reduction of a suspending friction reducer.

The % DR of a fluid containing 5 ml/L of the same tallow trimethyl ammonium chloride (Arquad® T-50) used in Example 17, 1.1 g/l of sodium salicylate and 0.8 ml/L of Daxad® 16L was measured in the 9.53 mm (⅜ inch) tube, as a function of the temperature. It was observed that a drag reduction greater than 55% was obtained for this fluid at all flow rates at temperatures above about 15.5 degC. (60 degF.), as shown in FIG. 24.

The temperature effect on the % DR of the formulations discussed in examples 17,18, 19 and 20 was very surprising, as one would expect from basic rheological principles the reverse of what was observed, i.e., that shear thinning fluids like those in the invention would improve the rheological performances related to fluid elasticity with decreasing temperatures.

Example 21

Figure 25:
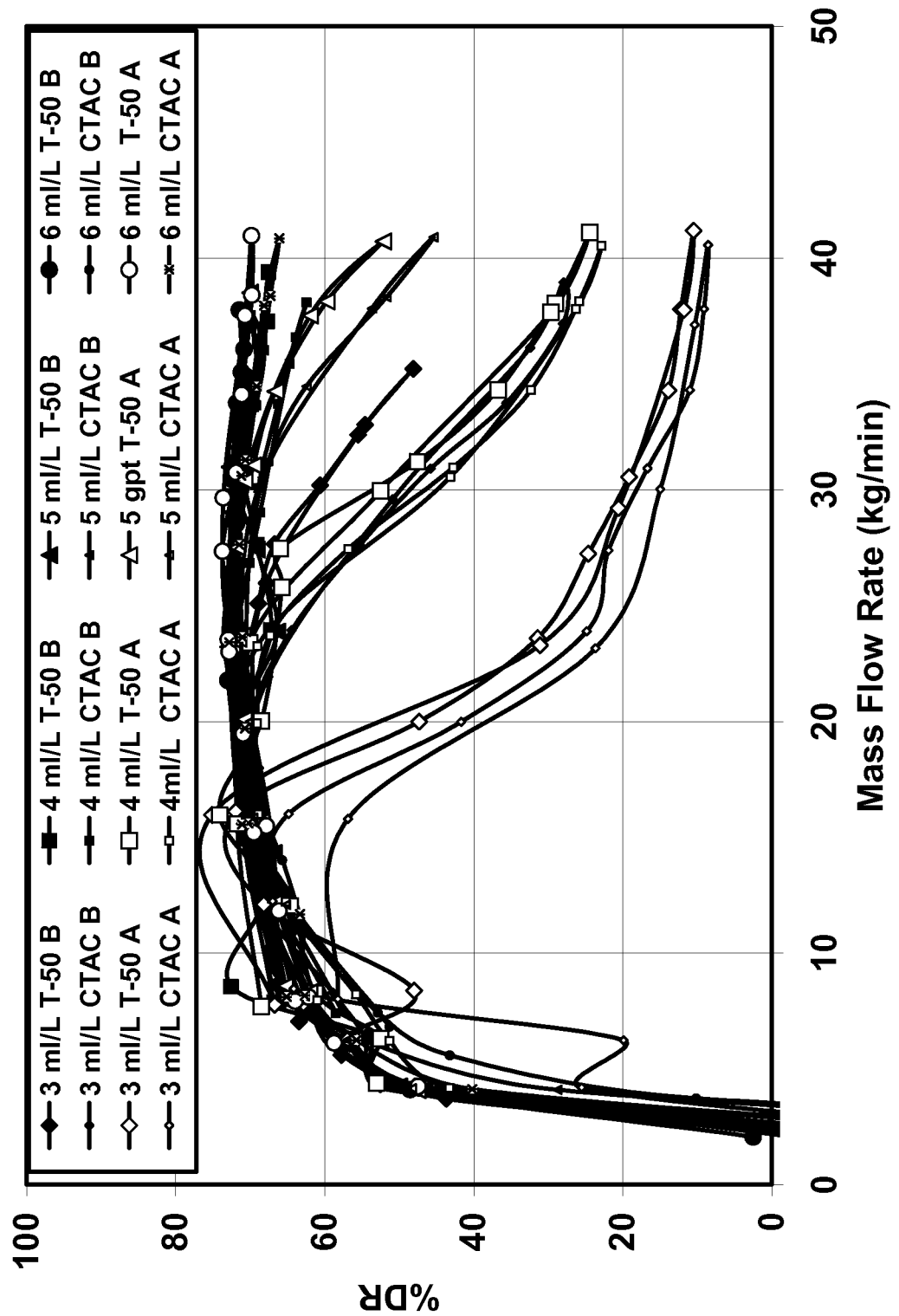
FIG. 25 is a plot of percentage drag reduction versus mass flow rate for various concentrations of suspending friction reducers.

The % DR of a fluid containing various amounts of the same tallow trimethyl ammonium chloride (Arquad® T-50) used in Example 17, sodium salicylate, and Daxad® 16L was compared to fluids containing various amounts of cetyl trimethyl ammonium chloride (Arquad® 16-50) used in Example 8, sodium salicylate, and Daxad® 16L all measured at 26.7 degC. (80 degF.). Table 1 summarizes the different formulations studied. As shown in FIG. 25 increasing amounts of the drag reducing surfactant resulted in the maintenance of a high % DR at high flow rates. For any concentration of drag reducing surfactant, increasing the polymeric drag reduction enhancer resulted in an increase of the % DR, In this test the drag reduction with Arquad T-50 was slightly better than with Arquad 16-50.

TABLE 1

Different SFR formulations, for which drag reduction and sand settling studies were performed.

| Sample | Surfactant | Surfactant concentration (ml/L) | NaSal Concentration (g/L) | D-16L concentration (ml/L) |
|---|---|---|---|---|
| T-50 A | T50 | 3 | 0.66 | 0.50 |
| T-50 A | T50 | 4 | 0.88 | 0.67 |
| T-50 A | T50 | 5 | 1.09 | 0.83 |
| T-50 A | T50 | 6 | 1.31 | 1.00 |
| CTAC A | CTAC | 3 | 0.66 | 0.50 |
| CTAC A | CTAC | 4 | 0.88 | 0.67 |
| CTAC A | CTAC | 5 | 1.09 | 0.83 |
| CTAC A | CTAC | 6 | 1.31 | 1.00 |
| T-50 B | T50 | 3 | 0.66 | 0.80 |
| T-50 B | T50 | 4 | 0.88 | 1.07 |
| T-50 B | T50 | 5 | 1.09 | 1.33 |
| T-50 B | T50 | 6 | 1.31 | 1.60 |
| CTAC B | CTAC | 3 | 0.66 | 0.80 |
| CTAC B | CTAC | 4 | 0.88 | 1.07 |
| CTAC B | CTAC | 5 | 1.09 | 1.33 |
| CTAC B | CTAC | 6 | 1.31 | 1.60 |

It has been found that particularly useful SFR fluids contain about 3 to 4 ml/L cetyl trimethyl ammonium chloride (Arquad® 16-50), about 0.5 to 1.3 g/L sodium salicylate, and about 0.5 to 0.8 ml/L Daxad® 16L in water. It has also been found that particularly useful fluids contain about 3 to 4 ml/L tallow trimethyl ammonium chloride (Arquad® T-50), about 0.5 to 1.3 g/L sodium salicylate, and about 0.5 to 0.8 ml/L Daxad® 16L in water.

Figure 26:
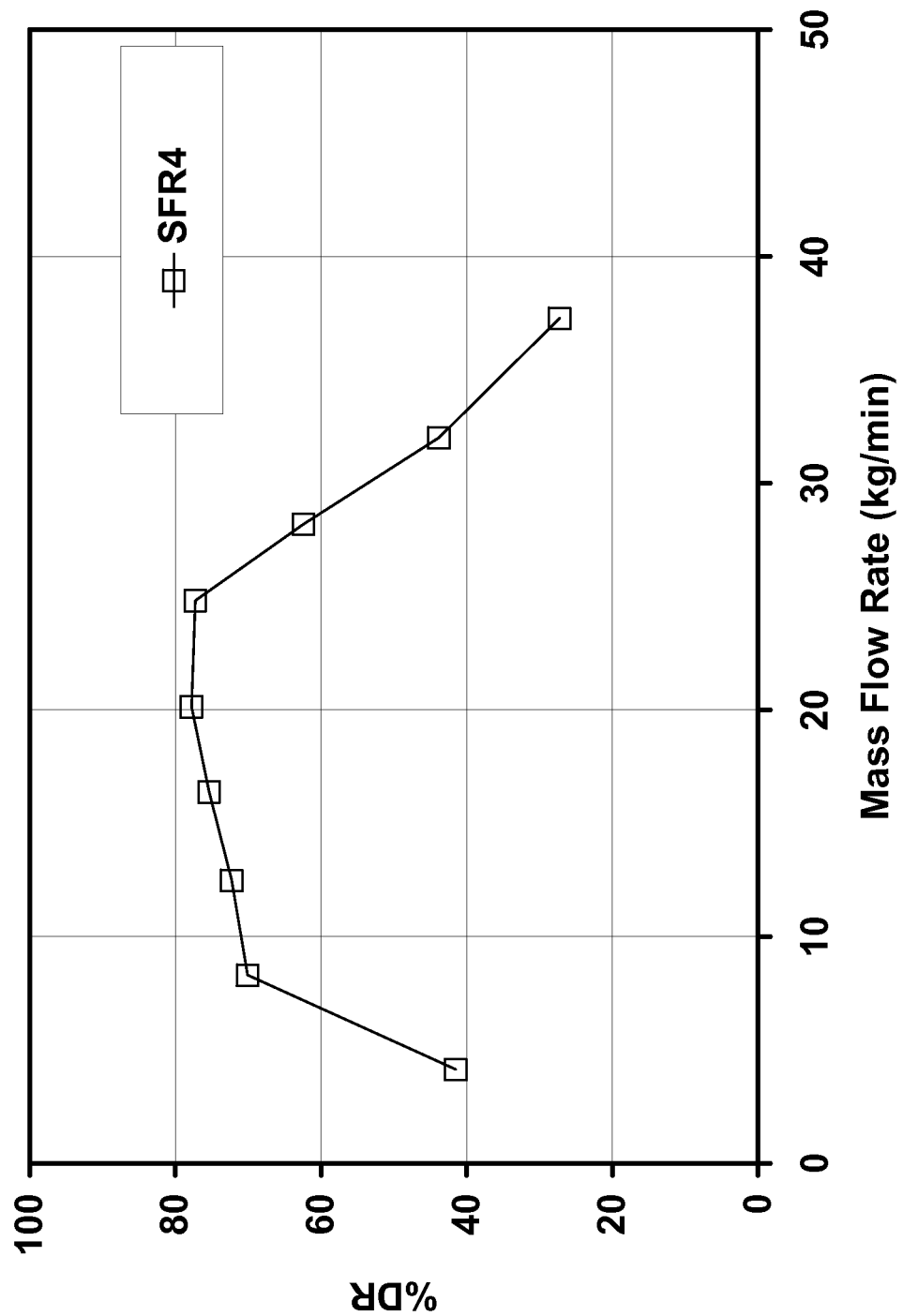
FIG. 26 is a plot of percentage drag reduction versus mass flow rate for a suspending friction reducer.

It has been found that a very particularly useful fluid contains about 3 to 4 ml/L cetyl trimethyl ammonium chloride (Arquad® 16-50), about 0.6 to 0.7 g/L sodium salicylate, and about 0.5 to 0.8 ml/L Daxad® 16L in water. One such formulation containing 3.6 ml/L cetyl trimethyl ammonium chloride (Arquad® 16-50), about 0.65 g/L sodium salicylate, and about 0.5 ml/L Daxad® 16L in water will be designated "SFR$_4$". FIG. 26 shows the % DR obtained for this formulation in a 9.53 mm (3/8 inch) tube.

Example 22

Figure 27:
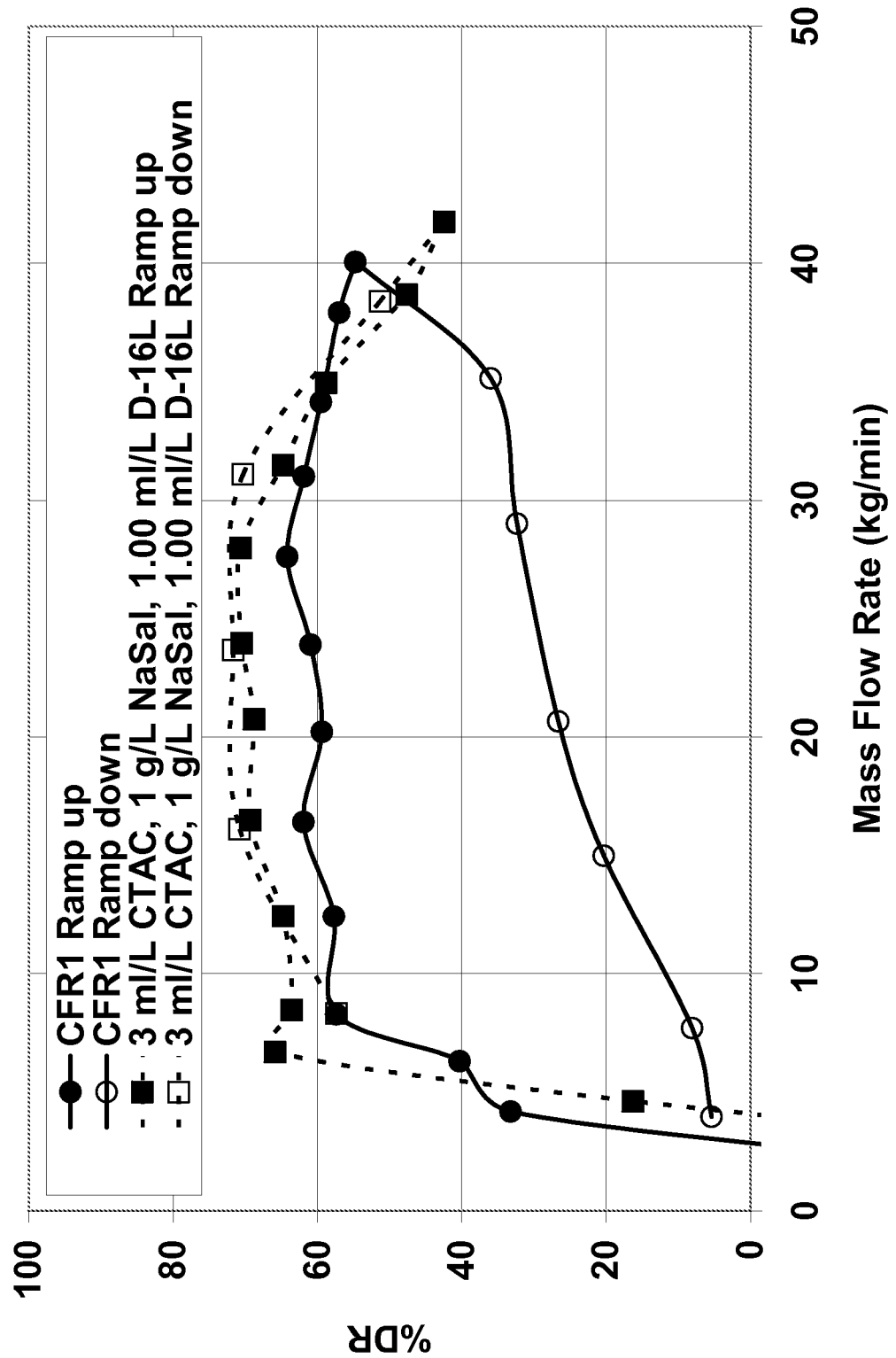
FIG. 27 is a plot of percentage drag reduction versus mass flow rate, showing the shear sensitivities of a conventional friction reducer and a suspending friction reducer.

Multiple experiments have been completed to verify the extent of the % DR obtained with conventional friction reducers (CFRs) and with Suspending Friction Reducers (SFRs) while pumped continuously under high shear regimes. FIG. 27 shows the comparison between the % DR obtained with the formulation CFR1 of Example 1 and the a SFR formulation containing 5.5 ml/L CTAC, 1.33 g/L sodium Salicylate and 1 ml/L Daxad® 16L, for the experiments carried out with the following procedure: The fluid was prepared, introduced into the friction loop, and circulated at a very low rate to ensure no air remained in the loop and no damage was be inflicted to the fluid. The flow rate was increased from 0 kg/min to about 42.5 kg/min at steps of about 2.5 kg/min every 90 seconds. The pressure differential and the % DR were measured and averaged for each flow rate. Both fluids were kept at the maximum flow rate for about 10 minutes, and the flow rate was then decreased in steps of about 5 kg/min every 90 seconds, and the pressure differential and the % DR was determined at each flow rate once again.

As the data show, the % DR effectively obtained with conventional friction reducers CFRs is a function of the pump time at high shear rates, due to the shear induced degradation observed for high molecular weight polymers at high shear rates. Similar experiments carried out with the SFR fluids of the invention have shown that the % DR obtained at a given mass flow rate is independent of the fluid exposure time to a high shear regime. In other words, the SFR fluids of the invention maintain their % DR capability for an extended, perhaps unlimited period of time as the high shear does not irreversibly degrade the structures responsible for providing the friction reduction.

Example 23

Figure 28:
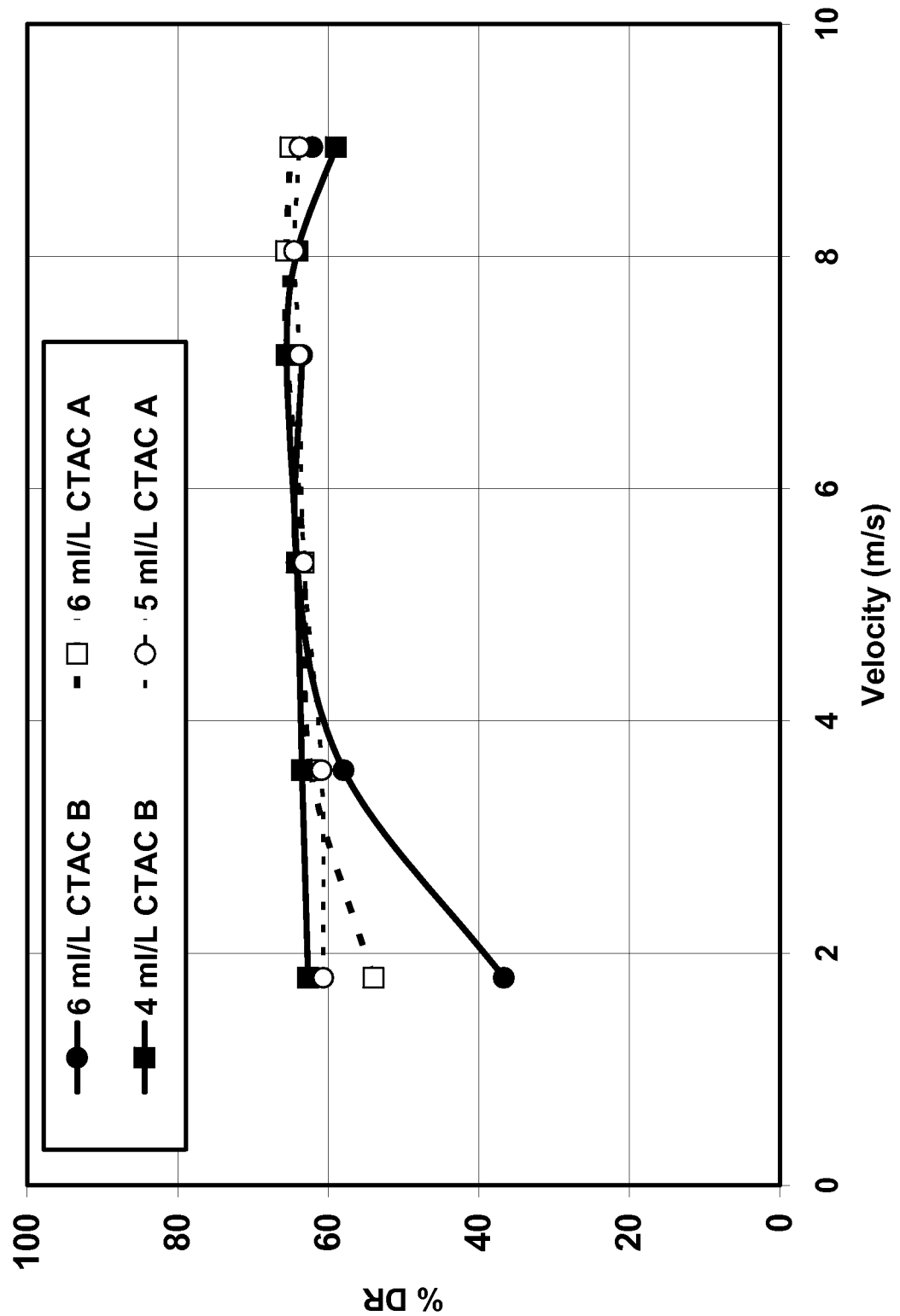
FIG. 28 is a plot of percentage drag reduction versus mass flow rate for a suspending friction reducer in a coiled tubing.

The % DR of a fluid containing various amounts of cetyl trimethyl ammonium chloride (Arquad® 16-50), sodium salicylate, and 0.5 or 0.8 gpt Daxad® 16L was measured at 26.6 degC. (80 degF.) in a 1220 m (4000 ft) long section of 50.8 mm (2 inch) coil tubing. The results are shown in FIG. 28.

The formulations described herein can be modified and optimized to obtain the optimum % DR required for the field operation by one skilled in the art. The preferred % DR for each treatment will be balanced and optimized in combination with other factors such as the casing and production tubing dimensions, the depth of the treatment, the surface and bottom hole temperature, the downhole pressure, the reservoir pressure and stress profile, the rock modulus the maximum horse power available on location, brine type, and density. Other factors such as cost, proppant type, size, density, water availability and quality will also need to be considered to provide an optimum fluid selection for a high rate water frac or pack.

Example 24

Parameters such as viscosity are important considerations to achieve optimum proppant transport and placement in high rate water fracturing or water packing treatments. It is commonly accepted that the particle settling in a viscous fluid can be predicted using Stokes Law:

$$V_s = \frac{2}{9} \frac{r^2 g(\rho_p - \rho_f)}{\eta} \qquad \text{Eq. 2}$$

where: $V_s$ is the particles' settling velocity (cm/sec) (vertically downwards if $\rho_p > \rho_f$, upwards if $\rho_p < \rho_f$), r is the Stokes radius of the particle (cm), g is the standard gravity (cm/sec$^2$), $\rho_p$ is the density of the particles (g/cm$^3$), $\rho_f$ is the density of the fluid (g/cm$^3$), and $\eta$ is the fluid viscosity (dyne sec/cm$^2$).

Figure 29:
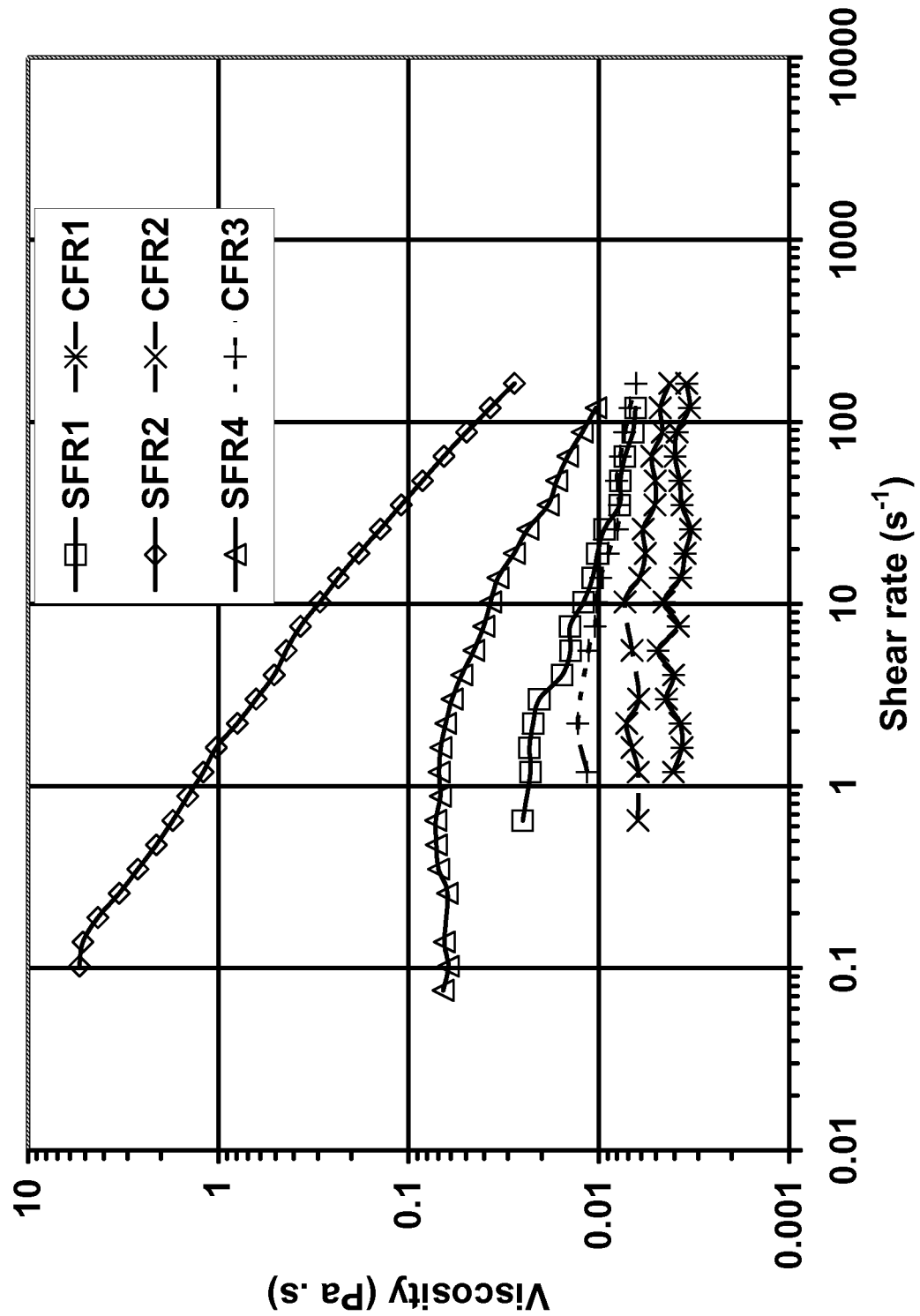
FIG. 29 is a plot shear rate versus viscosity, showing the room temperature viscosity of conventional friction reducers and suspending friction reducers.

Fluid viscosity is also an important consideration to obtain a sufficiently wide fracture as can be shown by examining fracture compliance by those skilled in the art of hydraulic fracturing. The viscosity of three suspending friction reducing formulations, named SFR1, SFR2 and SFR$_4$ was compared to that of three fluids prepared with 0.5 ml/L of conventional friction reducers of proprietary formulations named CFR1, CFR2, and CFR3. As it can be seen in FIG. 29, the viscosity at high shear rates (e.g., 100 s$^{-1}$) was substantially higher for all the SFR fluids as compared to the CFR fluids with similar % DR. Moreover, the low shear viscosity, which typically correlates well with the suspending capabilities of the fluids, was much higher for the SFR fluids than for the CFR fluids.

This viscosity difference is expected to reflect on fracturing treatments by achieving better proppant transport capability, and to allow for wider fractures to be created, and therefore, to be able to effectively pump higher proppant concentrations without risking premature screen outs.

Example 25

To show further that fluids of the invention are advantageous for fracturing fluids showing low friction pressure and better proppant transport capabilities than similar polymer fracturing fluids, the following static sand settling experiments were carried out.

A fluid containing 0.1 ml/L of a proprietary vinyl polymer drag reducing fluid (fluid 1) was prepared and compared to a fluid containing 2.75 ml/L cetyltrimethylammonium chloride (CTAC), 0.25 g/L sodium salicylate, and 0.333 ml/L Daxad 16L (fluid 2). A small number (approximately 10 to 20) of proppant particles (either 20/40 U. S. mesh CarboHSP ceramic proppant obtained from Carbo Ceramics, Inc., Irving, Tex. U.S.A., or 20/40 mesh sand) was spread over the surface of about 500 ml of the fluid in a graduated cylinder. The time for the first and the last particle to settle was measured. This was done because the particles were not completely spherical and were of different sizes and weights; the use of multiple particles is a method to randomize the process for more consistent results. The results, in seconds, are listed below in Table 2; sand settling was consistently slower in fluid 2 than in fluid 1.

TABLE 2

Static sand settling results for a Conventional Friction Reducer and a Suspending Friction Reducer

| | carbo HSP 20/40 | | | | sand 20/40 | |
|---|---|---|---|---|---|---|
| | first experiment | | second experiment | | third experiment | |
| | first | last | first | last | first | last |
| fluid 1 | 2 | 4 | 3 | 5 | 2 | 4 |
| fluid 2 | 4 | 9 | 5 | 10 | 5 | 11 |

Example 26

Figure 30:
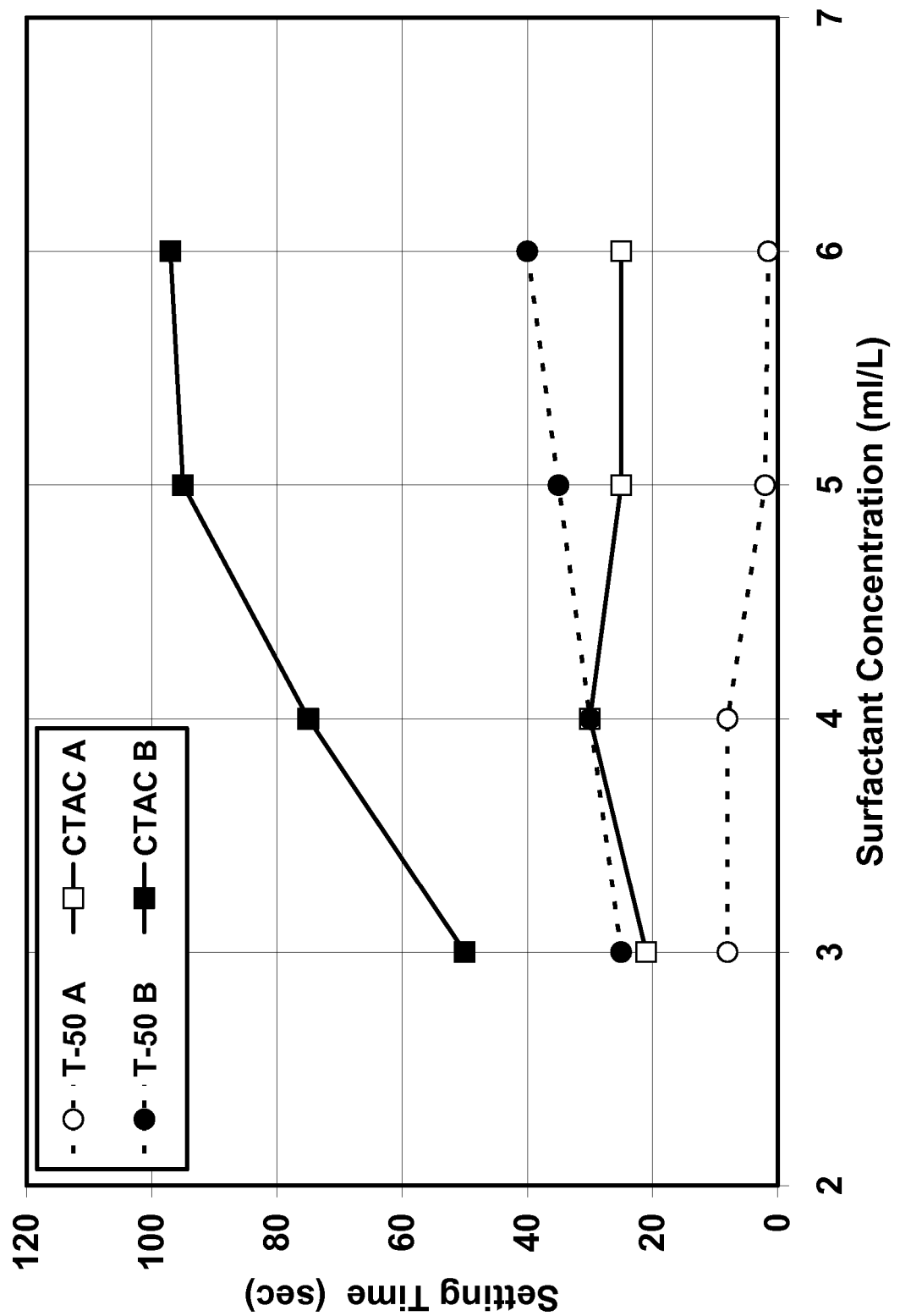
FIG. 30 is a plot of surfactant concentration versus setting time for which compares the proppant suspending capability of different concentrations of suspending friction reducers.

The settling velocity of fluid formulations with increasing concentrations of two surfactants: tallow trimethyl ammonium chloride (Arquad® T50 used in Example 17), and cetyl trimethyl ammonium chloride (Arquad® 16-50 used in Example 8) for varying ratios of sodium salicylate and Daxad-16L was measured. The different formulations prepared are listed in Table 1. The results are shown in FIG. 30.

Example 27

Multiple SFR fluids were prepared according to the formulations in Table 4 as mixtures of different weight ratios of two components: an SFR component, which was selected amongst the SFR fluids prepared in Examples 5, 6, and 21 and a CFR component, which was selected amongst the CFR fluids of Examples 1 and 23. The SFR component was added to the fluid at the concentration listed in their respective examples. The CFR component were added at 1 ml/L. The appearance of the different components was given a visual rating P (pass) or F (fail). The ratings are shown in Table 4 below.

Selection of SFR and CFR for combinations similar to those described in this example can include any of the SFR formulations disclosed in any the previous Examples, and any of those enabled herein, and any of the available CFR formulations. Those skilled in the art will be capable of selecting the appropriate combinations of SFRs and CFRs at the appropriate concentrations to yield the properties desired for an SFR fluid with respect to cost, drag reduction, viscosity, suspending capabilities, and fluid appearance, by employing a combination of the tests described in this application.

TABLE 4

Tested formulation and visual rating

| SFR formulation | SFR component | CFR component | Visual Rating |
|---|---|---|---|
| SFR10 | SFR1 | CFR1 | P |
| SFR11 | SFR1 | CFR2 | F |
| SFR12 | SFR1 | CFR3 | F |
| SFR13 | SFR2 | CFR1 | P |
| SFR14 | SFR2 | CFR2 | P |
| SFR15 | SFR2 | CFR3 | P |
| SFR16 | SFR4 | CFR1 | F |
| SFR17 | SFR4 | CFR2 | F |
| SFR18 | SFR4 | CFR3 | F |

Example 28

Figure 31:
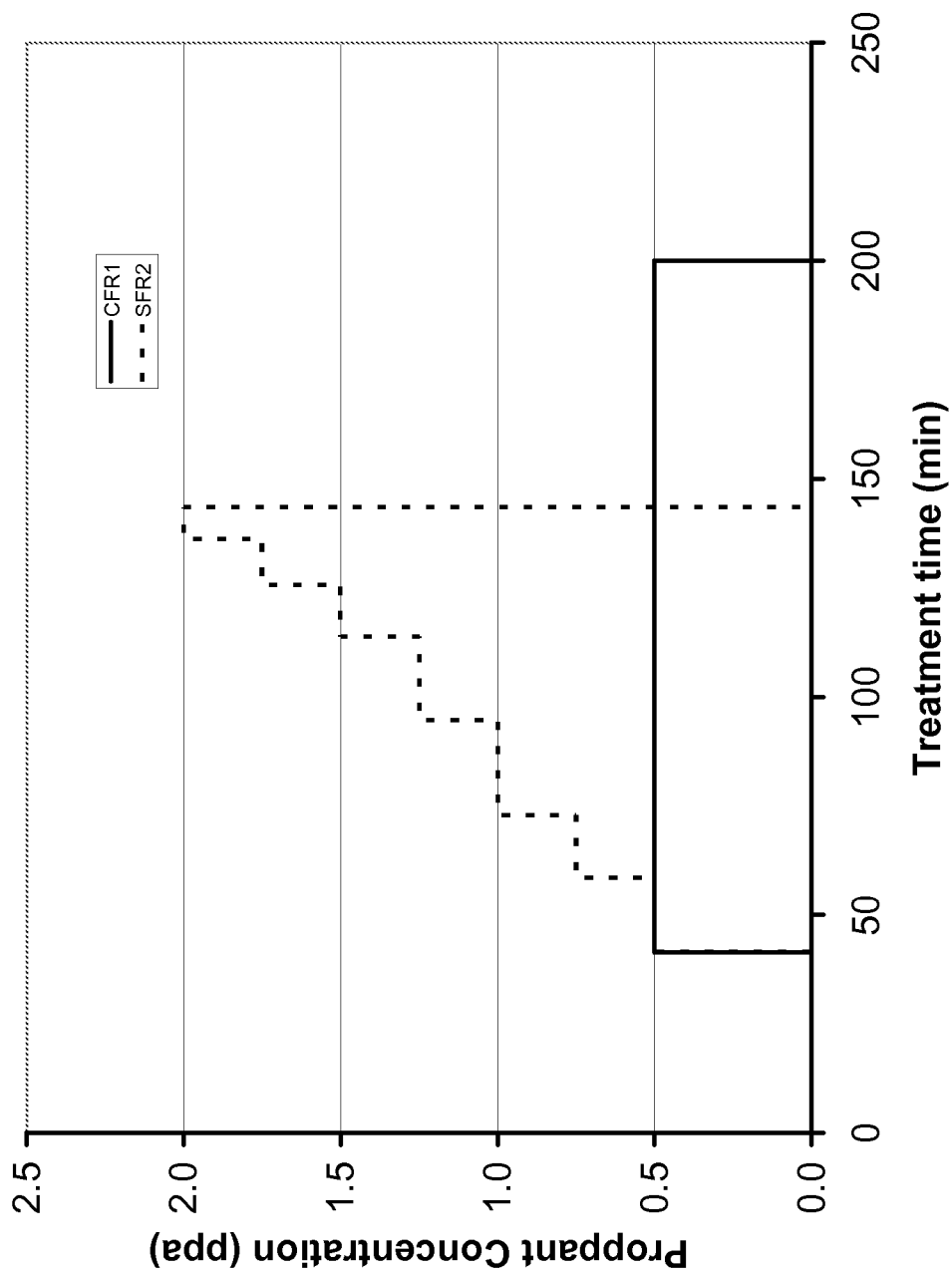
FIG. 31 is a plot of proppant concentration versus treatment time for a conventional friction reducer and a suspending friction reducer.

A fracturing treatment was placed in the lower Williams Fork Formation of the North Piceance Basin, using the conventional drag reducing formulation of Example 1 diluted in water at 1 l/m$^3$ as the carrying fluid. The treatment placed a total of 54,300 kg (120,000 lbs) of sand. The treatment lasted for 2 hours and 55 minutes, and required 1,510 m$^3$ (9,500 bbl) of water. In order to avoid premature fracture closing the maximum concentration of sand allowed during the treatment was 0.5 ppa (pounds per gallon of fluid pumped). 1 ppa is equivalent to 0.12 Kg sand/L fluid. The pump rate was 8.58 m$^3$/min (54 barrels per minute). The treatment was monitored in real time. FIG. 31 shows the designed proppant concentration schedule for the treatment. The treatment was pumped as per design.

An offset well was selected to place a fracturing treatment using the suspending drag reducing formulation SFR1 of Example 5 comprising 7.5 l/m$^3$ of the concentrated surfactant "quat" and 7.5 l/m$^3$ of the drag reduction enhancer "dragred1" diluted in water as the carrying fluid. The viscosity, water quality compatibility, drag reduction and proppant carrying capabilities of the fluid SFR1 were optimized for the design of this fracturing treatment. The maximum concentration of sand allowed during the treatment was safely increased up to 2.0 ppa. As a result the treatment placed a total of 72,400 kg (160,000 lbs) of sand (30% more proppant placed). The treatment lasted for 2 hours (20% less pump time), and required only 953 m$^3$ (6,000 bbl) of water (37% less water). The pump rate was 7.63 m$^3$/min, 48 barrels per minute. The treatment was monitored in real time. FIG. 31 shows the designed proppant concentration schedule for the treatment. The treatment was pumped as per design.

Example 29

Figure 32:
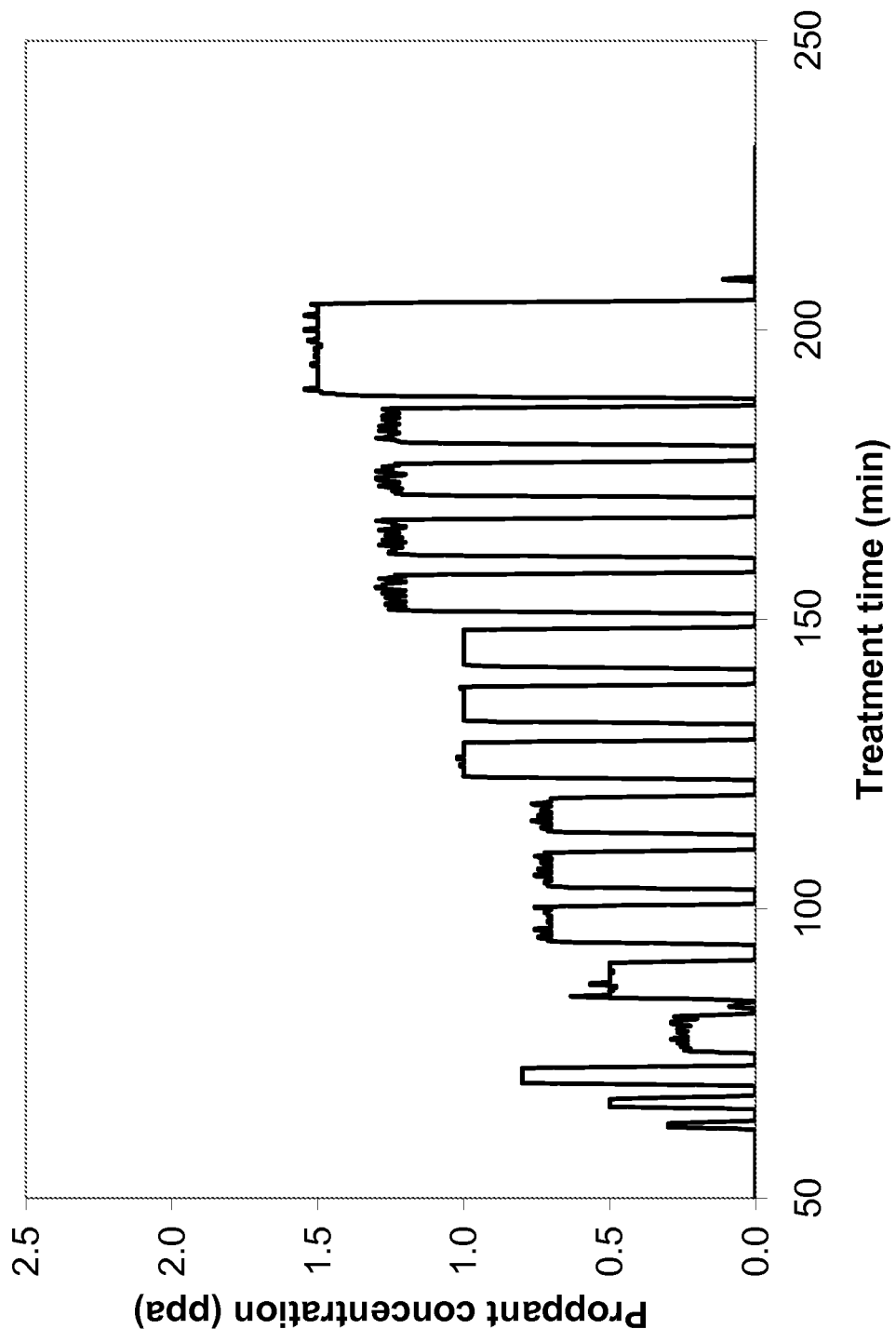
FIG. 32 is a plot of proppant concentration versus treatment time during a high rate water fracturing treatment using a conventional friction reducer.

A fracturing treatment (stage 5, well A) was placed in an horizontal well drilled in the lower Woodford Shale of the Coalgate basin, using a conventional drag reducing formulation, named CFR2, at 0.75 l/m$^3$ in water. The treatment placed a total of 138,000 kg (306,000 lbs) of sand. The treatment required 2294 m$^3$ (606,000 gal) of water. In order to avoid premature fracture closing the maximum concentration of sand that could be safely reached during the treatment was 1.5 ppa. In order to achieve correct placement of the sand, the job was executed alternating periods of clean fluid (with no sand) and propped stages (with proppant in the fluid). The clean fluid stages are commonly used in slick water treatments to flush the sand deposited in the near wellbore region of the fracture deep into the formation. The pump rate was 12.72 m$^3$/min (80 barrels per minute). The treatment was monitored in real time, and the recorded proppant concentration is shown as a function of time in FIG. 32. This is a typical stage for this type of treatment. For this well, six treatments in 6 different perforated intervals were executed. Similar results were obtained for the other perforated zones of this well. The results obtained and treatment conditions are summarized in Table 4.

TABLE 4

Field comparison of treatments with a conventional friction reducer CFR2, and a Surfactant Friction Reducer, SFR4

| WELL | stage | Fluid | max prop conc | # prop slugs | fluid (*10$^3$ gal) | sand (*10$^3$ lb) |
|---|---|---|---|---|---|---|
| A | 1 | CFR2 | 1.6 | 17 | 629 | 294 |
| A | 2 | CFR2 | 1.6 | 17 | 584 | 297 |
| A | 3 | CFR2 | 2.2 | 17 | 576 | 298 |
| A | 4 | CFR2 | 1.4 | 17 | 583 | 240 |
| A | 5 | CFR2 | 1.6 | 17 | 606 | 306 |
| A | 6 | CFR2 | 1.7 | 17 | 543 | 325 |
| average | | | 1.7 | 17 | 587 | 293 |
| B | 1 | SFR4 | 2.4 | 17 | 612 | 315 |
| B | 2 | SFR4 | 2.2 | 17 | 614 | 343 |
| average | | | 2.3 | 17 | 613 | 329 |
| B | 3 | SFR4 | 2.1 | 10 | 597 | 367 |
| B | 4 | SFR4 | 2.3 | 10 | 545 | 380 |
| B | 5 | SFR4 | 1.8 | 10 | 562 | 313 |
| B | 6 | SFR4 | 2.3 | 10 | 554 | 296 |
| average | | | 2.1 | 10 | 565 | 339 |

Example 30

Figure 33:
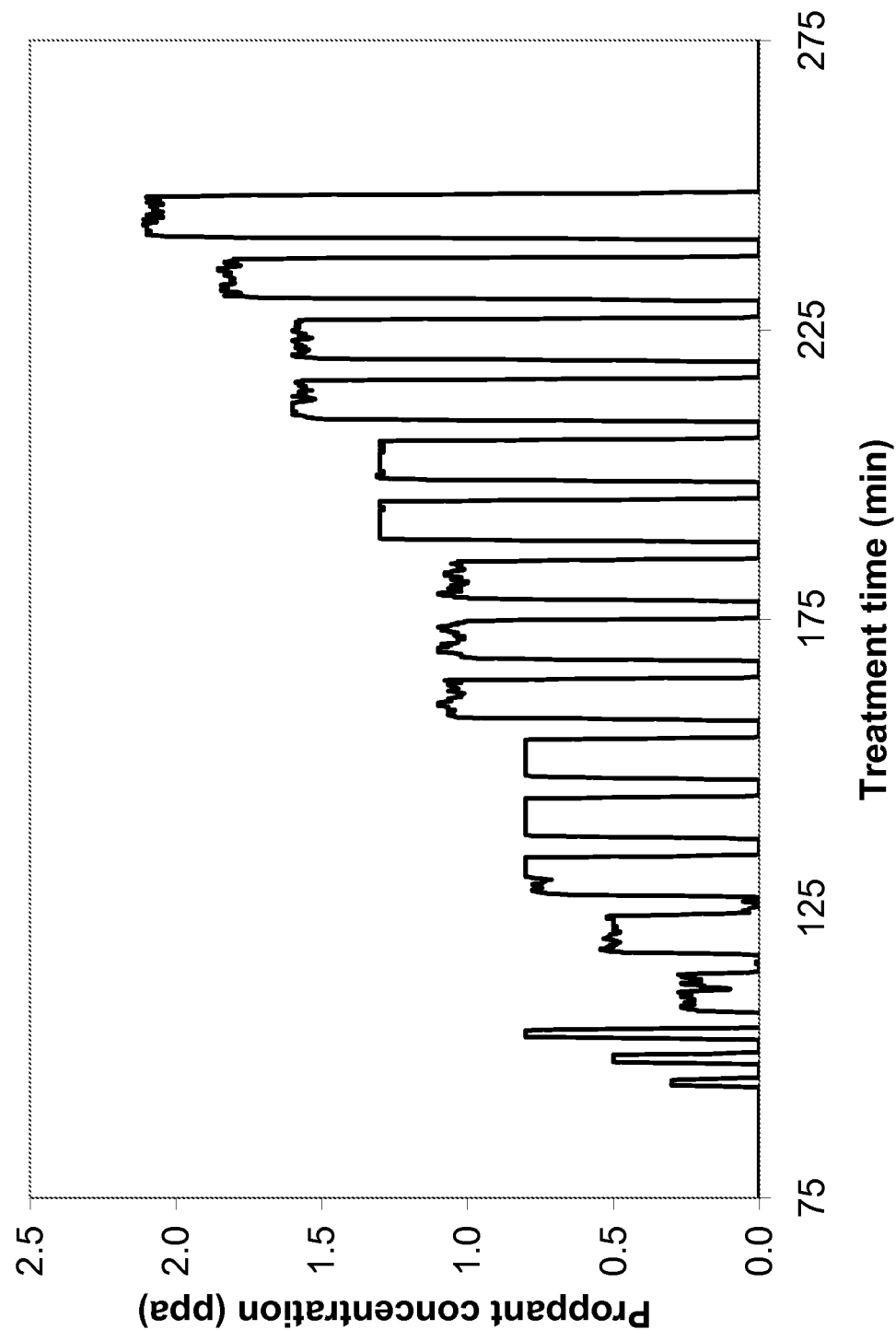
FIG. 33 is a plot of proppant concentration versus treatment time during a high rate water fracturing treatment using a suspending friction reducer.

An offset well was selected to place a fracturing treatment using the suspending drag reducing formulation SFR4 of Example 21. The viscosity, water quality compatibility, drag reduction and proppant carrying capabilities of the fluid SFR4 were optimized for the design of this fracturing treatment. For Stage 2, Well B, the same fracture design was employed as for Example 29, but the concentration of proppant was increased as high as possible whilst the operation and fracture placement was safe. The maximum concentration of sand continuously allowed during the treatment was increased up to 2.20 ppa. As a result the treatment placed a total of 143,000 kg (315,000 lbs) of sand. The treatment required only 2317 m$^3$ (612,000 gal) of water. The pump rate was 12.72 m$^3$/min 80 barrels per minute. The treatment was monitored in real time, and the recorded proppant concentration is shown as a function of time in FIG. 33. This treatment was executed to ensure that the same treatment design could be placed with the SFR fluid as compared to the CFR2 fluid with equal or better results. Results for two stages pumped with this same fracture design are shown in Table 4 As can be seen, the use of SFR4 in place of CFR2 allowed for a higher proppant concentration to be pumped, and a higher total proppant amount to be placed.

Example 31

Figure 34:
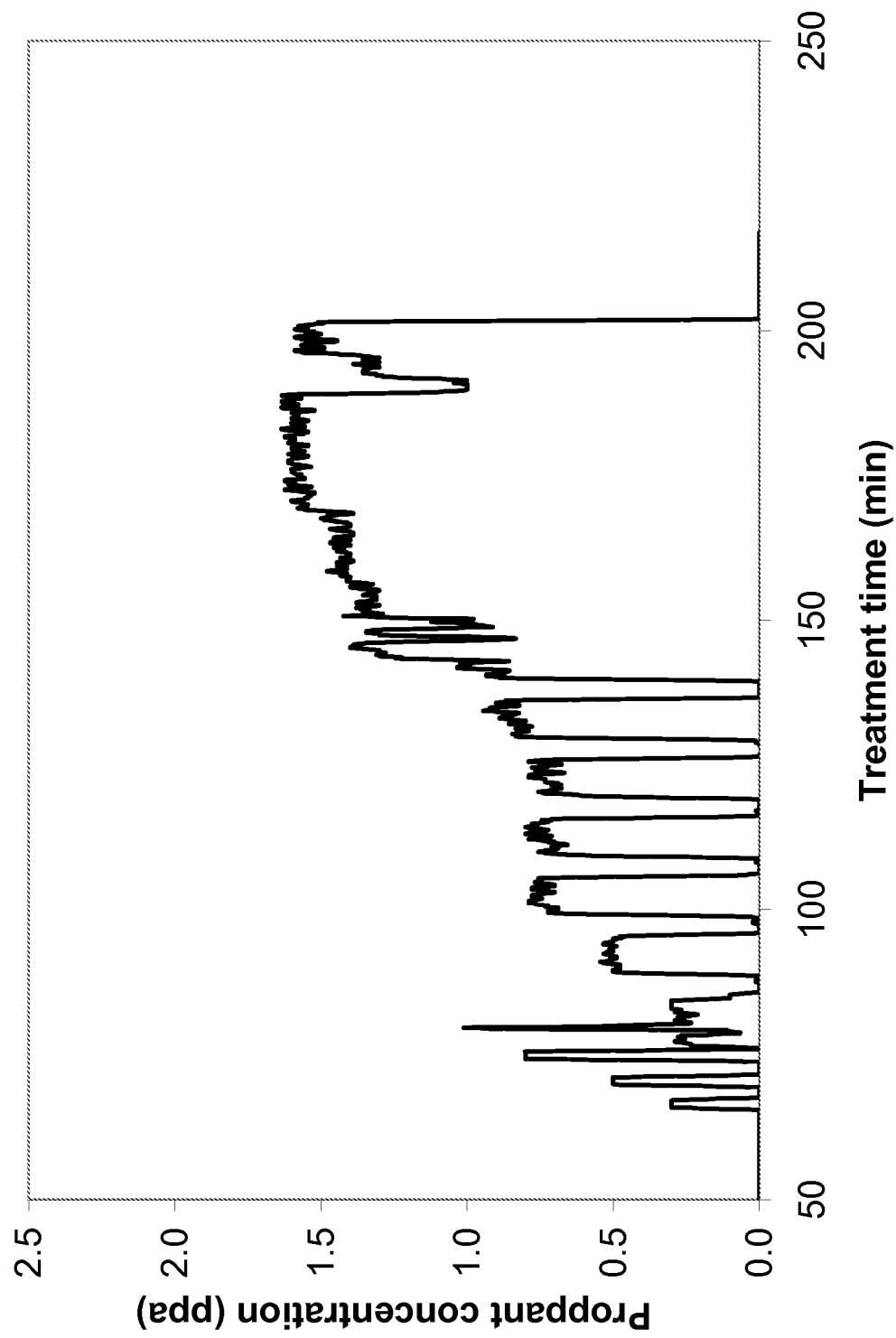
FIG. 34 is a plot of proppant concentration versus treatment time during a high rate water fracturing treatment using a suspending friction reducer.

A different perforation interval for the same well (Stage 3, well B) was selected for placement of a fracturing treatment using the suspending drag reducing formulation SFR4 of Example 21. The viscosity, water quality compatibility, drag reduction and proppant carrying capabilities of the fluid SFR4 were optimized for the design of this fracturing treatment. The maximum concentration of sand allowed during the treatment was kept at 1.5 ppa, but in this treatment the proppant flush stages (clean fluid) were suppressed once the proppant concentration was increased above 1.0 ppa, allowing for continuous pumping of the highest proppant concentration. As a result the treatment placed a total of 166,000 kg (367,000 lbs) of sand. The treatment required only 2256 m$^3$ (597,000 gal) of water. The pump rate was 12.72 m$^3$/min (80 barrels per minute). The treatment was monitored in real time, and the recorded proppant concentration is shown as a function of time in FIG. 34.

Example 32

Figure 35:
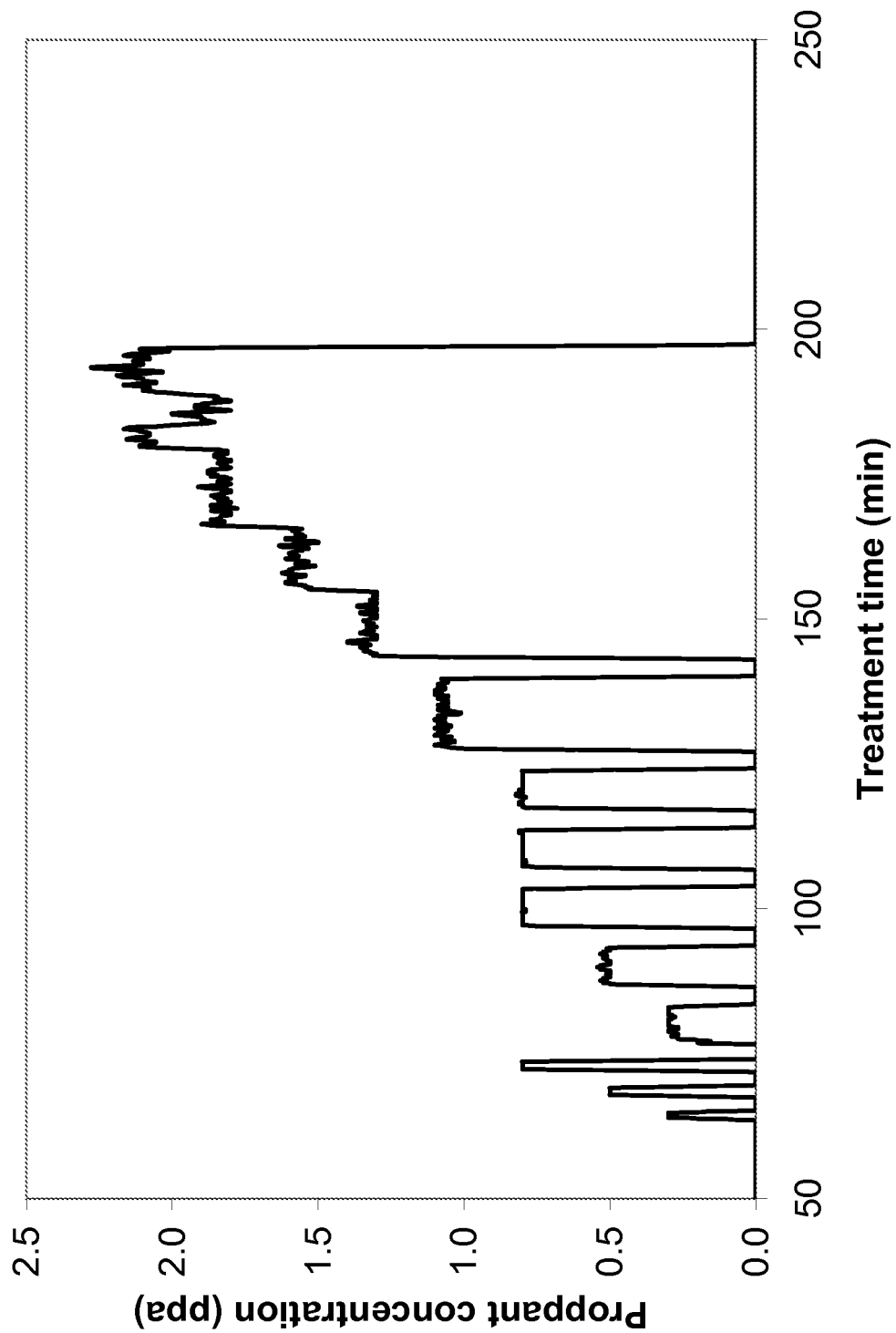
FIG. 35 is a plot of proppant concentration versus treatment time during a high rate water fracturing treatment using a suspending friction reducer.

A different perforation interval for the same well (Stage 4, well B) was selected for placement of a fracturing treatment using the suspending drag reducing formulation SFR4 of Example 21. The viscosity, water quality compatibility, drag reduction and proppant carrying capabilities of the fluid SFR4 were optimized for the design of this fracturing treatment. The maximum concentration of sand allowed during the treatment was increased up to 2.2 ppa. In this treatment the proppant flush stages (clean fluid) were suppressed once the proppant concentration was increased above 1.0 ppa, allowing for continuous pumping of the highest proppant concentration. As a result the treatment placed a total of 172,000 kg (380,000 lbs) of sand. The treatment required only 2063 m$^3$ (545,000 gal) of water. The pump rate was 12.72 m$^3$/min 80 barrels per minute. The treatment was monitored in real time, and the recorded proppant concentration is shown as a function of time in FIG. 35.

Example 33

Figure 36:
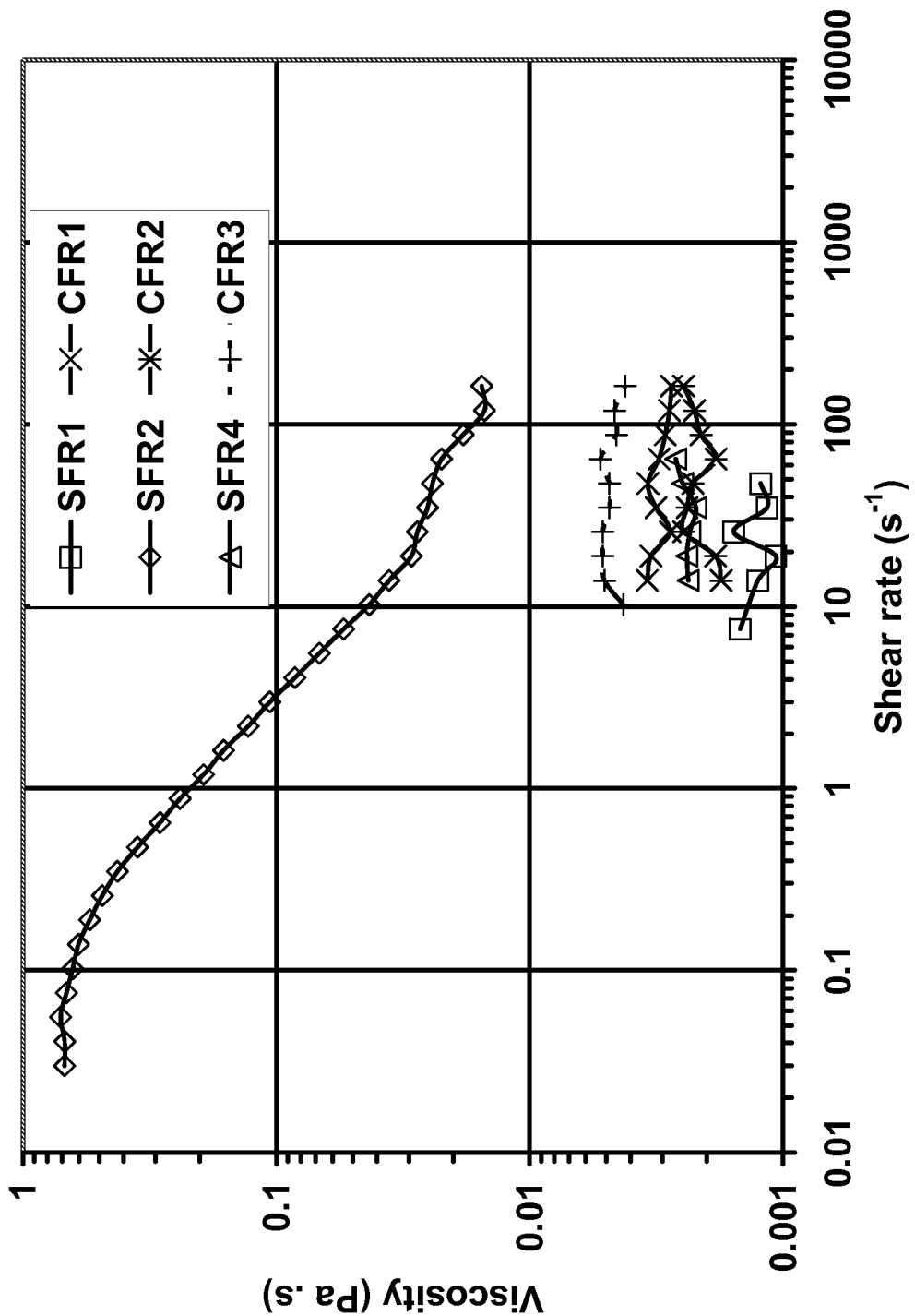
FIG. 36 is a plot of viscosity versus shear rate at 55° C. for conventional friction reducers and suspending friction reducers

Whilst the temperature of a high rate water fracturing fluid remains close to that of the surface water during the pipe transit and the fracture formation and propagation, the fluid experiences a heating process towards the original reservoir temperature upon fracture closure. FIG. 36 shows the viscosity of the fluids in Example 24, measured at 55 degC (131 degF). It is shown that some of the suspending friction reducers of the invention (SFRs) can reduce their viscosity to water like levels once they are heated, as can happen in a high rate water fracturing treatment after cessation of flow. Other advantages of the CFR free SFR fluids of the invention are related to the essentially associating nature of the fluid and the absence of high molecular weight species in the formulation. The SFR fluids are clean, as they do not generate polymer filter cakes that do not require external breakers, they are oil, dilution and more temperature responsive than CFRs, provide excellent flow back, and can be formulated with some flexibility with respect to the water quality. In order for a fluid to be a non damaging one, with effective flow back it is important for the fluid viscosity to decrease after the treatment is completed. Typical earth formations treated with high rate water fracturing treatments exhibit temperatures on the order 130 degF (54 degC) to 190 degF (88 degC).

Fluids with a good balance of properties (high viscosity, good proppant transport, good water and additive compatibility, and appropriate drag reduction properties are likely to be good fluids for pumping on improved high rate water fracturing and gravel packing treatments. In order to further optimize the formulation and the treatment cost effectiveness, it has been found that the use of a simple lab measurement can confirm qualitatively some of the fluid performance. When 1 liter of fluid is mixed, avoiding foam formation, and the time required for the whole volume to flow through a Marsh funnel is noted, it has been found that SFR fluids suitable for the invention require between 40 and 120 seconds to completely flow out of the Marsh funnel under atmospheric pressure. Especially suitable fluids for the purpose of the invention require in between 45 and 80 seconds, whereas fluids with insufficient drag reduction capabilities result in flow times of below 45 seconds (e.g., water flow time is 35 seconds), and fluids which are too viscous for the purpose of the invention require flow times typically higher than 120 seconds.

Although the methods have been described here for, and are most typically used for, hydrocarbon production, they may also be used in injection wells and for production of other fluids, such as water or brine. The particular embodiments disclosed above are illustrative only, as the invention may be modified and practiced in different but equivalent manners apparent to those skilled in the art having the benefit of the teachings herein. The scope of the invention is limited only by the claims below. It is therefore evident that the particular embodiments disclosed above may be altered or modified and all such variations are considered within the scope and spirit of the invention.

We claim:

1. An oilfield fracturing treatment method for reducing friction comprising the steps of:
   providing a suspending friction reducer fluid comprising:
      from about 0.001 weight percent to about 0.5 weight percent of a drag reducing surfactant comprising at least one surfactant selected from the group consisting of cationic surfactants, protonated amine surfactants, zwitterionic surfactants, anionic surfactants, amphoteric surfactants and mixtures thereof,
      at least one drag reducing enhancer selected from the group consisting of polymeric drag reduction enhancer, monomeric drag reduction enhancers, and mixtures thereof, and
   injecting said suspending friction reducer fluid into a wellbore as a hydraulic fracturing treatment fluid,
   initiating and propagating a fracture in the formation during a PAD stage of the hydraulic fracturing treatment, and
   allowing said fluid to enter a subterranean formation penetrated by the wellbore, and achieve a percent drag reduction of at least 20%,
   wherein the total amount of the drag reduction enhancer is no more than about 0.2 weight percent.

2. The method of claim 1 wherein said fluid achieves a percent drag reduction of at least about 40%.

3. The method of claim 1 wherein the active drag reducing surfactant is present in the suspending friction reducer fluid at a concentration of from about 0.001 weight percent to about 0.2 weight %.

4. The method of claim 1 wherein the polymeric drag reduction enhancer is selected from the group consisting of polycondensation products of sodium naphthalene sulfonate, copolymers formed from formaldehyde condensation of naphthalene sulfonate with phenol, alkylated phenols, bisphenol F, and bisphenol A, copolymers formed by melamine condensation of naphthalene sulfonate with phenol, alkylated phenols, bisphenol F, bisphenol A, lignosulfonates, vinyl benzene sulfonate, and AMPS copolymers.

5. The method of claim 1 wherein the monomeric drag reduction enhancer comprises a monomeric or oligomeric organic ion containing at least one aromatic ring.

6. The method of claim 1 wherein the drag reducing surfactant comprises a cationic surfactant.

7. The method of claim 6 wherein said drag reducing surfactant comprises a mixture of at least one cationic surfactant and at least one anionic surfactant.

8. The method of claim 1 wherein the monomeric drag reduction enhancer comprises urea.

9. The method of claim 1 wherein the polymeric drag reduction enhancer comprises polynaphthalene sulfonate, and the monomeric drag reduction enhancer comprises salicylate.

10. The method of claim 1 wherein the drag reducing surfactant is selected from the group consisting of cetyl trimethyl ammonium chloride and tallow trimethyl ammonium chloride, the polymeric drag reduction enhancer comprises polynaphthalene sulfonate, and the monomeric drag reduction enhancer comprises salicylate.

11. The method of claim 1 wherein the suspending friction reducer fluid further comprises an additive selected from an acid, a scale inhibitor, a co-surfactant, a co-solvent, or both.

12. The method according to claim 1 further comprising the step of injecting said suspending friction reducer fluid in proppant laden stages to move proppant into at least one fracture in the formation.

13. The method according to claim 1 wherein the suspending friction reducer fluid is injected into said wellbore in conjunction with fibers and said fluid and fiber flow into a high permeability area and divert subsequent treatment fluids from high permeability zones in a formation to lower permeability zones.

14. An oilfield fracturing treatment method for reducing friction comprising the steps of:
   providing a suspending friction reducer fluid comprising:
      from about 0.001 weight percent to about 0.5 weight percent of a drag reducing surfactant comprising at least one surfactant selected from the group consisting of cationic surfactants, protonated amine surfactants, zwitterionic surfactants, anionic surfactants, amphoteric surfactants and mixtures thereof, and at least one drag reducing enhancer selected from the group consisting of polymeric drag reduction enhancer, monomeric drag reduction enhancers, and mixtures thereof, and injecting said suspending friction reducer fluid in conjunction with fibers into a wellbore as a hydraulic fracturing treatment fluid, initiating and propagating a fracture in the formation during a PAD stage of the hydraulic fracturing treatment, allowing said fluid and fibers to enter a subterranean formation penetrated by the wellbore, and achieve a percent drag reduction of at least 20%, and allowing said fluid and fibers to flow into a high permeability area and divert subsequent treatment fluids from high permeability zones in a formation to lower permeability zones, wherein the total amount of the drag reduction enhancer is no more than about 0.2 weight percent.

15. The method of claim 14 wherein said fluid achieves a percent drag reduction of at least about 40%.

16. The method of claim 14 wherein the active drag reducing surfactant is present in the suspending friction reducer fluid at a concentration of from about 0.001 weight percent to about 0.2 weight %.

17. The method of claim 14 wherein the polymeric drag reduction enhancer is selected from the group consisting of polycondensation products of sodium naphthalene sulfonate, copolymers formed from formaldehyde condensation of naphthalene sulfonate with phenol, alkylated phenols, bisphenol F, and bisphenol A, copolymers formed by melamine condensation of naphthalene sulfonate with phenol, alkylated phenols, bisphenol F, bisphenol A, lignosulfonates, vinyl benzene sulfonate, and AMPS copolymers.

18. The method of claim 14 wherein the monomeric drag reduction enhancer comprises a monomeric or oligomeric organic ion containing at least one aromatic ring.

19. The method of claim 14 wherein the drag reducing surfactant comprises a cationic surfactant.

20. The method of claim 19 wherein said drag reducing surfactant comprises a mixture of at least one cationic surfactant and at least one anionic surfactant.

21. The method of claim 20 wherein the monomeric drag reduction enhancer comprises urea.

22. The method of claim 20 wherein the polymeric drag reduction enhancer comprises polynaphthalene sulfonate, and the monomeric drag reduction enhancer comprises salicylate.

23. The method of claim 20 wherein the drag reducing surfactant is selected from the group consisting of cetyl trimethyl ammonium chloride and tallow trimethyl ammonium chloride, the polymeric drag reduction enhancer comprises polynaphthalene sulfonate, and the monomeric drag reduction enhancer comprises salicylate.

24. The method of claim 20 wherein the suspending friction reducer fluid further comprises an additive selected from an acid, a scale inhibitor, a co-surfactant, a co-solvent, or both.

25. The method of claim 20, wherein said oilfield treatment method is selected from a method of hydraulic fracturing and a method of gravel packing.

26. The method according to claim 25 further comprising the step of injecting said suspending friction reducer fluid in proppant laden stages to move proppant into at least one fracture in the formation.

27. An oilfield fracturing treatment method for reducing friction comprising the steps of:
injecting into a wellbore a hydraulic fracturing treatment fluid to initiate and propagate a fracture in the formation;

providing a proppant and a suspending friction reducer fluid, the suspending friction reducer fluid comprising;

from about 0.001 weight percent to about 0.5 weight percent of a drag reducing surfactant comprising at least one surfactant selected from the group consisting of cationic surfactants, protonated amine surfactants, zwitterionic surfactants, anionic surfactants, amphoteric surfactants and mixtures thereof, and at least one drag reducing enhancer selected from the group consisting of polymeric drag reduction enhancer, monomeric drag reduction enhancers, and mixtures thereof, and injecting said suspending friction reducer fluid with the proppant into the wellbore, transporting the proppant into at least one fracture in the formation, and wherein the fluid enters a subterranean formation penetrated by the wellbore, and achieves a percent drag reduction of at least 20%, wherein the total amount of the drag reduction enhancer is no more than about 0.2 weight percent.

28. The method of claim 27 wherein said fluid achieves a percent drag reduction of at least about 40%.

29. The method of claim 27 wherein the active drag reducing surfactant is present in the suspending friction reducer fluid at a concentration of from about 0.001 weight percent to about 0.2 weight %.

30. The method of claim 27 wherein the polymeric drag reduction enhancer is selected from the group consisting of polycondensation products of sodium naphthalene sulfonate, copolymers formed from formaldehyde condensation of naphthalene sulfonate with phenol, alkylated phenols, bisphenol F, and bisphenol A, copolymers formed by melamine condensation of naphthalene sulfonate with phenol, alkylated phenols, bisphenol F, bisphenol A, lignosulfonates, vinyl benzene sulfonate, and AMPS copolymers.

31. The method of claim 27 wherein the monomeric drag reduction enhancer comprises urea.

32. The method of claim 27 wherein the suspending friction reducer fluid further comprises an additive selected from an acid, a scale inhibitor, a co-surfactant, a co-solvent, or both.

33. The method of claim 27 wherein the suspending friction reducer fluid is injected into said wellbore in conjunction with fibers and said fluid and fiber flow into a high permeability area and divert subsequent treatment fluids from high permeability zones in a formation to lower permeability zones.

34. The method of claim 1, wherein the suspending friction reducer fluid further comprises a conventional friction reducer (CFR) polymeric drag reducing agent.

35. The method of claim 34, wherein the CFR polymeric drag reducing agent is selected from the group consisting of guar, a guar derivative, polyethyleneoxide, polyacrylamide, polyAMPS and a polyAMPS derivative.

* * * * *